United States Patent [19]

Sekiguchi et al.

[11] Patent Number: 5,494,445

[45] Date of Patent: Feb. 27, 1996

[54] PROCESS AND DISPLAY WITH MOVEABLE IMAGES

[75] Inventors: Yoshi Sekiguchi, 437 Marshman, Highland Park, Ill. 60035; Risa S. Vuillemot; Chika Sekiguchi, both of Chicago, Ill.; Juri Sekiguchi, Highland Park, Ill.

[73] Assignee: Yoshi Sekiguchi, Highland Park, Ill.

[21] Appl. No.: 331,810

[22] Filed: Oct. 31, 1994

Related U.S. Application Data

[63] Continuation-in-part of Ser. No. 25,149, Mar. 2, 1993, Pat. No. 5,364,274, which is a continuation-in-part of Ser. No. 815,420, Dec. 31, 1991, Pat. No. 5,197,886, which is a division of Ser. No. 447,064, Dec. 7, 1989, Pat. No. 5,098,302.

[51] Int. Cl.$^6$ ............................................. G09B 19/00
[52] U.S. Cl. ........................... 434/365; 434/97; 434/426; 434/96; 40/436; 40/453
[58] Field of Search ............................... 434/81, 84, 85, 434/90, 96, 102, 365, 426, 428, 97; 40/436, 437, 442, 451–454, 471, 476, 478, 488, 518

[56] References Cited

U.S. PATENT DOCUMENTS

| | | | |
|---|---|---|---|
| 4,208,811 | 6/1980 | Junowicz | 434/96 |
| 4,333,255 | 6/1982 | Ward | 40/524 |
| 4,621,443 | 11/1986 | Weinreich | 40/436 |
| 4,897,802 | 6/1990 | Atkinson et al. | 40/362 |

Primary Examiner—Richard J. Apley
Assistant Examiner—Glenn E. Richman
Attorney, Agent, or Firm—Thomas W. Tolpin

[57] ABSTRACT

An efficient economical process is provided to produce an intricate impressive display with outstanding marketing and advertising appeal. In the process, multiple images are formed, such as on a central processing unit, the images are masked and striped, and portions thereof are superimposed. The superimposed masked images can be printed on an underlying back rearward web. Transparent rods, a plate lens, lenticular lens, a cluster of anamorphic lenses, or a grid, can be placed front of the back web to provide a special display which has the illusion of animation as the angle of sight changes. The special display can be used to provide an attractive video cassette case, audio cassette case, ornament, Christmas tree ornament, decorative plate, paper weight, clothing, shirt, vehicle display sign, vehicle decal, book, sculpture, framed picture, picture stand, clock, watch, stamp, button, decorative fashion pin, window sticker, rotating display, scrolling display, game, ornament, decorative collector plate, award plaque, bookend, container, cup, glass, bottle, mug, insulating multi-walled mug, package, box, carton, wrapper, lampshade, magazine, comic book, paper back book, hard back book, cover, page, envelope, pamphlet, brochure, business card, greeting card, trading card, baseball card, basketball card, football card, soccer card, hockey card, sports card, card depicting at least one country or rock singer or musician, compact disc cover, or laser disc cover.

8 Claims, 30 Drawing Sheets

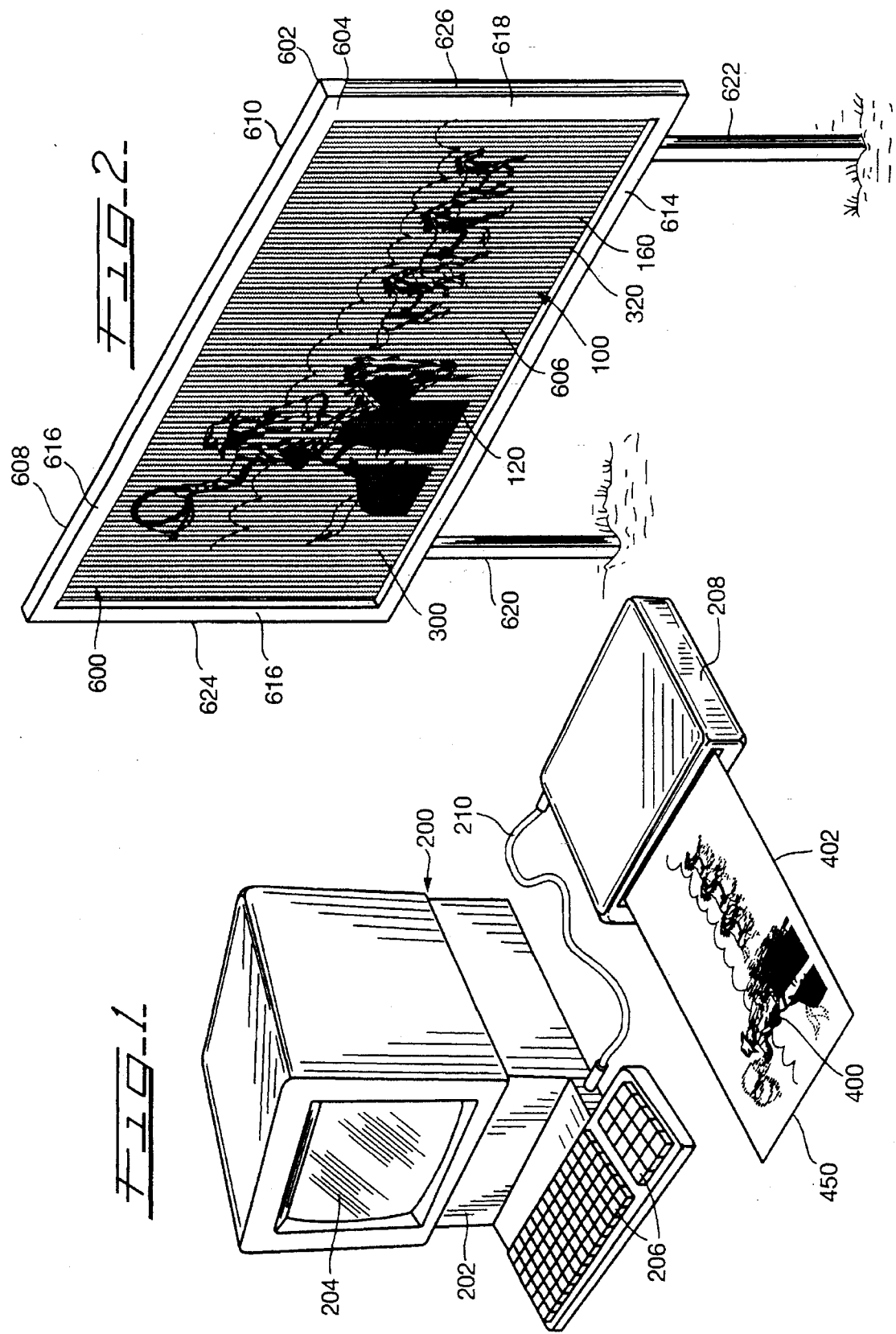

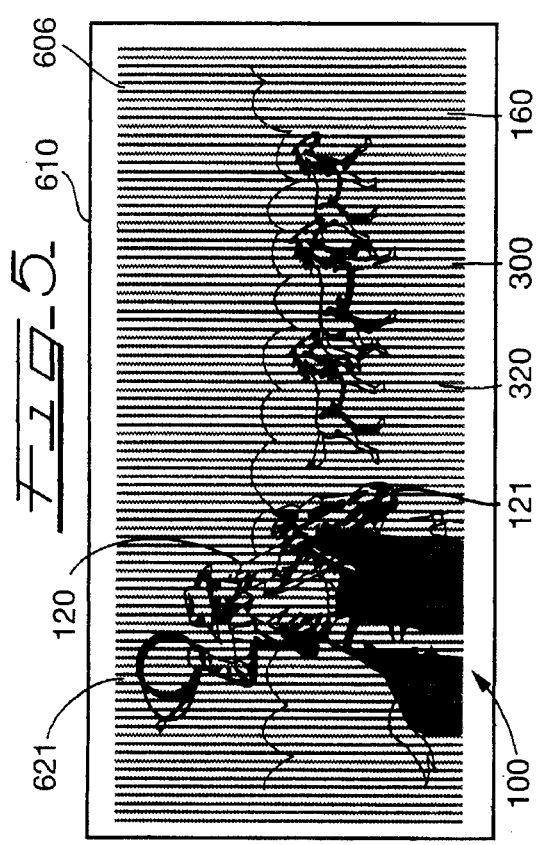
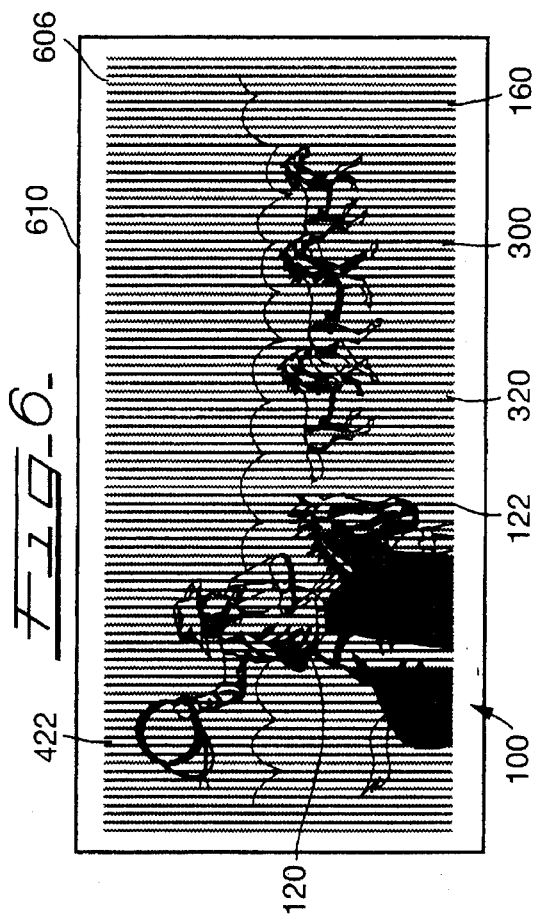
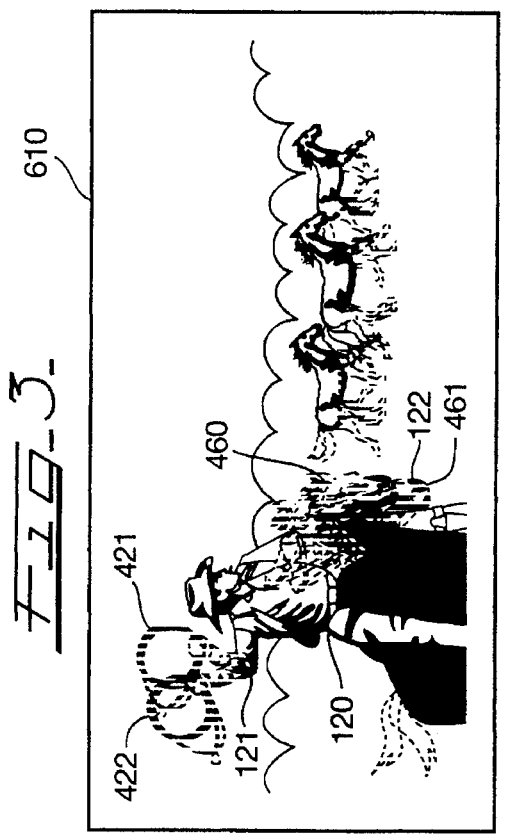
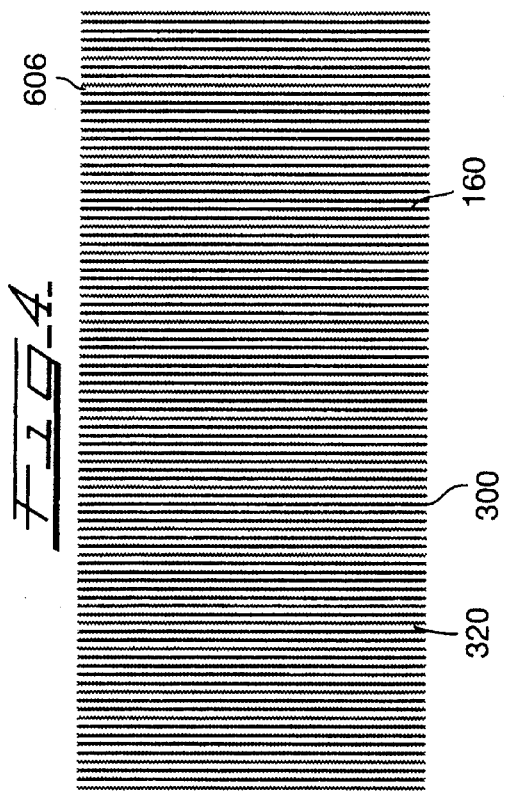

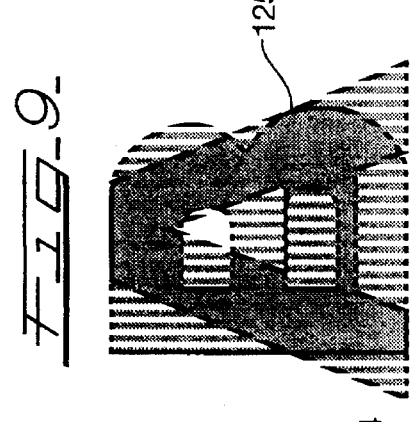
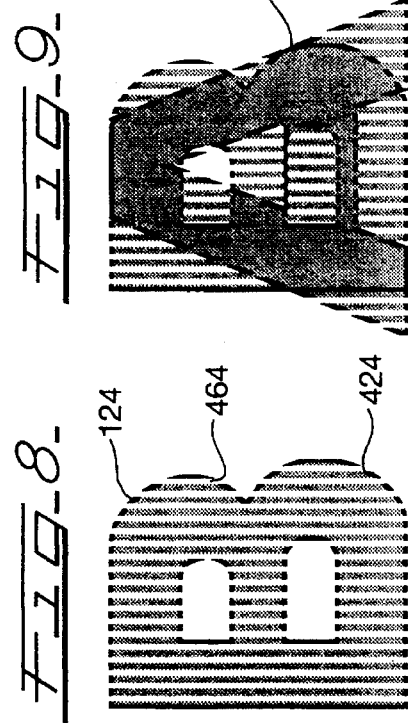
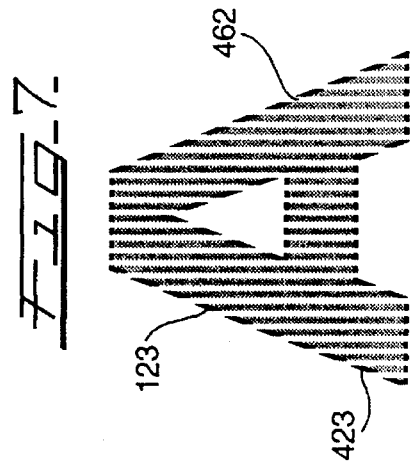
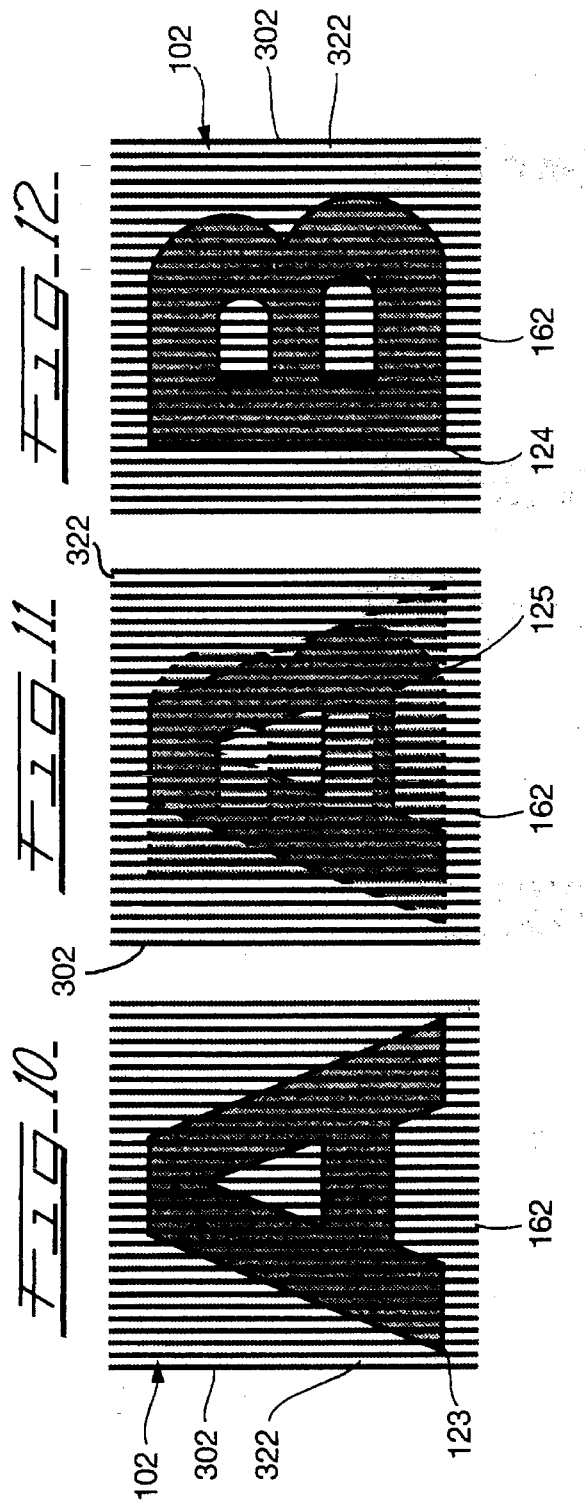

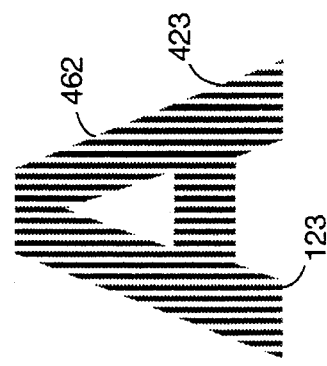
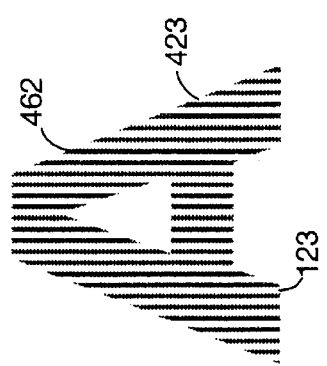
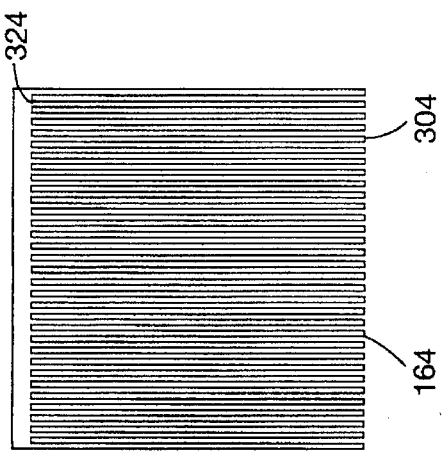
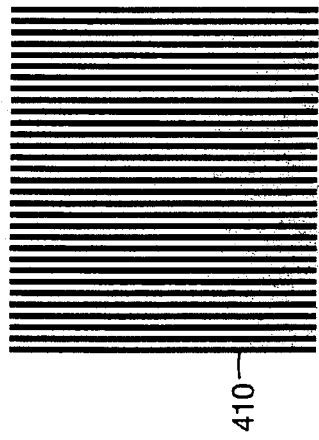
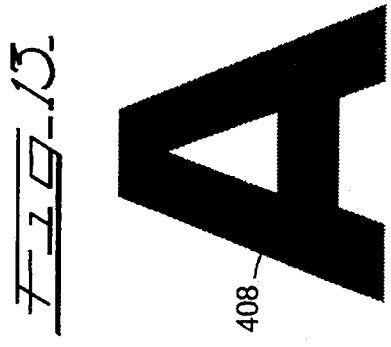

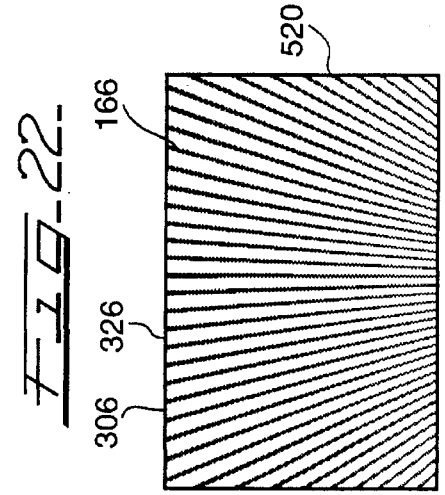
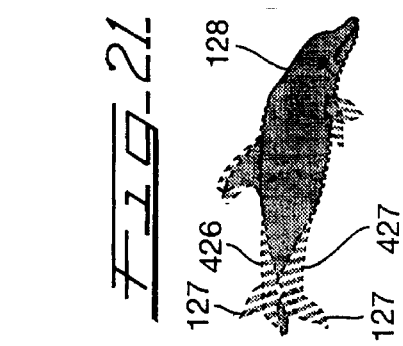
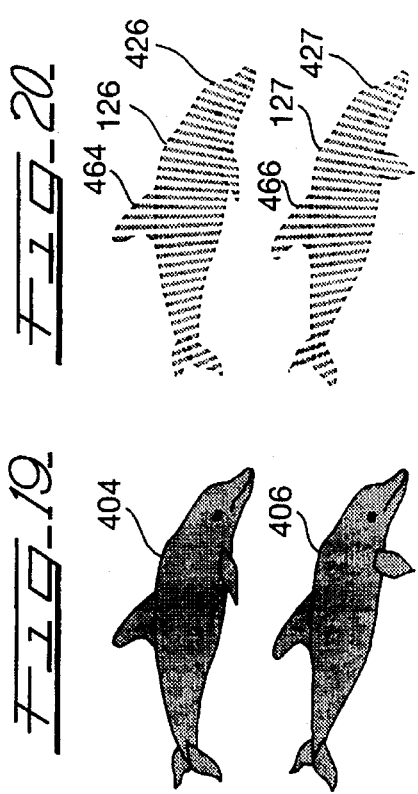
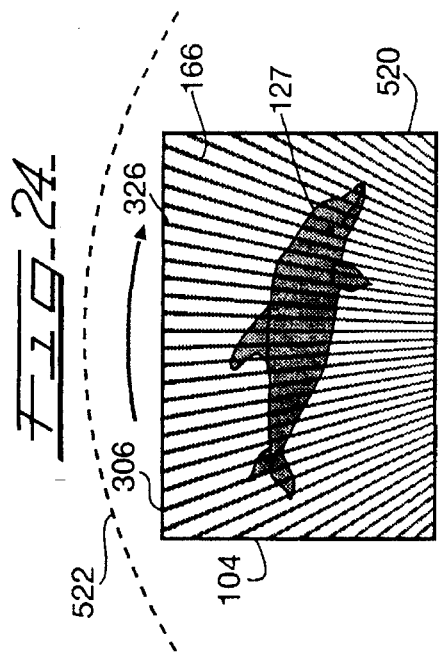
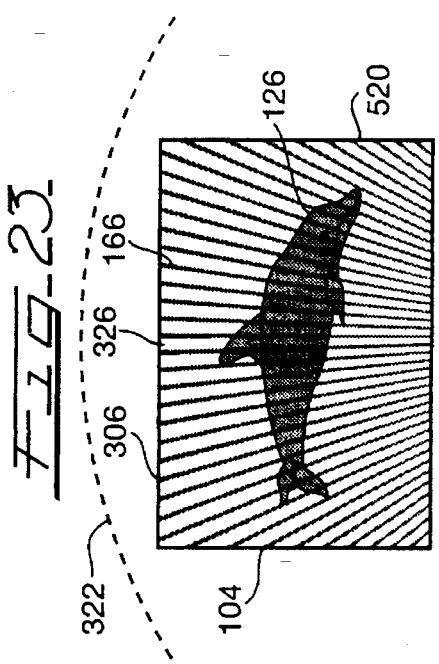

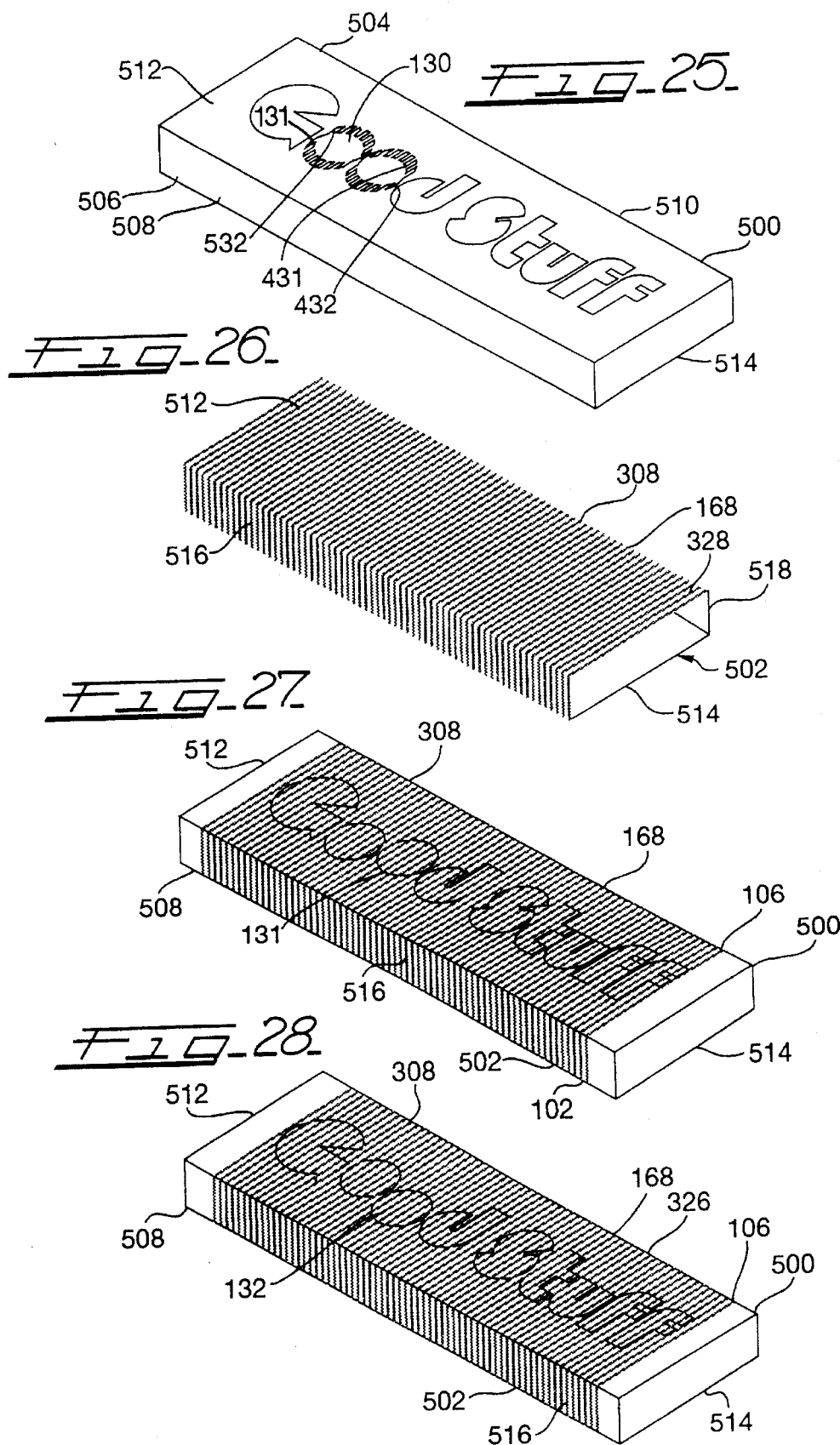

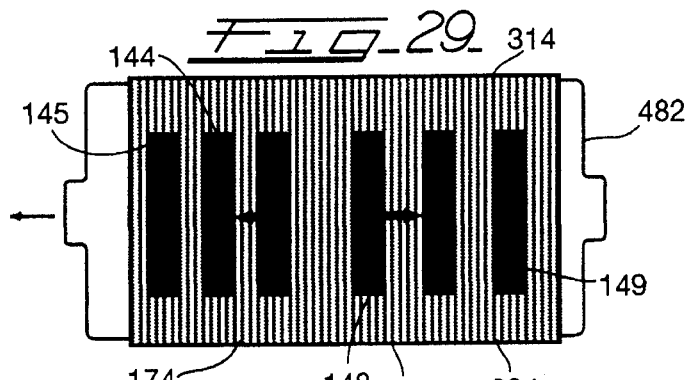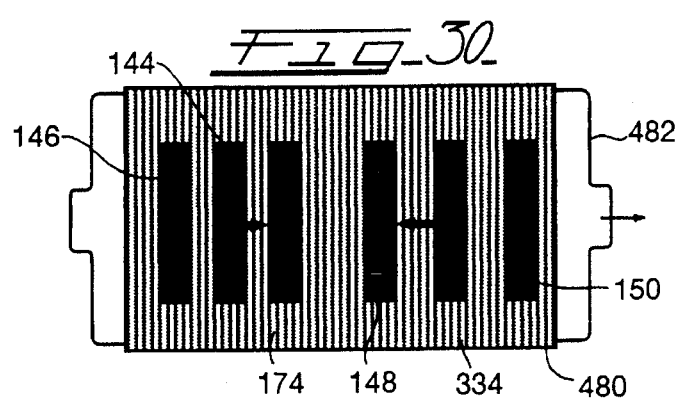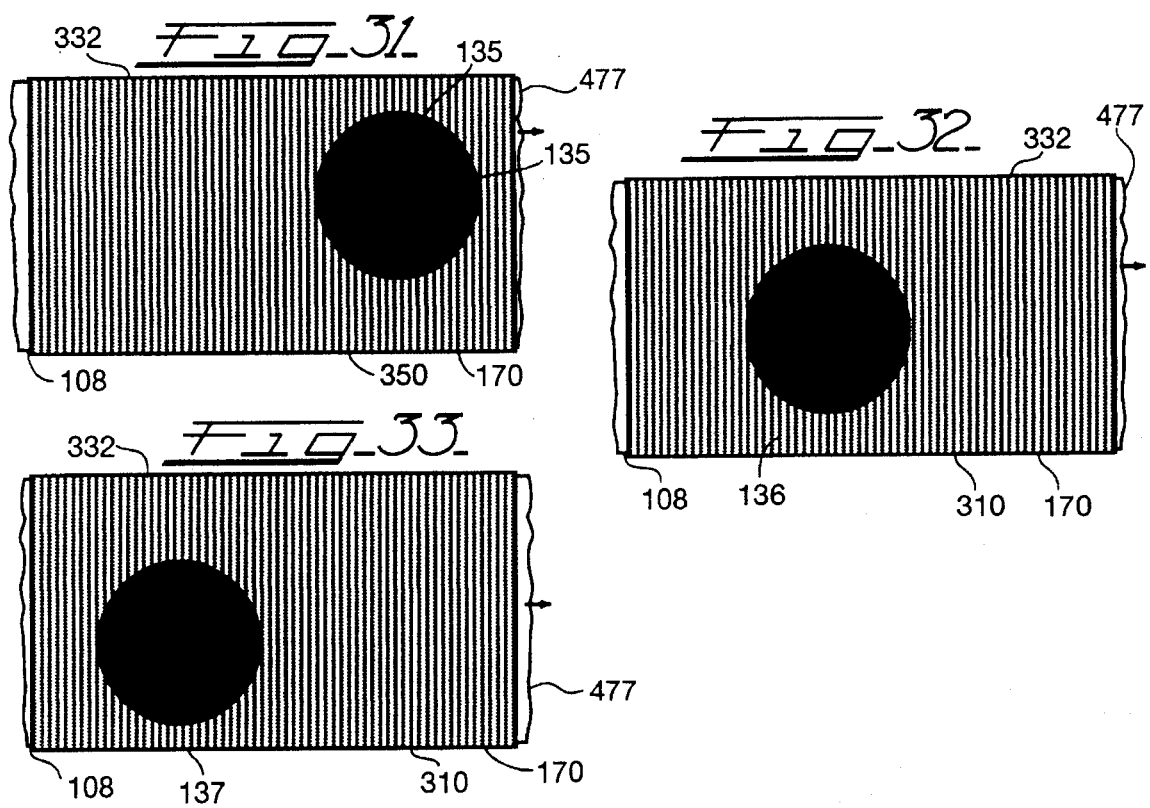

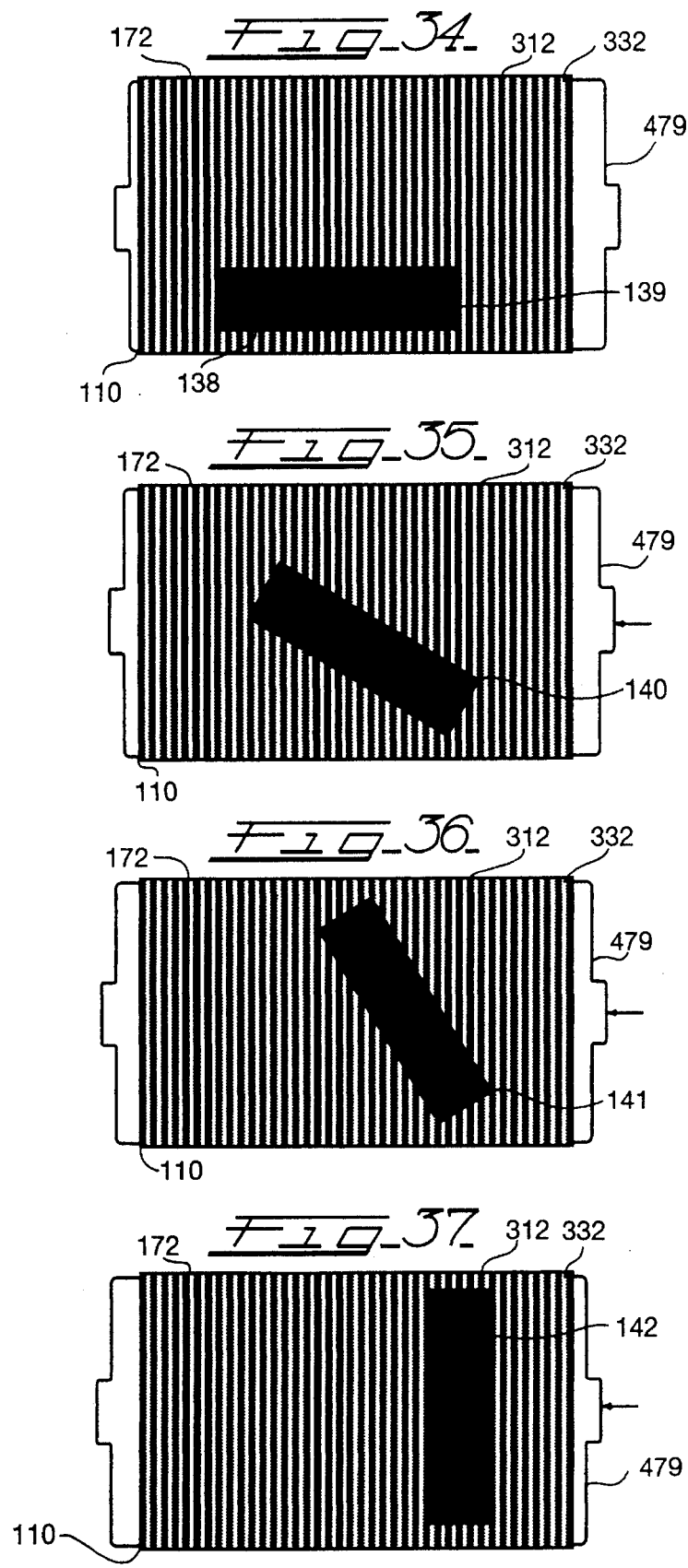

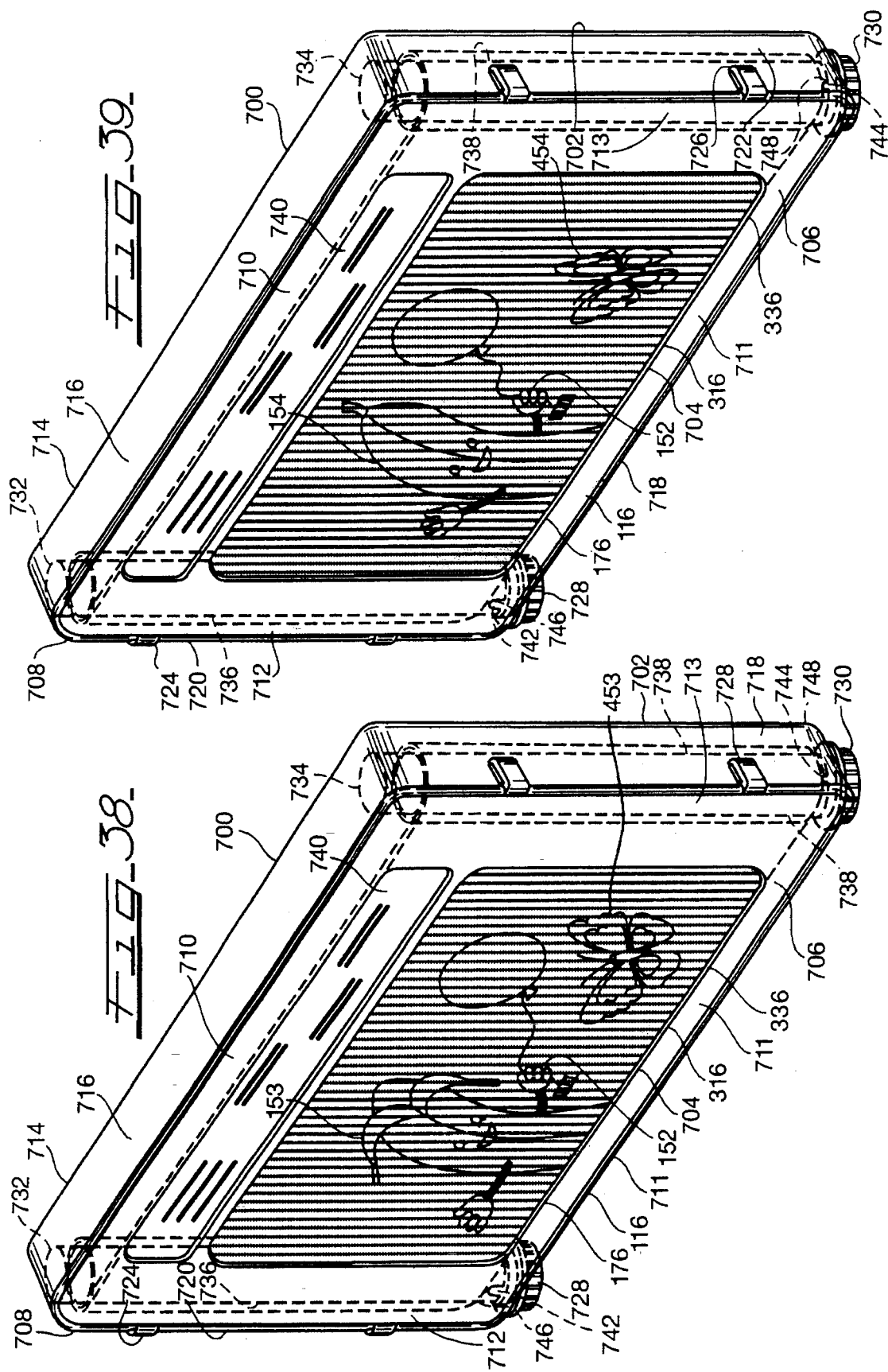

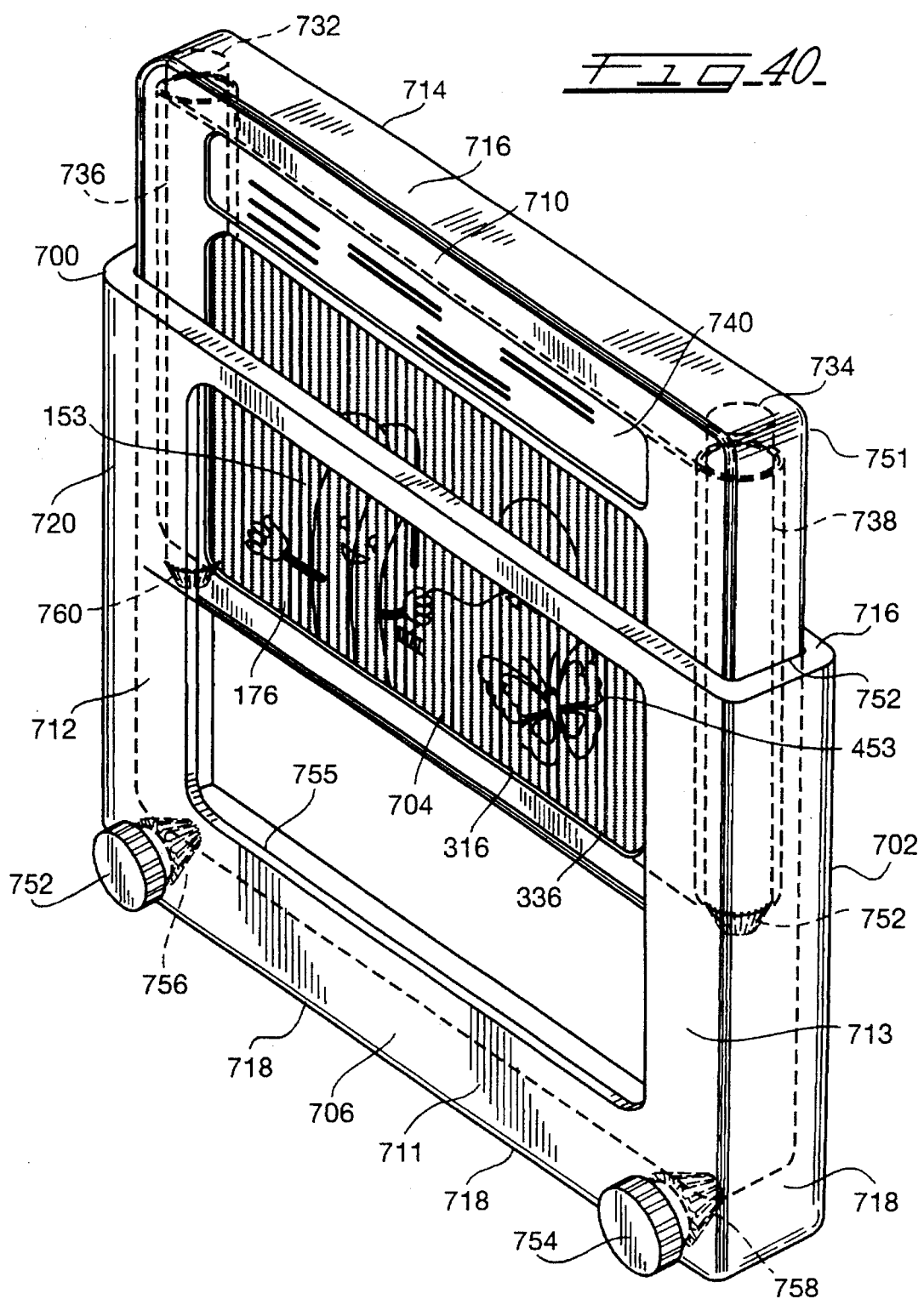

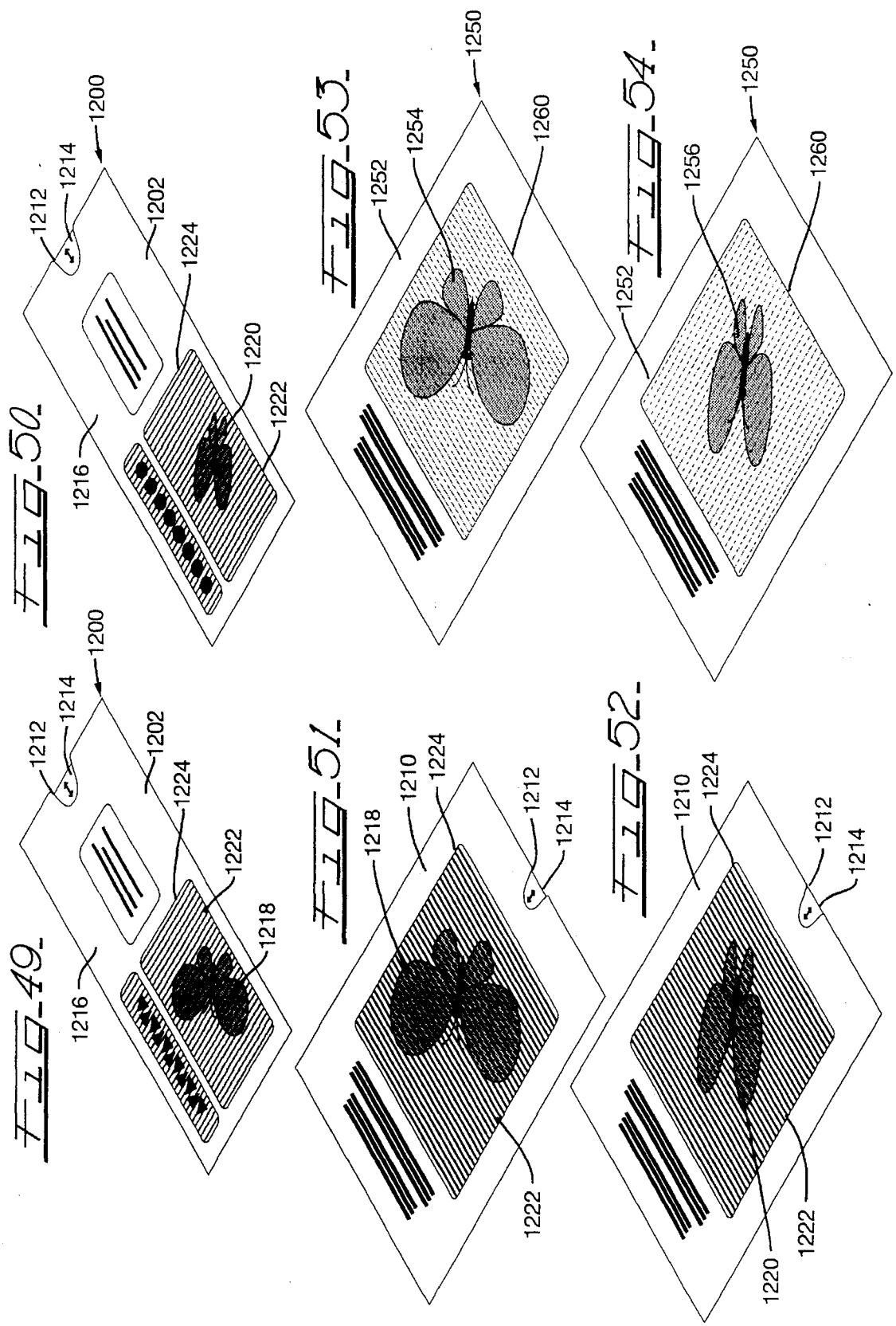

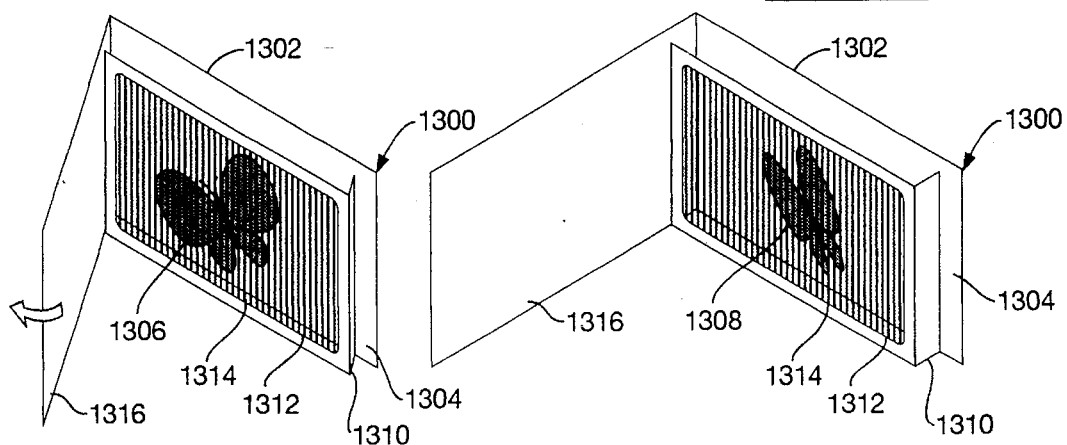
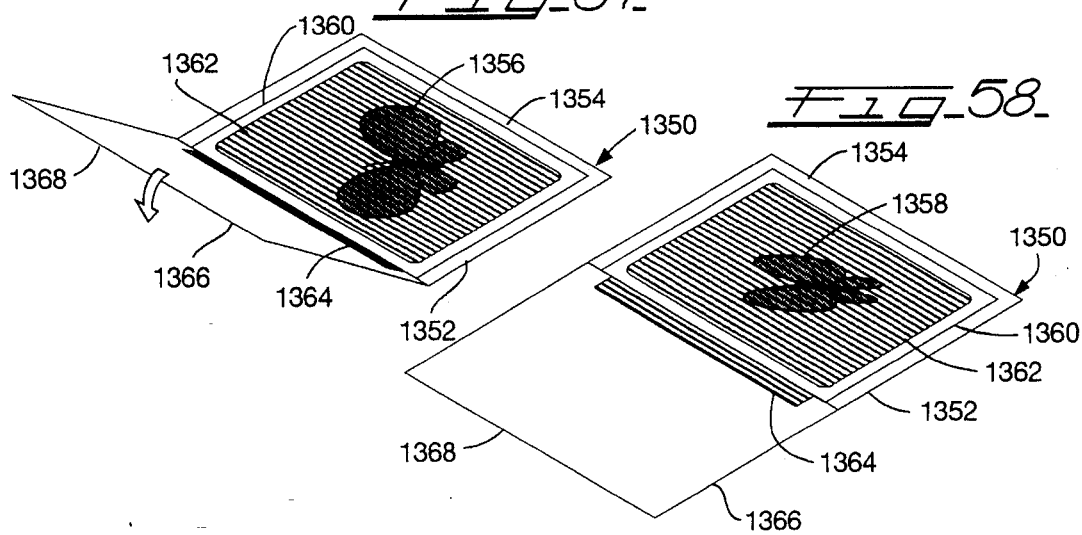
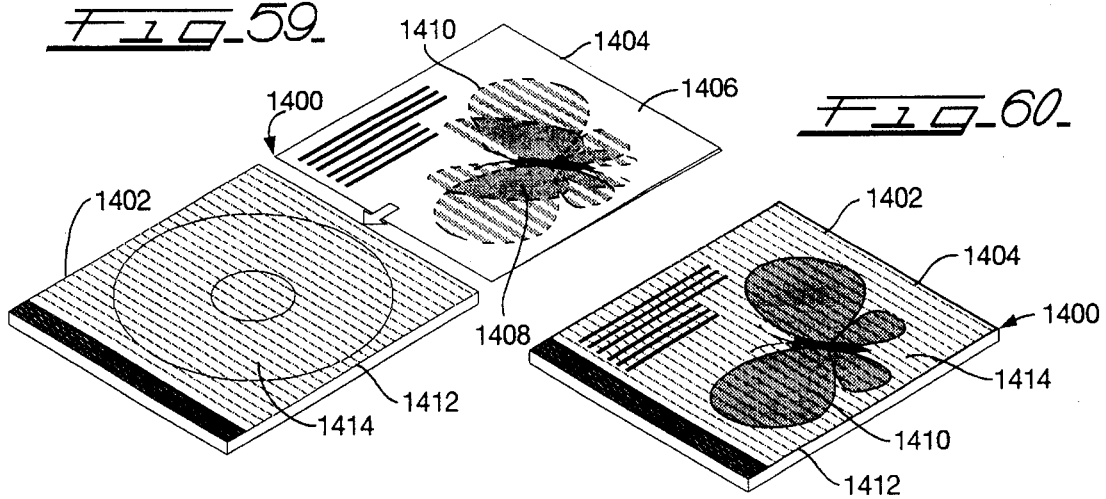

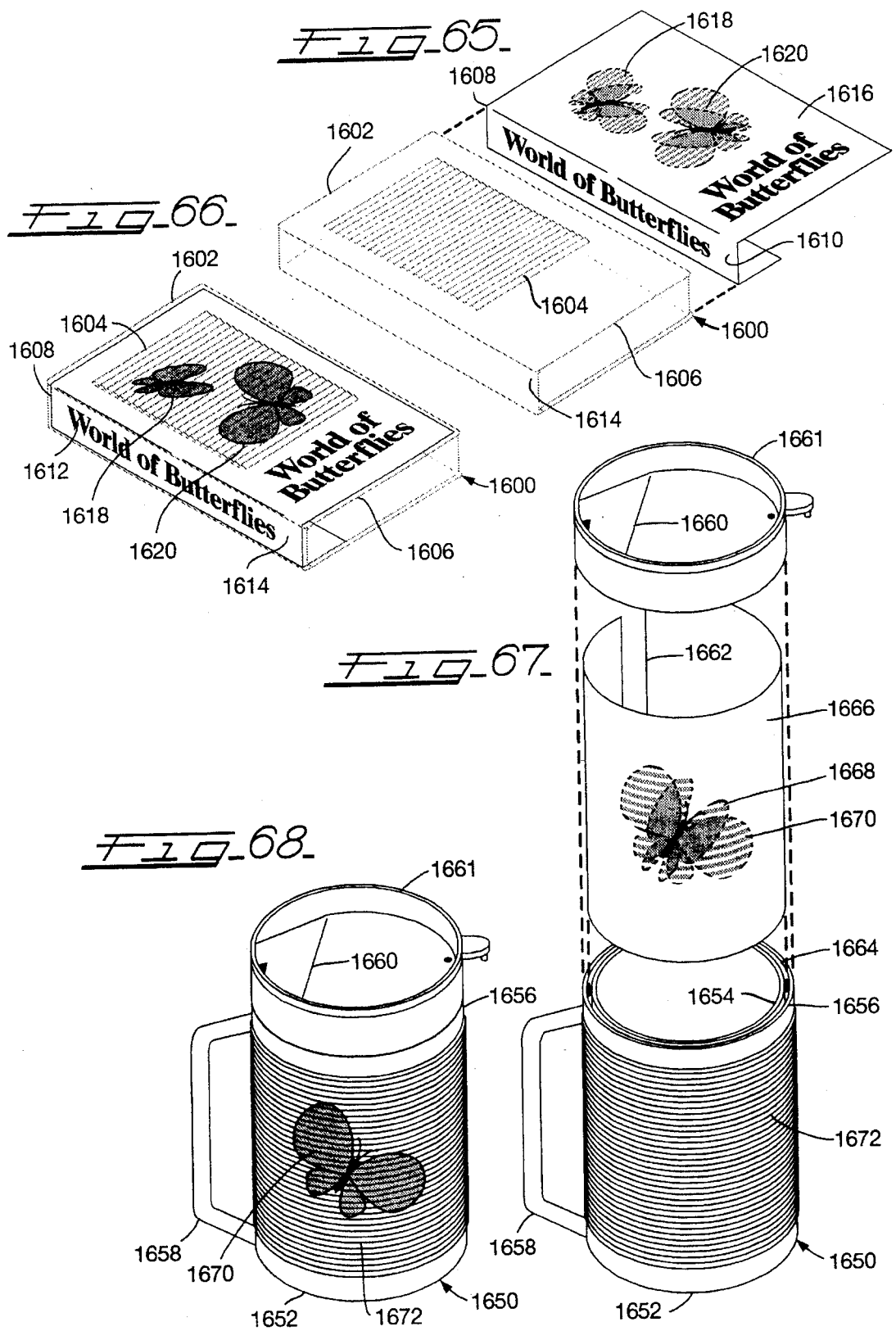

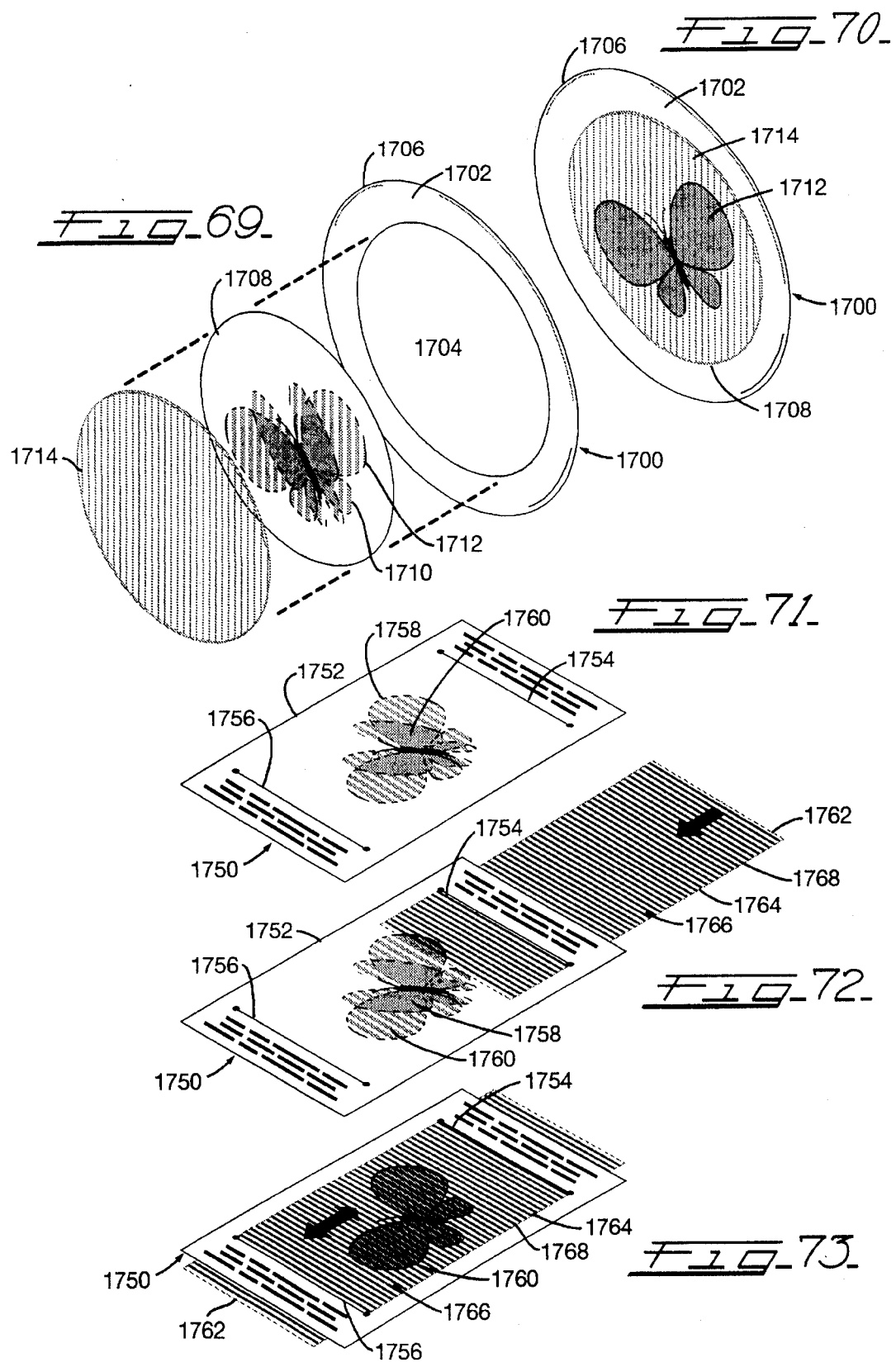

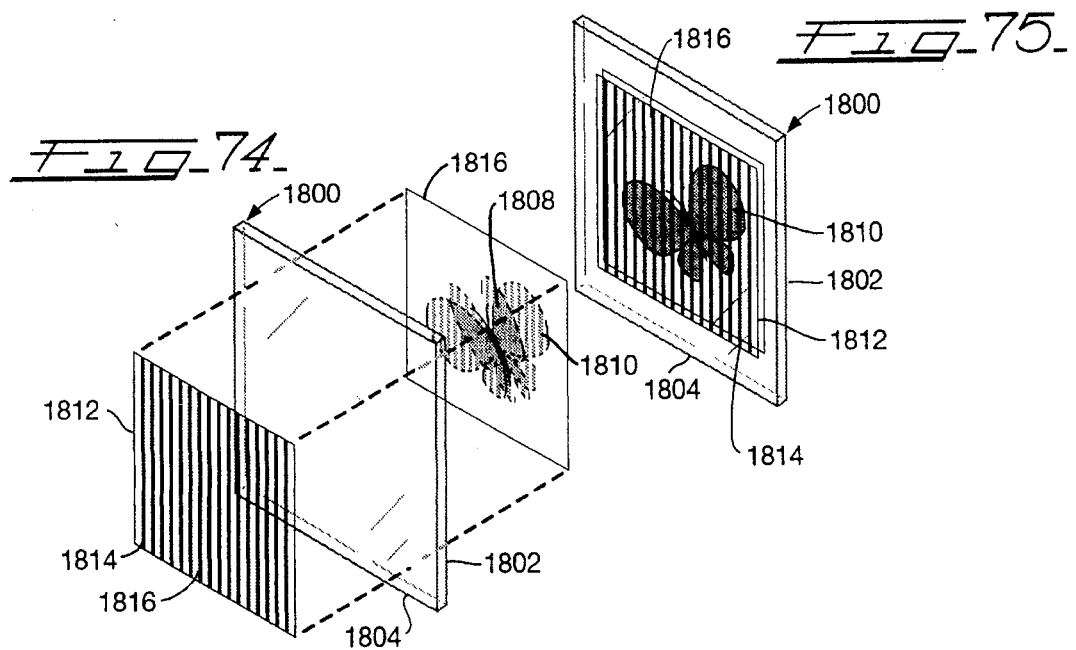
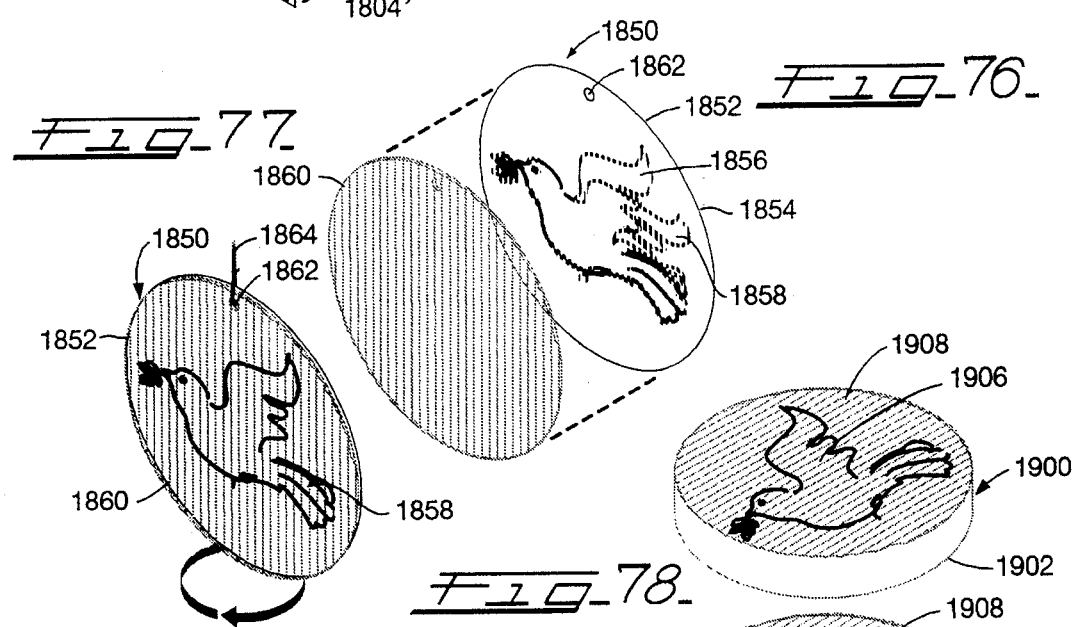
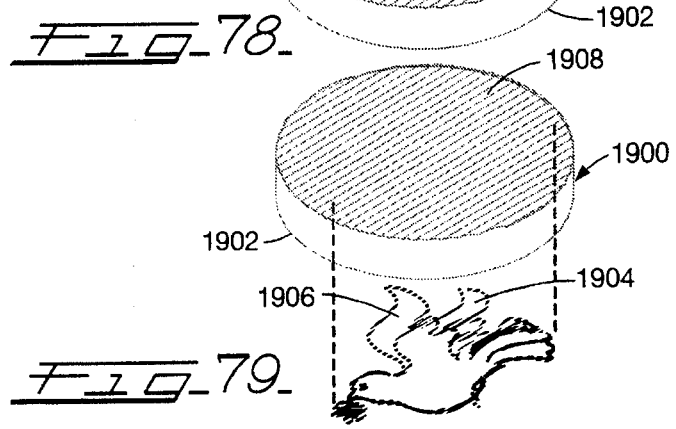

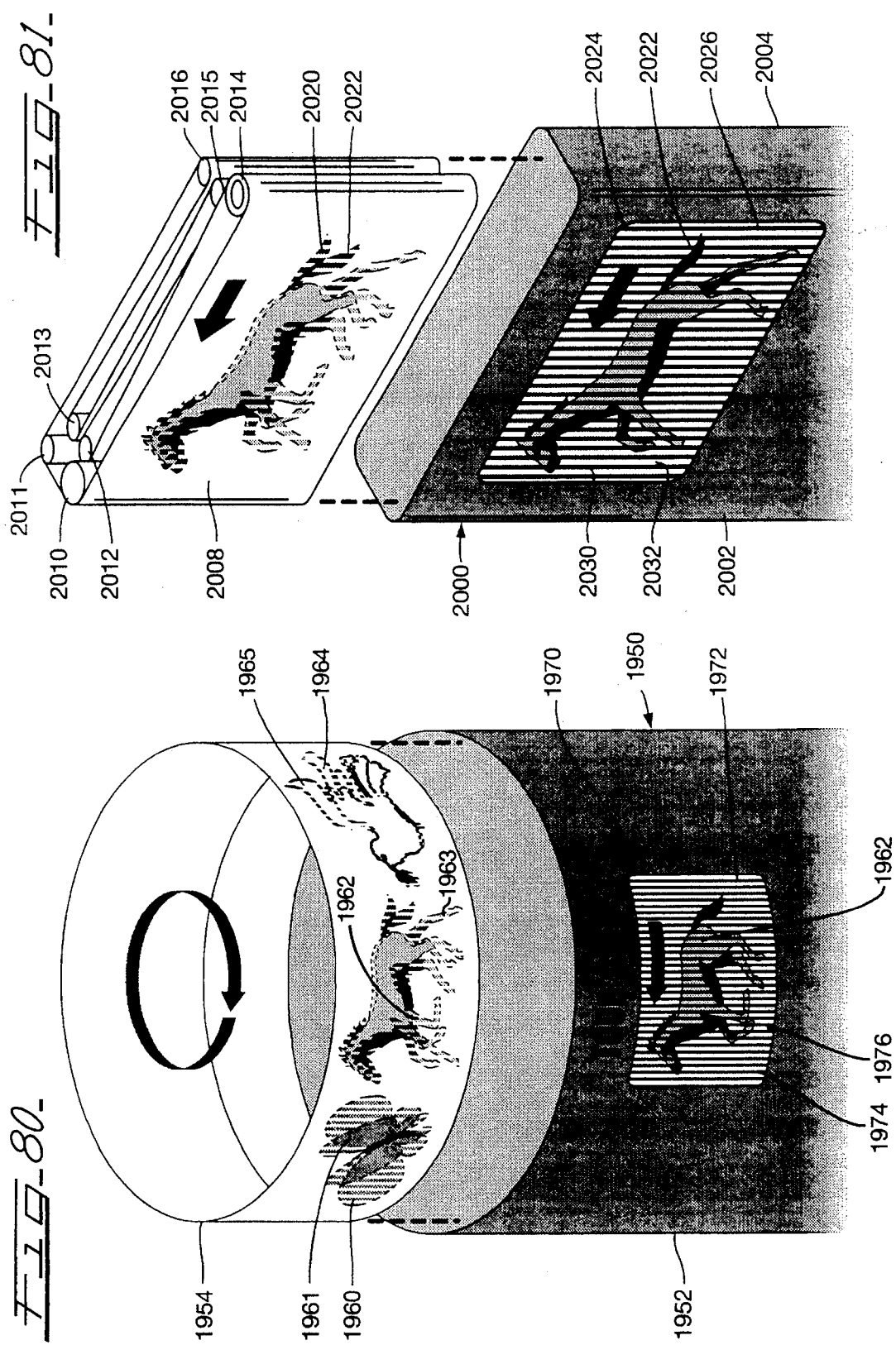

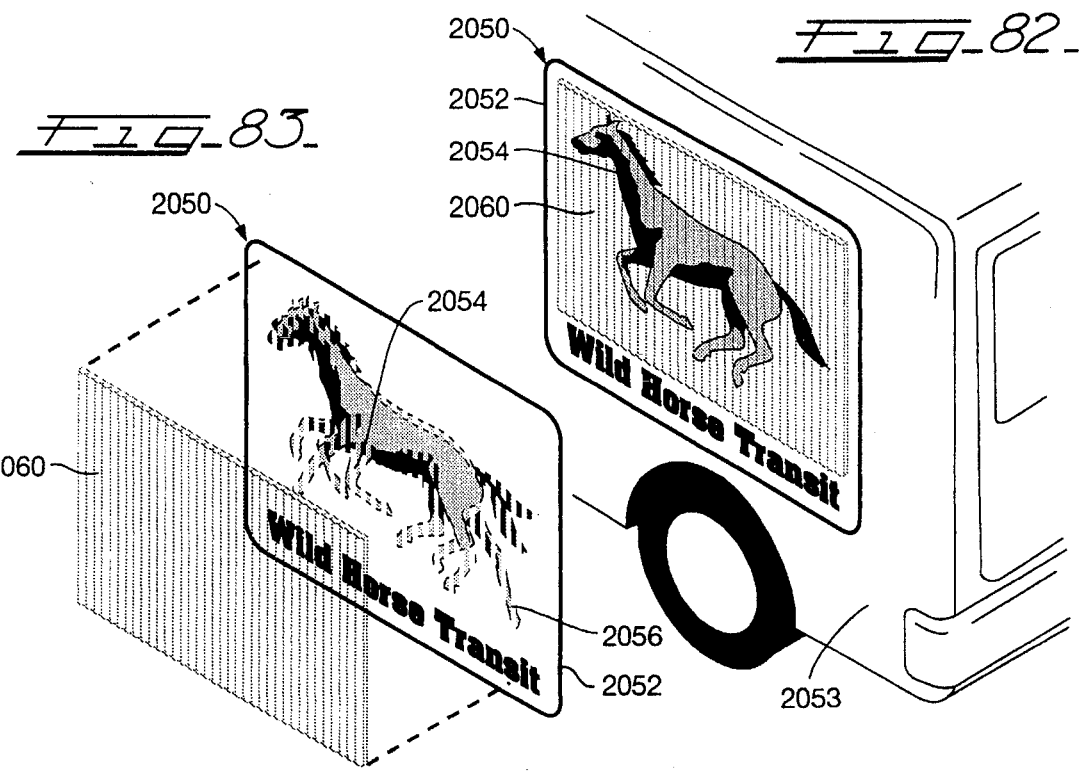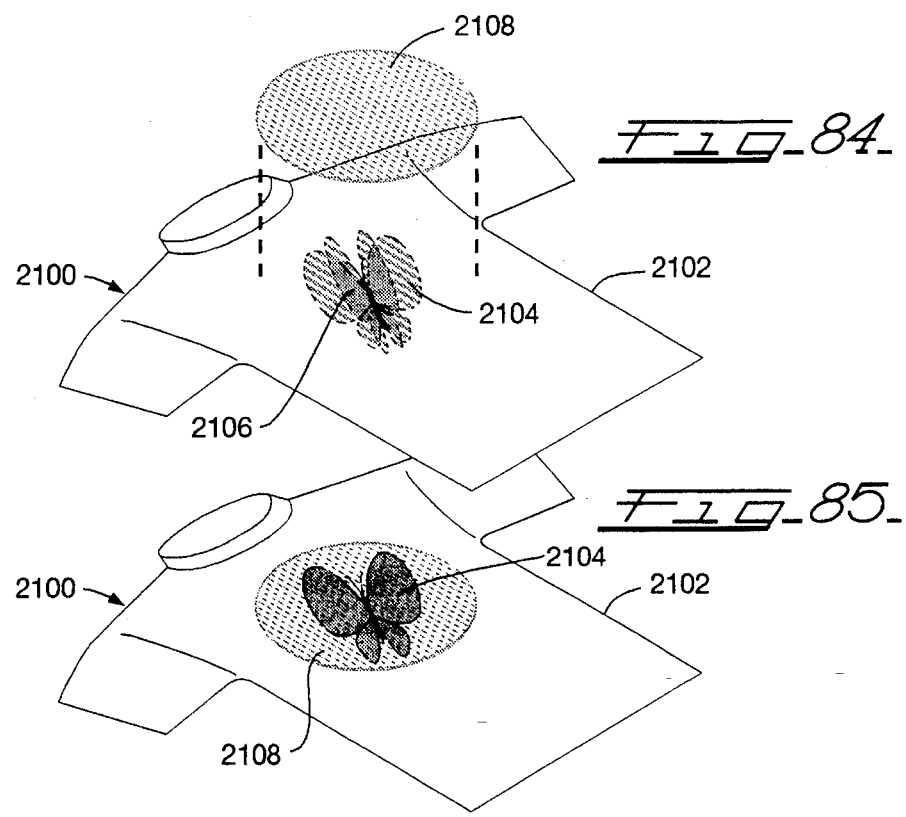

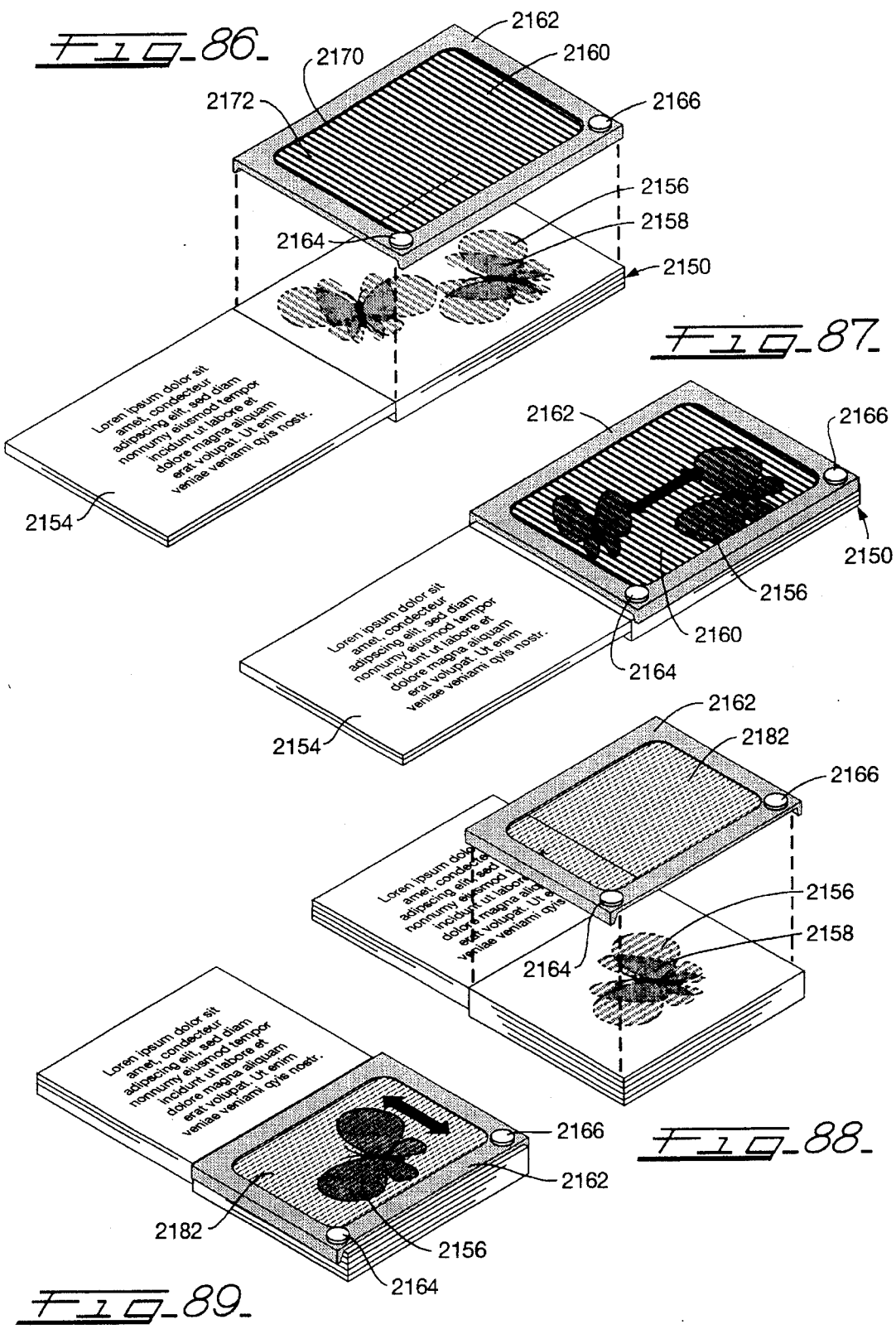

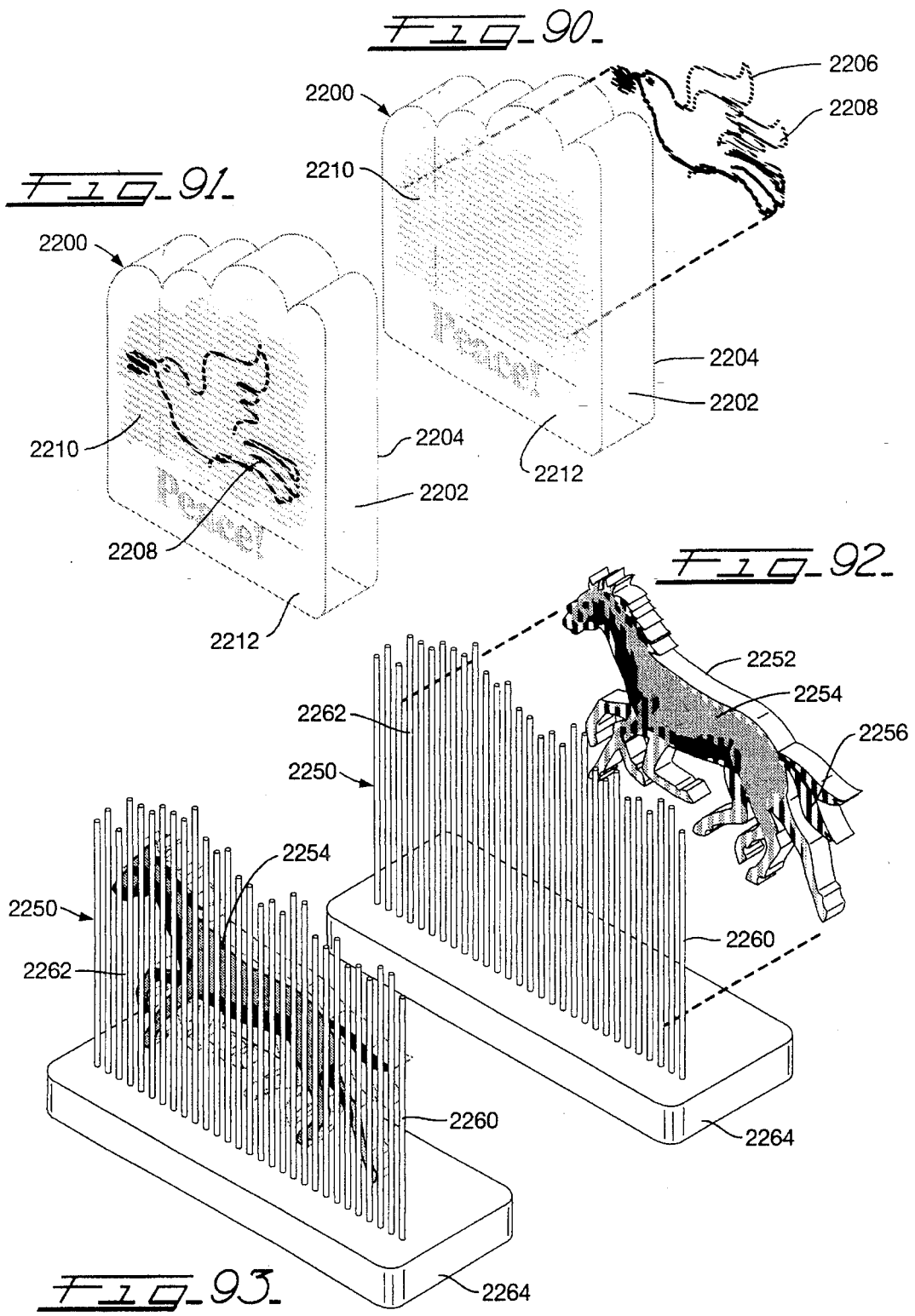

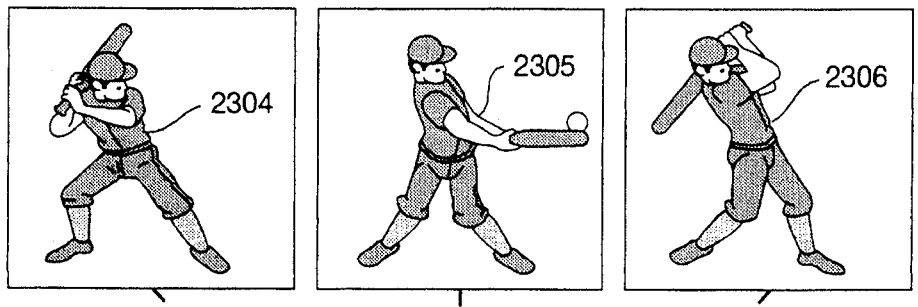
FIG_94.
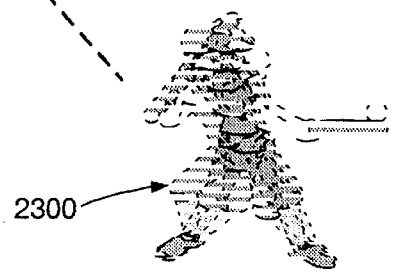
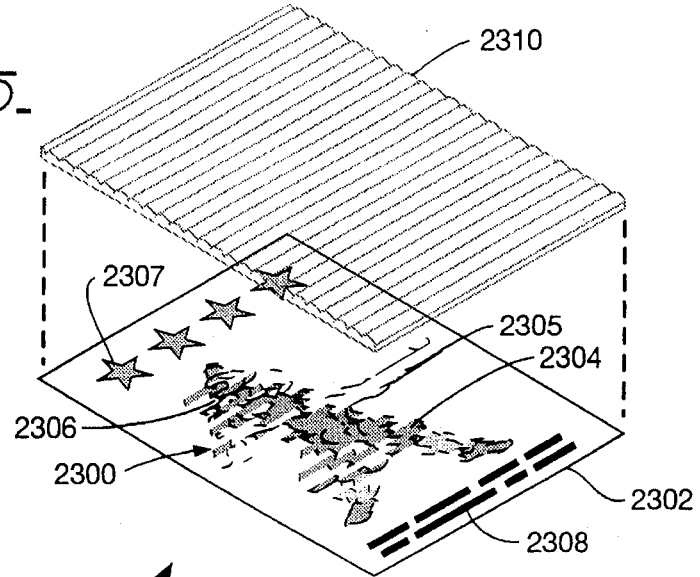
FIG_95.
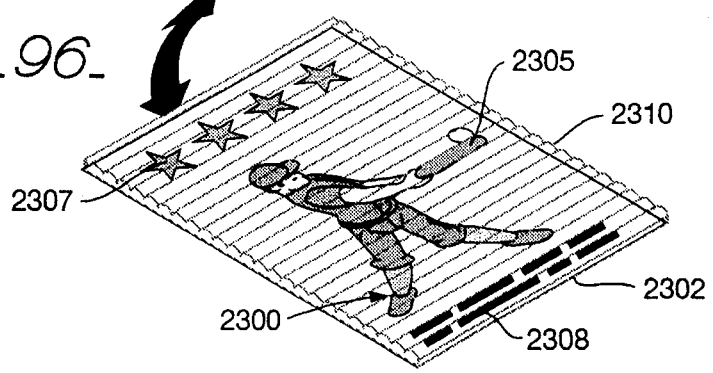
FIG_96.

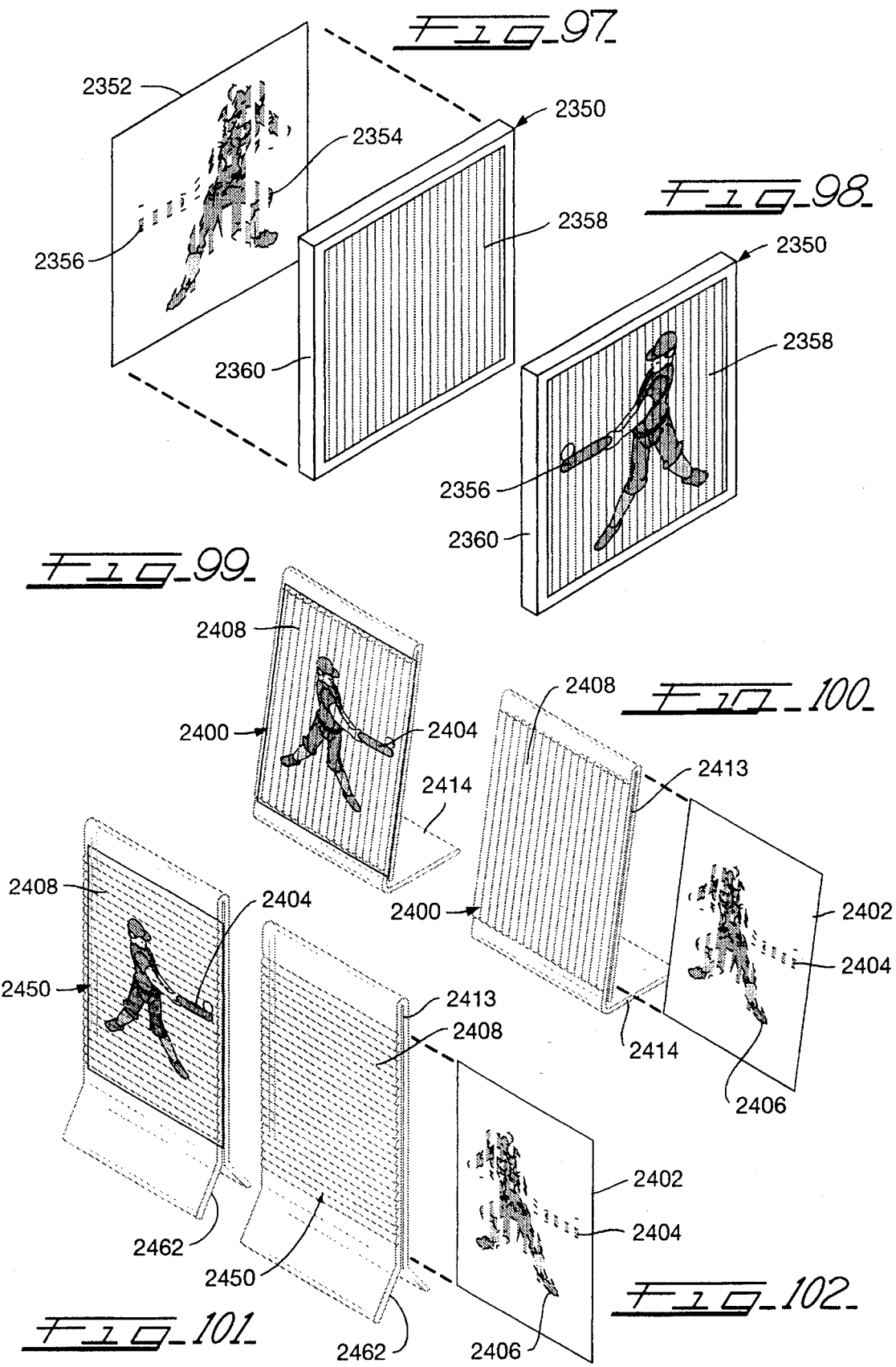

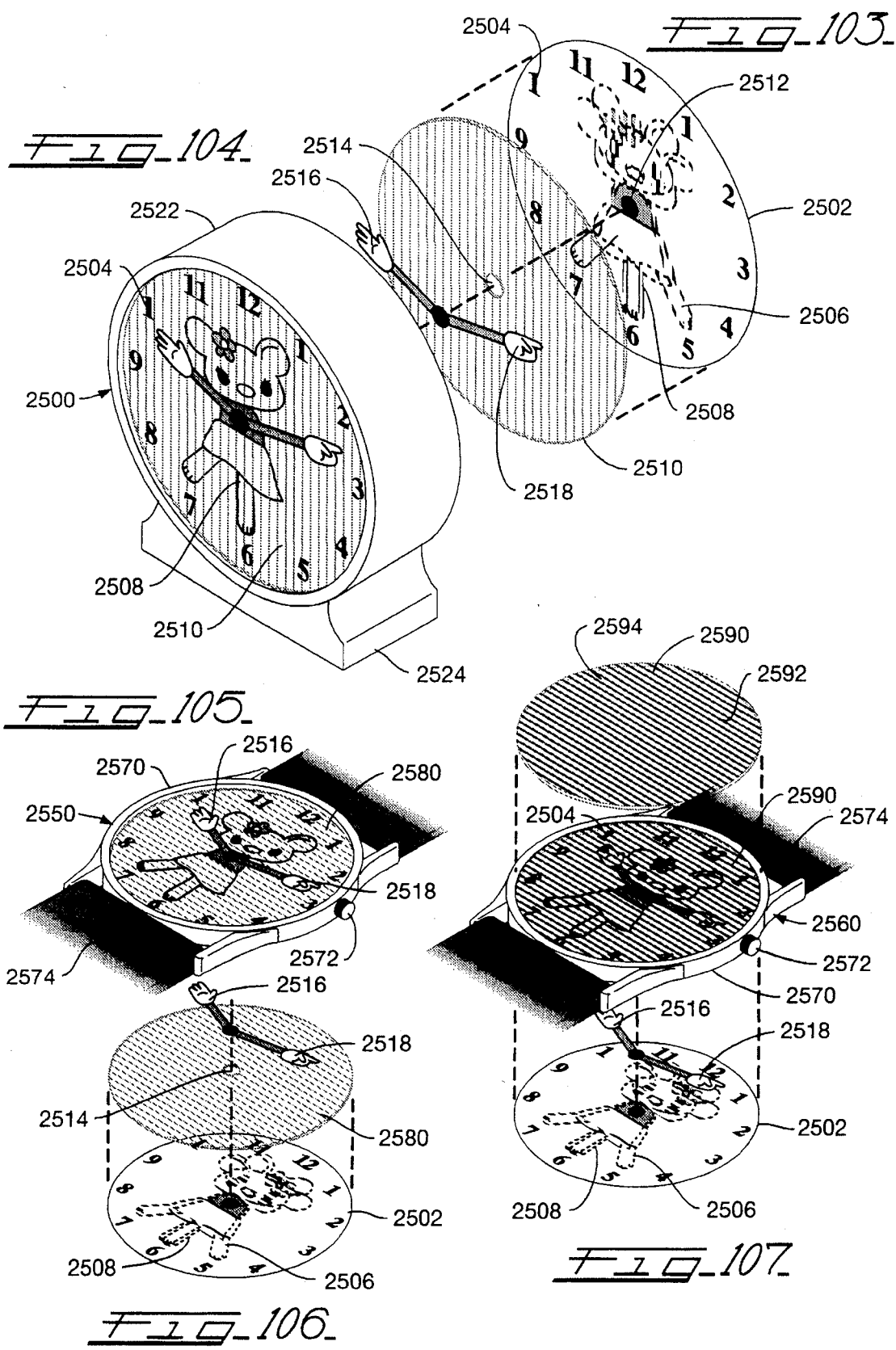

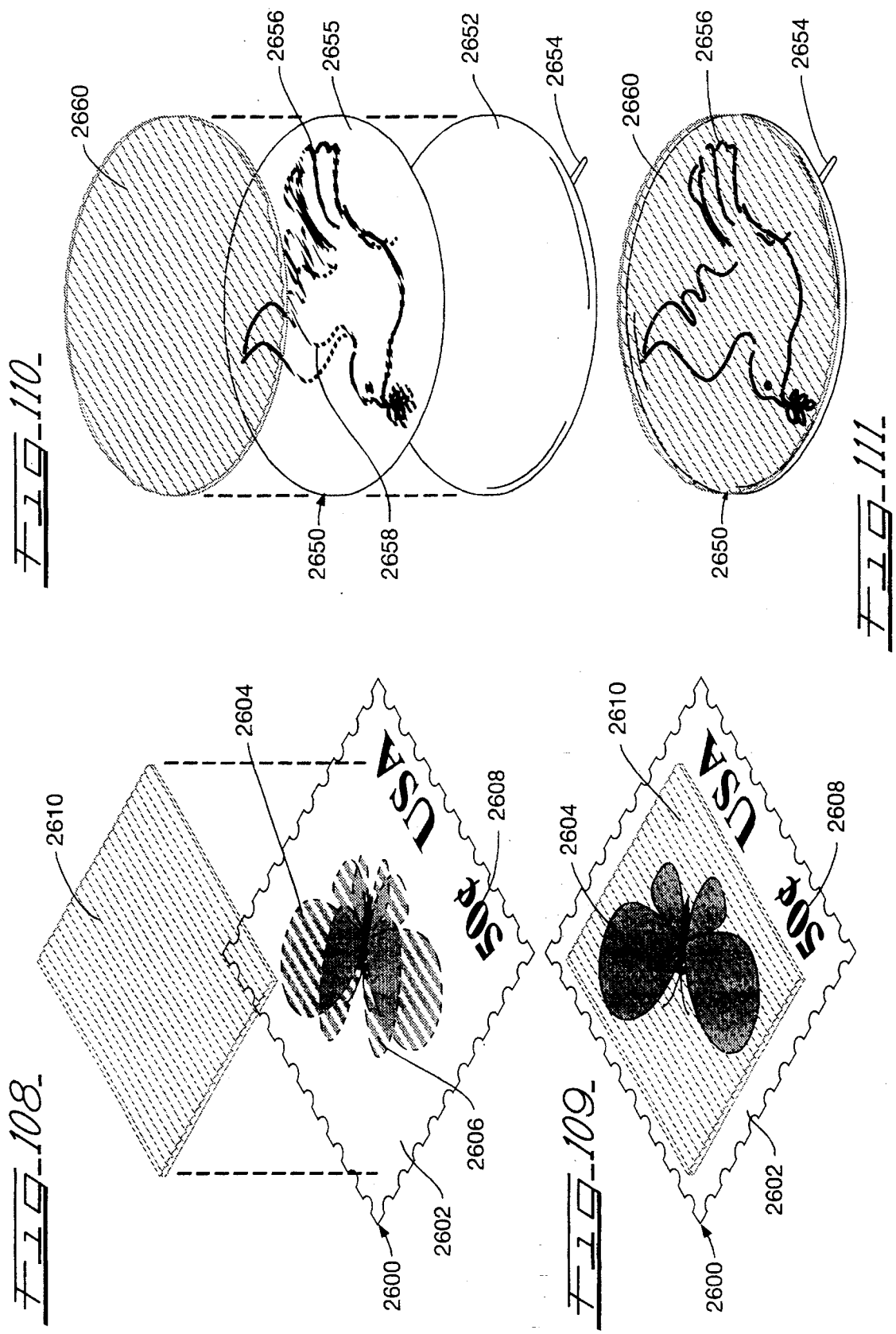

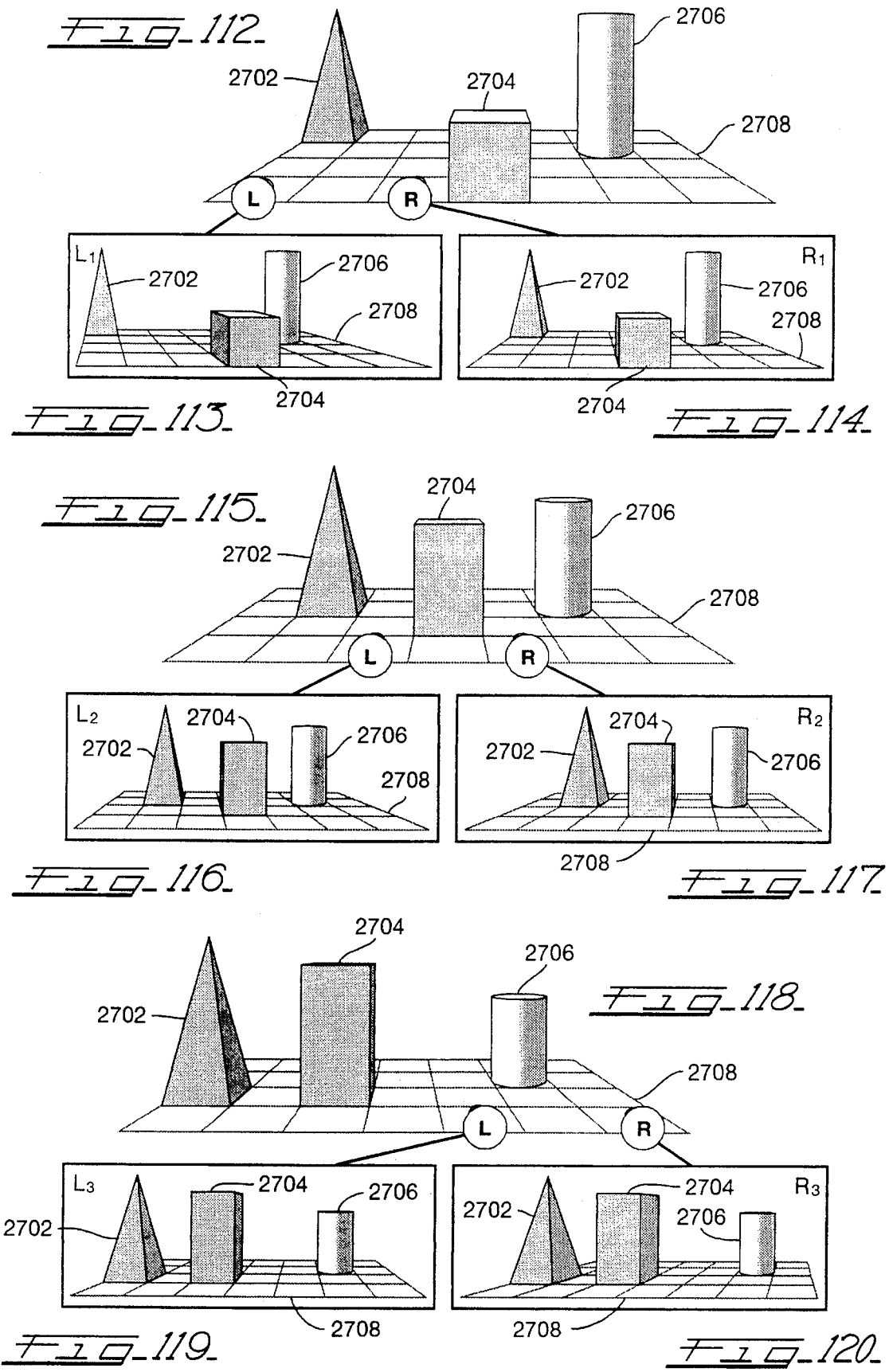

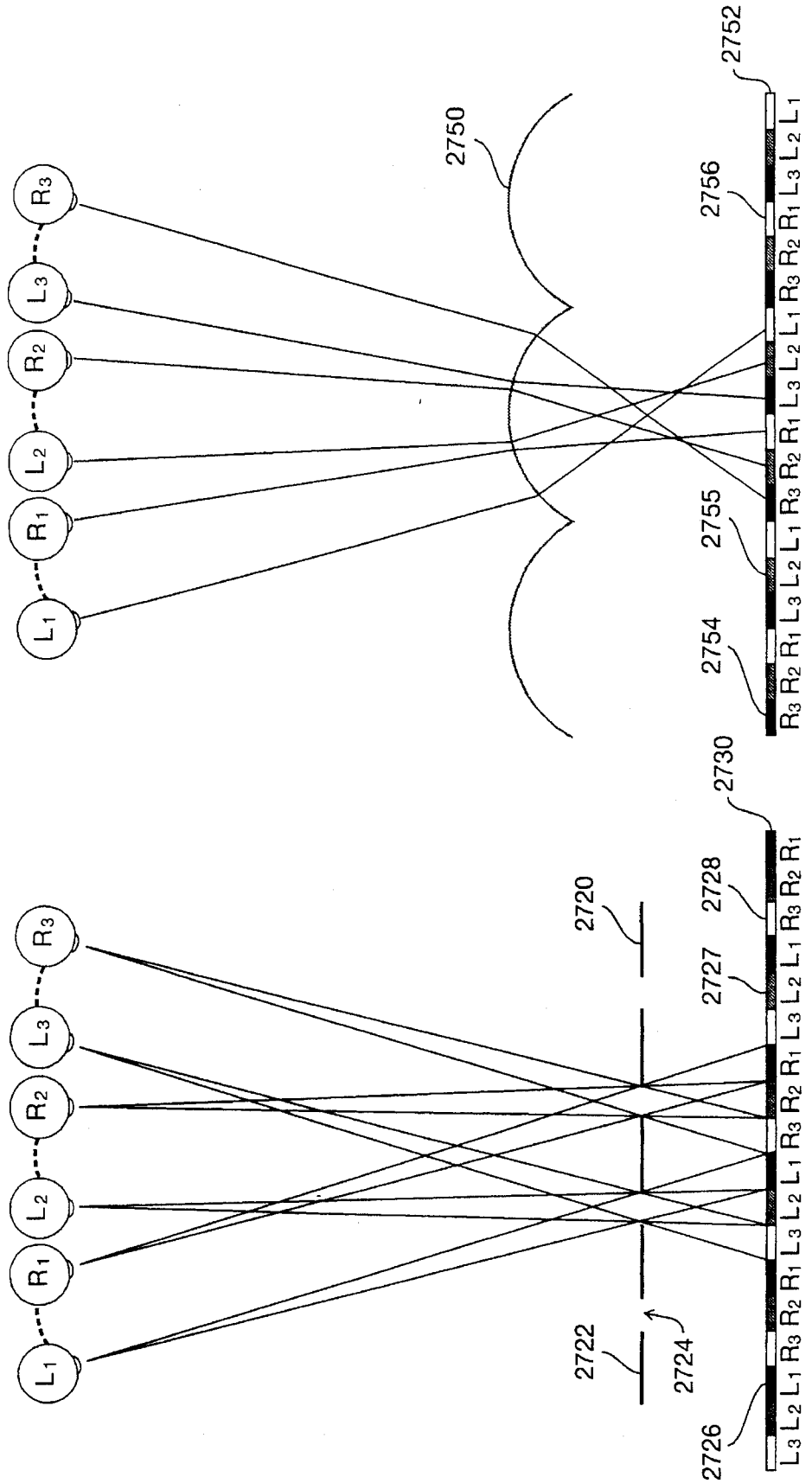

5,494,445

PROCESS AND DISPLAY WITH MOVEABLE IMAGES

RELATED APPLICATIONS

This application is a continuation-in-part of allowed application Ser. No. 08/025,149, filed Mar. 2, 1993, now U.S. Pat. No. 5,364,274, of Yoshi Sekiguchi for a Process and Display with Moveable Images, presently before Examiner G. Richman in Group Art Unit 3302; which is a continuation-in-part of application Ser. No. 07/815,420, filed Dec. 31, 1991 of Yoshi Sekiguchi for a Process and Display with Moveable Images, now U.S. Pat. No. 5,197,886; which is a divisional application of application Ser. No. 07/447,064, filed Dec. 7, 1989, of Yoshi Sekiguchi for a Process and Display with Moveable images, now U.S. Pat. No. 5,098,302, issued Mar. 24, 1992.

BACKGROUND OF THE INVENTION

This invention pertains to displays and, more particularly, to advertising and educational displays.

Conventional print advertising and packaging is accomplished by printing stationary non-moveable information and pictures on magazines, newspapers, brochures, flyers, posters, billboards, signs, wrapper, boxes, etc. While many conventional print advertisement and packages (trade dress) are interesting, most are not. A primary purpose of a good advertisement and trade dress (package) is to attract the attention of the reader (customer) and convey the desired information. Unfortunately, many print advertisements and packages do not attract the attention of customers.

In an effort to attract the customer's attention, various types of electrical signs have been installed, such as illuminated signs, including neon signs, billboard illuminated with flood lights and spot lights, marquees with moving messages, blinking lights, etc. Electrical signs, however, are often very costly, bulky, and difficult to repair. Electrical signs are also not practical for packages, magazines, newspapers, etc. nor for educational games for small children.

Over the years, many types of toys and gadgets have been developed or suggested with moveable, non-electrical powered pictures, such as: kaleidoscopes, zoetropes, praxinoscopes, kinetoscopes, viewmaster devices with rotating discs, manual and crankable flip cards, laminated plastic keychains, and sheets with moveable overlays to illustrate rotating wheels and smoke billowing from locomotives. Many of the toys and gadgets are interesting but are not useful in billboards, signs, educational games, wrappers, boxes and other packages.

It is, therefore, desirable to provide an improved display which overcomes most, if not all, of the preceding problems.

SUMMARY OF THE INVENTION

An improved process is provided for producing an attractive, aesthetic display with superb marketing and advertising appeal. Advantageously, the novel process is efficient, effective, and economical. Desirably, the high quality display is easy-to-use, impressive to view and pleasing to see and readily and accurately conveys the information being displayed. The display can also feature moveable messages and high quality images which move without the need and cost of expensive electrical equipment.

To this end, the process comprises generating at least two images (objects) with a computer or other central processing unit (CPU). The first image can be produced either creating original illustration/design or other graphic elements or by optically scanning or electronically reading the desired image (indicia) from a photograph, magazine, brochure, document, or other media and transmitting the image to a monitor or display screen of the CPU. The second image can be generated in a manner similar to the first image or by electronically copying and subsequently altering and modifying the first image on the monitor. At least one and preferably all the images are then masked, electrically revised and striped on the CPU by electronically removing erasing, canceling, or otherwise deleting a symmetrical pattern of spaces on the images to form masked images with a spaced array of stripes comprising viewable opaque portions with spaces positioned between and separating the stripes.

The images can comprise perspectives providing three dimensional appearing intermediate images attained by generating left images viewable by a left eye and right images viewable by a right eye on the CPU. The left and right images can be laterally aligned and combined.

After masking, part or all of the portions of the masked images are overlayed, superimposed, and combined upon each other in offset relationship so that the viewable stripes of one image are positioned in the spaces (spacer portions) of another image. The superimposed images or illustrations are printed on an underlying web or rearward web, such as on coated backing paper. If desired, the web can be made of other materials, such as wood, metal, glass, composites, paper, paperboard, or cardboard, preferably or substantially planar or flat, flexible sheets.

The images also can be printed in black an white or in different colors, if desired. The images can be words, letters, photographs, pictures, portraits, or be of different configurations and designs and can have indicia thereon, if desired.

A set, series, or array of transparent viewing members, comprising an array of transparent rods, a plate lens, lenticular lens, or a cluster of lenses, preferably anamorphic lenses, can be spaced in front of the superimposed images of the rearward web so that only one of the images can be viewed from one angle of observation and a different images can be viewed from other angles of observation. The angles of observation can be changed if the observer moves, if the rearward web moves, or upon moving the transparent rods or lens(es). The space between the rearward web and the lens(es) or transparent rods can be empty (void) or occupied with transparent material or spacers. One or both sides or surfaces of each lens or transparent rod can be convex, concave, curved, conical, rectangular, cylindrical, planar, or flat. Lines or bars can also be etched or otherwise placed upon each lens or transparent rods. These lines or bars can be horizontal, vertical, diagonal, angular, curved, parallel, skewed, radiant or radial from points within or outside the lens or rod. The lens(es) and rods magnify the images and provide animation and the appearance of movement of the images to the observer as the observer's angle of sight changes.

A grid or grid-like pattern or sleeve can also be placed in front of the superimposed images of the rearward web in lieu of or along with the lens(es) or transparent rods. The grid can be printed on a front web, preferably initially on a plastic sheet of film, to provide an overlay (grid overlay), mask, and screen. The grid has a special arrangement of transparent void spaces which provide a series of windows to view one of the viewable portions of one of the images while the other images are blocked from view by opaque bars (rules) between the windows. One or both of the webs can be moved in a longitudinal, lateral, lateral, and/or arcuate direction or can pivot. The stripes of the images can have a lesser or greater spacing or thickness than the bars of the grid to attain reverse or concurrent movement in the direction of the front web (grid) or underlying (back) web.

The display can be in the form of: a video cassette case, audio cassette case, ornament, decorative collector plate, Christmas tree ornament, paper weight, clothing, shirt, T-shirt, sweatshirt, jacket, hat, vehicle display sign, vehicle decal, book, sculpture, framed picture, picture stand, clock, watch, stamp, button, decorative fashion pin, window sticker, rotating display, scrolling display, game, ornament, decorative collector plate, award plaque, bookend, container, cup, glass, bottle, mug, insulating multi-walled mug, package, box, carton, wrapper, lampshade, magazine, comic book, paper back book, hard back book, cover, page, envelope, pamphlet, brochure, business card, greeting card, trading card, baseball card, basketball card, football card, soccer card, hockey card, sports card, card depicting at least one country or rock singer or musician, compact disc cover, or laser disc cover. The images can comprise perspectives providing three dimensional appearing images.

The rearward web can also be stationary, such as for use in a sign or billboard. The sign or billboard has a frame surrounding and secured to the webs and posts, columns, stands, hooks or wall fasteners to elevate the frame above the floor or ground. Desirably, the images change or move in the sign when the observer moves.

The display can also be in the form of an educational game and toy with a housing to peripherally enclose a stationary front webs (grid). The rearward web can comprise a scroll connected to cylindrical roller which are rotated by knobs, cranks, handles, or other manually grippable controls. The game can further be constructed to receive interchangeable cassette or cartridges containing one or both of the webs and different images thereon. The images change or move when the scroll is rotated clockwise or counterclockwise. In some circumstances, it may also be desirable to have an educational game and toy with a moveable front web.

The display can also be in the form of a package, such as for a candy bar wrapper, box of candy or carton. The novel package has a cover which comprises a transparent outer sleeve. The transparent sleeve partially encloses and slides upon the wrapper or box. In the package, the top of the wrapper or box comprises the rearward web. The top of the cover comprises the front web. When the cover is slid off or moved along the box or wrapper, the images change or move.

The display can further comprise a rotatable display or book with a stationary front web having a radial grid and a rotatable disc or wheel providing a rotatable rearward web with radial superimposed images thereon. In some circumstances, it may be desirable that the front web comprise a rotatable disc or wheel while the rearward web can be stationary or also rotate.

The display can also be in the form of a container assembly. The container assembly can comprise a display container, such as a cup, glass, bottle, mug, insulating multi-walled mug, box, carton, wrapper, package, a video cassette case, audio cassette case. The container comprises the rearward web with superimposed (combined) images thereon. The container assembly has a cover which comprises a transparent outer sleeve. The transparent sleeve partially encloses, slides and rotates upon the container. When the sleeve is rotated, slid or moved along the container, the images change or move. If desired, the sleeve can comprise stationary transparent outer shell (cup) providing a grid, such as for a thermal mug. Furthermore, the sleeve can comprise stationary lenses or rods which magnify the images of the container and provide animation and the appearance of movement of the images to the observer as the observer's angle of sight changes.

The container assembly can also comprise a bottle with superimposed images on the backside and a grid on the front side. When water or other transparent liquid is placed in the bottle to a height above the images, the liquid functions as a lens to magnify the images.

The display can also comprise an information display for use as part of the cover or inside of a magazine, comic book, paper back book, hard back book, book cover, page, envelope, pamphlet, greeting card, trading card, baseball card, basketball card, football card, soccer card, hockey card, sports card, card depicting at least one country or rock singer or musician, compact disc case, laser disc case, brochure, video cassette case, or audio cassette case. The information display provides an assembly with a pocket having a transparent outer sleeve comprising a grid. The transparent sleeve covers the front web with superimposed (combined) images thereon. The transparent web can be stationary and the sleeve can moveable so that it can be pulled, rotated or otherwise slide in the pocket. When the web slides or moves along the pocket, the images on the information display change or move. If desired, the web can be stationary and the sleeve can move. Also, lenses or rods can be used in lieu of the grid. Pop up grids for greeting cards can also be used.

The display can further be in the form of a lampshade assembly. The lampshade assembly can have a truncated, frustroconical, or cylindrically shaped lampshade and has a cover which comprises a transparent outer sleeve. The lampshade comprises the rearward web. The transparent sleeve can partially enclose, slide and rotates upon the lampshade. The sleeve provides a grid which comprises the front web. When the sleeve is rotated, slid or moved along the lampshade, the images change or move. If desired, the sleeve can comprise stationary transparent rods or lenses as described above. The lenses and rods magnify the images of the lampshade and provide animation and the appearance of movement of the images to the observer as the observer's angle of sight changes.

The display also can be used in or form part of other articles of manufacture and are useful to display advertising, marketing, promotional, educational, government, and safety material, messages, and other information.

As used in this Patent Application, the term "striping" means forming an image with substantially parallel stripes.

The term "striped" as used in this Patent Application, means an image comprising substantially parallel stripes, radial stripes, or dotted lines.

The term "superimposed" as used in this Patent Application, means that portions of the images are combined and placed upon each other.

The terms "image" and "images" as used in this Patent Application mean printed, painted, or written information, photographs, pictures, illustrations, designs, symbols, objects, words, and/or letters.

A more detailed explanation of the invention is provided in the following description and claims taken in conjunction with the accompanying drawings.

BRIEF DESCRIPTION OF THE DRAWINGS

FIG. 1 is a perspective view of a central processing unit and optical scanner for producing a display in accordance with principles of the present invention;

FIG. 2 is a perspective view of a display sign;

FIG. 3 is a front view of the rearward web, providing a backing sheet with underlying images, of the display sign;

FIG. 4 is a front view of the front web (overlay) of the displays sign;

FIG. 5 is a front view of the display sign, with the front web placed in front of the rearward web, and illustrating the first image;

FIG. 6 is a front view of the display sign, with the front web placed in front of the rearward web, and illustrating the second image;

FIG. 7 is a masked image (object) of an A;

FIG. 8 is a masked image (object) of a B;

FIG. 9 illustrates superimposed (combined) masked images A and B;

FIG. 10 illustrates a grid placed over the superimposed (combined) masked images A and B so as to only display the first image comprising the letter A;

FIG. 11 illustrates the grid moved by half of one grid (bar) unit over the superimposed masked images A and B;

FIG. 12 illustrates the grid placed over the superimposed (combined) masked images A and B so as to only display the second image comprising the letter B;

FIG. 13 is an image (object) of an A;

FIG. 14 is a front view of a mask (grid);

FIG. 15 is a masked image of an A produced by masking the grid of FIG. 14 on the image of FIG. 13;

FIG. 16 is an image comprising a grid pattern;

FIG. 17 is a mask of an outline (stencil) of the letter A;

FIG. 18 is a masked image of an A produced by masking the mask of FIG. 17 on the image of FIG. 16;

FIG. 19 illustrates two solid intermediate dolphin images;

FIG. 20 illustrates two masked striped dolphin images;

FIG. 21 illustrates two superimposed (combined) dolphin images;

FIG. 22 illustrates a front web (overlay) comprising a radial grid;

FIG. 23 illustrates the radial grid of FIG. 22 placed over the superimposed (combined) dolphin images so as to only display the first image, and showing in dotted line part of the rear wheel comprising the rearward web;

FIG. 24 illustrates the radial grid placed over the superimposed (combined) dolphin images so as to only display the second image, and showing in dotted line part of the rear wheel comprising the rearward web;

FIG. 25 is a perspective view of a wrapper of a composite candy bar display package in accordance with principles of the present invention;

FIG. 26 is a perspective view of a cover of the composite candy bar display package:

FIG. 27 is a perspective view of the composite candy bar display package with the cover about the wrapper so as to only display the first image;

FIG. 28 is a perspective view of the composite candy bar display package with the cover about the wrapper so as to only display the second image;

FIGS. 29 and 30 illustrate images appearing to move in the same and opposite directions as the underlying rearward web;

FIGS. 31–33 illustrate a three image display;

FIGS. 34–37 illustrate a four image display;

FIG. 38 is a perspective view of an educational display game with the underlying web positioned to only display the first images;

FIG. 39 is a perspective view of the educational display game of FIG. 38 with the underlying web positioned to only display the second images;

FIG. 40 is a perspective view of an educational display game with a removable cassette;

FIG. 43b is a perspective view of a sleeve, which provides a grid that slides over and rotates upon the cup of FIG. 43a;

FIG. 49 is a perspective view of an information display assembly comprising an envelope with a pocket having a rear web wall with superimposed (combined) butterfly images thereon and a front web wall comprising a slidable grid placed in a position so as to display only one of the images;

FIG. 50 is a perspective view of the information display assembly of FIG. 49 but with the grid pulled slightly to the right to display a different one of the images;

FIG. 51 is a perspective view of another information display assembly comprising a cover or interior page of a magazine or book with a pocket having a rear wall with superimposed (combined) butterfly images thereon and a front wall comprising a slidable grid placed in a position so as to display only one of the images;

FIG. 52 is a perspective view of the information display assembly of FIG. 51 but with the grid pulled slightly to the right to display a different one of the images;

FIG. 53 is a perspective view of a further information display assembly comprising a cover or interior page of a magazine or book having a rear web wall with superimposed (combined) butterfly images thereon and a front web wall comprising a lenticular lens viewed from one angle of view so as to display only one of the images;

FIG. 54 is a perspective view of the information display assembly of FIG. 53 but viewed from a different angle of view so as to display a different one of the images;

FIG. 55 is a perspective view of still another information display assembly comprising a greeting card having a rear web wall with superimposed (combined) butterfly images thereon and a pop up front web wall comprising a grid viewed from one angle of view so as to display only one of the images;

FIG. 56 is a perspective view of the information display assembly of FIG. 55 but viewed from a different angle of view so as to display a different one of the images;

FIG. 57 is a perspective view of a further information display assembly comprising a greeting card having a rear web wall with superimposed (combined) butterfly images thereon and a front web wall comprising a grid having its left edge glued or otherwise fastened to the facing page (back of the cover) and with the grid in a position so as to display only one of the images;

FIG. 58 is a perspective view of information display assembly of FIG. 57 but with the grid pulled slightly to the left to display a different one of the images;

FIG. 59 is an assembly perspective view of an information display assembly comprising a display card for a compact disc case providing a rear wall with superimposed (combined) butterfly images thereon and an outer cover for the compact disc having a front wall comprising a grid;

FIG. 60 is a perspective view of information display assembly of FIG. 59 but with the display card inserted inside the cover and the grid positioned at an angle of view to display only one of the images;

FIG. 65 is an exploded assembly view of cassette case display assembly for video tapes and audio tapes;

FIG. 66 is a perspective view of the cassette case display assembly of FIG. 65;

FIG. 67 is an exploded assembly view of a thermal insulating mug display assembly;

FIG. 68 is a perspective view of the thermal insulating mug display assembly of FIG. 67;

FIG. 69 is an exploded assembly view of a decorative plate display assembly;

FIG. 70 is a perspective view of the decorative plate display assembly of FIG. 69;

FIG. 71 is a perspective view of a business card display assembly without the grid;

FIG. 72 is a perspective view of a business card display assembly with the grid being inserted;

FIG. 73 is a perspective view of a business card display assembly with the grid fully inserted;

FIG. 74 is an exploded assembly view of a decorative window sticker display assembly;

FIG. 75 is a perspective view of the decorative window sticker display assembly of FIG. 74;

FIG. 76 is an exploded assembly view of a Christmas ornament display assembly;

FIG. 77 is a perspective view of the Christmas ornament display assembly of FIG. 76;

FIG. 78 is a perspective view of a decorative paperweight display assembly;

FIG. 79 is an exploded assembly view of the decorative paperweight display assembly;

FIG. 80 is a perspective view of a rotating information display;

FIG. 81 is a perspective view of a scrolling information display;

FIG. 82 is a perspective view of a vehicle sign display assembly;

FIG. 83 is an exploded assembly view of the vehicle sign display assembly;

FIG. 84 is an exploded assembly view of a decorative shirt display assembly;

FIG. 85 is a perspective view of the decorative shirt display assembly of FIG. 74;

FIG. 86 is an exploded assembly view of a book display assembly with pages that slide sideways;

FIG. 87 is a perspective view of the book display assembly of FIG. 86;

FIG. 88 is an exploded assembly view of a book display assembly with pages that slide up and down;

FIG. 89 is a perspective view of the book display assembly of FIG. 88;

FIG. 90 is an exploded assembly view of a award plaque display assembly;

FIG. 91 is a perspective view of the award placque, display assembly of FIG. 90;

FIG. 92 is an exploded assembly view of a sculpture placque display assembly;

FIG. 93 is a perspective view of the sculpture display assembly of FIG. 92;

FIG. 94 is an exploded assembly view of a superimposed (combined) striped image of a baseball player for use in a baseball card display assembly;

FIG. 95 is an exploded assembly view of a baseball card display assembly;

FIG. 96 is a perspective view of the baseball card display assembly of FIG. 95;

FIG. 97 is an exploded assembly view of a framed picture display assembly;

FIG. 98 is a perspective view of the framed picture display assembly of FIG. 97;

FIG. 99 is a perspective view of a display stand assembly;

FIG. 100 is an exploded assembly view of the display stand assembly of FIG. 99;

FIG. 101 is a perspective view of another display stand assembly;

FIG. 102 is an exploded assembly view of the display stand assembly of FIG. 101;

FIG. 103 is an exploded assembly view of part of a clock display assembly;

FIG. 104 is a perspective view of the clock display assembly;

FIG. 105 is a perspective view of a watch display assembly;

FIG. 106 is an exploded assembly view of part of the watch display assembly of FIG. 105;

FIG. 107 is an exploded assembly view of another watch display assembly;

FIG. 108 is an exploded assembly view of a stamp display assembly;

FIG. 109 is a perspective view of the stamp display assembly of FIG. 108;

FIG. 110 is an exploded assembly view of a decorative button and pin display assembly;

FIG. 111 is a perspective view of the decorative button and pin display assembly of FIG. 110;

FIG. 112 is a perspective view of three images including a pyramid, box and cylinder;

FIG. 113 is a perspective view of FIG. 112 as viewed from the left eye;

FIG. 114 is a perspective view of FIG. 112 as viewed from the right eye;

FIG. 115 is a perspective view of the images of FIG. 112 moved in a different position;

FIG. 116 is a perspective view of FIG. 115 as viewed from the left eye;

FIG. 117 is a perspective view of FIG. 115 as viewed from the right eye;

FIG. 118 is a perspective view of the images of FIG. 115 moved in a different position;

FIG. 119 is a perspective view of FIG. 118 as viewed from the left eye;

FIG. 120 is a perspective view of FIG. 118 as viewed from the right eye;

FIG. 123 is a front view of the superimposed (combined) left and right eye images;

FIG. 124 is a diagram of 3D appearing images viewed from different positions through a grid; and FIG. 125 is a diagram of 3D appearing images viewed from different positions through a transparent viewing member (magnifying web), such as plate lenticular lens.

DETAILED DESCRIPTION OF THE PREFERRED EMBODIMENTS

Figure 41:
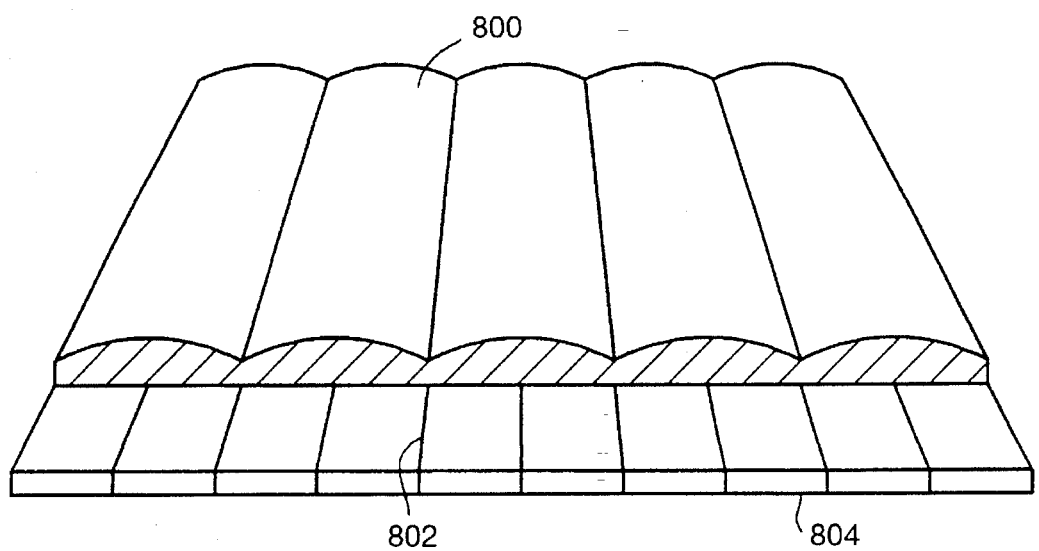
FIG. 41 is a perspective view of a lens positioned in front of an underlying web with superimposed images.

An efficient accurate timesaving process is provided to produce an attractive quality display 100–118 of FIGS. 2–40 with moveable images 120–154 providing a graphic display device and assembly comprising moveable pictures, words, letters, symbols, designs, or other indicia or information. In the process an overlying grid-like pattern 160–176 providing a grid and at least two images 120–154, including intermediate, unscreened, unmasked, non-striped (unstriped), substantially solid images, generated, electrically created, produced, and formed on a central processing unit (CPU) 200 (FIG. 1) comprising a computer 202 and displayed, projected, and viewed on a monitor 204 comprising a screen of the central processing unit 200. The grids (grid-like patterns) and images illustrated in the drawings of this patent application, as well as other grids and images, were generated on an Apple Macintosh (Mac II) computer with Adobe Illustrator 88 1.9.3 software. Other computers and art and graphic software, such as Aldus FreeHand software, can be used, if desired.

The grid (grid-like pattern) 160–176 comprises a matrix and mask with a set, series, and array of aliquot evenly spaced, uniform, elongated opaque bars 300–316 comprising stripes or rules and a set, series, and array of aliquot, evenly spaced, uniform slit-like void spaces or slits providing elongated windows 320–336 or striped slit-like port holes between the bars. Preferably, all the bars in a grid have the same thickness, are uniformly spaced from each other, and have a similar shape and size. The bars can comprise radial bars 306 with radial portions that extend radially as shown in FIGS. 22–24, or can comprise curved bars with curved arcuate portions, or can comprise horizontal bars, diagonal bars, or preferably vertical bars 300–304 and 308–316 with parallel, straight vertical striped portions. Desirably, all the windows in a grid have a similar size and shape. The size, shape, and spacing of the grid can be modified by the operator or designer via the control keys (buttons) 206 (FIG. 1) of the computer.

When the mask (grid) is generated on the CPU with an Adobe Illustrator 88 1.9.3 software program, the ends of the bars can be connected outside of the area which is used to mask and cover the underlying images; the mask appears in black and white when the program is in an artwork and template mode; and the mask appears transparent when the program is in the preview illustration mode, such as during masking and to preview superimposed (combined) images preparatory to printing.

The first intermediate, unscreened, unmasked, non-striped striped (unstriped), image can be created, originated, and generated by the designer on the computer 202 and monitor 204, or can be produced by initially optically scanning and electrically reading the desired image 400 on an optical scanner 208 (FIG. 1) from a sheet of paper 402, such as from a magazine, newspaper, brochure, etc. During testing, numerous images were scanned on a Dest PC Scan Plus scanner with Publish Pac 1.11 scanning software. Other types of scanners and software scanning programs can be used, if desired.

The scanned image 400 (FIG. 1) is transmitted to the monitor 204 via a cable wire 210 and moved to a position on the screen 204 away from the grid. The first intermediate image can be enlarged and reduced, expanded or contracted, in whole or in part, by the operator or designer via the computer control keys 206 of the CPU 200. The interior portions of the first intermediate image (pattern), which can be bounded and enclosed by the periphery and outline of the image, can be generated and electrically painted in a selected solid color, such as with the Adobe Illustrator 88 1.9.3 software program, if desired, by the operator or designer via the computer control keys 206 of the CPU 200.

The second image can be substantially or entirely different than the first image, such as the second image 124 of FIG. 8. The second intermediate, unscreened, unmasked, non-striped (unstriped) image can be created, originated generated, and produced, in whole or in part, in a manner similar to the method described above for the first intermediate image. Preferably, however, the second intermediate, unscreened, unmasked, non-striped is produced by electrically copying the first intermediate image, such as the first intermediate, unscreened, unmasked, nonstriped, solid dolphin image 404 of FIG. 19, to form a copied, duplicate intermediate second image. The second intermediate image can be moved or otherwise placed on the screen 204 of the CPU 200 at a different location than the first intermediate image or vice versa. In some circumstances, it may be desirable that the copied, unmasked, second intermediate image be identical to the first intermediate image and merely positioned at a different location or electrically painted in a different color. It is usually preferred, however, to subsequently alter, revise, and modify at least a part of the overall design, appearance, and shape of the copied intermediate image until the desired intermediate image is attained, such as the revised, second intermediate, unmasked, unscreened, non-striped, solid dolphin image 406 of FIG. 19 with a raised tail and lowered fin, so that a substantial portion of the second intermediate image is different than the first intermediate image. This can be accomplished by the operator or designer via the computer control keys 206 (FIG. 1) of the CPU 200.

Additional intermediate and final images, such as a third image 137 (FIG. 33) and 141 (FIG. 36), fourth image 142 (FIG. 37), etc., can be formed by following a sequence of steps similar to that described above for producing (generating) the second image.

In order to form the final, completed striped images, such as the striped image 123 of FIG. 15, each of the intermediate images are electrically masked, screened, stenciled, and striped. This is accomplished by sequentially moving and overlaying the grid (mask) or duplicate grids, such as the grid 164 of FIG. 14, on the intermediate images, such as the intermediate solid image 408 of FIG. 13, and electrically deleting, erasing, and removing portions of the intermediate image behind the bars 304 (FIG. 14) of the grid 164, via the computer control keys 206 (FIG. 1) of the CPU 200. With the mask (grid) is generated on the CPU with Adobe Illustrator 88 1.9.3 software program, the grid is transparent in the preview illustration mode and need not be moved from the masked image. With other programs, it may be desirable that the grid be returned to its original location or moved to another location on the monitor of the CPU.

While the above method is preferred for best results, in some circumstances it may be desirable that the first intermediate image comprise stripes 410 (FIG. 16), that the mask or grid comprise an outline, such or outline 412 (FIG. 17), and that during masking, the exterior extraneous portions of the intermediate striped image 410 (FIG. 16) located outside of the outline 412, be deleted to form the final striped image 423 (FIG. 18).

Each of the completed striped, masked, screened final images has a set, series, and array of aliquot, evenly spaced, uniform stripes 421–454 comprising elongated viewable opaque portions or dotted lines and a set, series, and array of aliquot, evenly spaced, uniform spacer portion or spaces 460–466 between the stripes. Preferably, the stripes of all the images in each display are uniformly spaced from each other and have a similar size and shape. The stripes can comprise radial stripes, such as radial stripes 426 and 427 (FIG. 20) with radial portions that extend radially, as illustrated in the first and second striped, masked, screened, dolphin images 426 and 427 of FIG. 20. The stripes can also comprise curved stripes or curved dotted lines, such as 421 and 422 of FIG. 3, or stripes with curved portions, such as 431 and 432 of FIG. 25. Furthermore, the stripes can comprise horizontal stripes, diagonal stripes, or preferable vertical stripes, such as 423 and 424 (FIGS. 7 and 8) with striped portions. Desirably, all the spacer portions between the stripes in an image are of a similar size and shape.

During masking, screening, and striping, the viewable stripes are positioned behind the windows of the grid and the spacer portions are obstructed and blocked from view behind the bars of the grid. The width of the strips (stripes) generally correspond to the width to the windows of the grid.

Preferably, the images are electrically formed, masked, and striped in accordance with the following formula:

$$B_w = O_w - I_1$$

wherein $B_w$ = width of the opaque bars of the grid or grid-like pattern;

$O_w$ = overall combined width of the stripes of all the images;

$I_1$ = combined width of the stripes of the first image.

After masking and striping, the masked images are moved, superimposed, combined, and aligned in offset relationship to each other, via the computer control keys 206 (FIG. 1) of the CPU 200 so that at least a portion of the stripes of the image are aligned in registration with and superimposed upon part of the spacer portions of the adjacent image(s) and vice versa, such as shown in superimposed images 120 (FIG. 3), 125 (FIG. 9), 128 (FIG. 21), 130 (FIG. 25), and 452 (FIGS. 39 and 39).

The grid can be printed on first elongated front web, preferably a transparent plastic web comprising transparent semi-rigid shape-sustaining portions, to provide an overlay (overlay grid), screen, and mask. The superimposed images (illustrations) can be printed on a second elongated rearward back web, such as on an elongated paper web, a flexible plastic, or some other backing sheet, to provide the underlying illustrations and information. Printing can be accomplished with Linotronic model 300 printer and printed with four color separation on film as a negative or positive. Proofs can be developed with chromaline four piece laminated film or with progressive proofs bonded together or by short run proof printing, and subsequently printed on the desired paper, paperboard, plastic coated paper, or web. The print can be enlarged for billboards with a Mega Print printer. Other types of printers can be used.

The display comprises the front and rearward webs, which are preferably positioned parallel to each other. When the rearward web is placed behind the front web, the stripes of only one of the images can be viewed through the windows of the grid while the bars of the grid block and obstruct the view of the stripes of the other images, until one of the webs is moved or the observer changes positions and the stripes of another image become viewable through the windows of the grid, etc. creating the illusion of movement. The grid overlay is preferably at least as large as the moveable portions of the superimposed underlying images.

For best results for a two image display, the relationship of the width of the bars of the overlay (overlying) grid, the width of the stripes of the superimposed images, and the distance and spacing between the front web (overlay) and the rear web comprising the underlying images, to the focal point of the observer, are in accordance with the following formulas:

$$S = B - D$$

and $$A/B = C/D$$

wherein

S=the spacing (distance) between the front web (overlay) and the rearward web comprising the underlying images B=the distance between the rearward web and the focal point (location) of the observer D=the distance between the front web and the focal point (location) of the observer A=maximum width of any stripe of the underlying superimposed images C=maximum width of any bar of the grid overlay Therefore, if the overlay (front web) is placed against the rearward web, such as in the illustrated candy bar composite package of FIGS. 27 and 28,, the maximum width of the bars of the grid should be equal to the maximum width of the stripes of the superimposed underlying images. If the overlay (front web) is spaced in front of the rearward web, such as in the illustrated display sign of FIG. 2 and the educational display game of FIGS. 38–40, the maximum width of the bars of the grid can be smaller than the maximum width of the stripes of the superimposed underlying images, to accommodate perspective phenomena.

When the overlay (front web) is placed against the rearward web, each bar of the grid is at least as wide as a corresponding stripe of any image in the display. The bars of the grid are each wider than the corresponding stripes of the images in the display when more than two images are depicted in the display. For a two image display, i.e. a display with only two images, such as shown in FIGS. 7–12, each bar 302 of the grid 162 preferably has the same width as any one stripe 423 or 424 of the images 123 and 124. For a three image display, i.e. a display with only three images on a rearward web 477, such as shown in FIGS. 31–33, each bar 310 of the grid 170 has a width about equal to the combined width of two stripes of the images 135–137. The three image display 108 of FIGS. 31–33 has a three step, 6 point rule with three point spaces. For a four image display 110, i.e. a display with only four images on a rearward web 479, such as shown in FIGS. 34–37, each bar 312 of the grid 172 has a width about equal to the combined width of three stripes of the images 139–142, etc.

As shown in FIGS. 29 and 30, by varying (enlarging or decreasing) the spacing of the stripes of the images relative to the bars of the grid and laterally moving the front web 480 and/or the rearward web 482, the images can appear to move concurrently in the same direction as the rearward web or the front web (grid) or countercurrent in the reverse direction of the rearward web or front web (grid). For example, the 90% image in the left of FIGS. 29 and 30 has vertical stripes which are smaller in width than the vertical bars of the 100% grid so that the stripes of the left image appear to move in the same direction of the underlying rearward web 482 when the rearward web is moved laterally (sideways) in a direction perpendicular or transverse to the vertical stripes and bar. The 110% image on the right of FIGS. 29 and 30 has vertical stripes which are larger (broader) in width than the vertical bars of the 100% grid so that the stripes of the right image appear to move in the same direction as the rearward web 482 when the rearward web is moved laterally in a direction perpendicular and transverse to the vertical stripes and bars.

The composite display packaging 106 of FIGS. 27 and 28 comprises a package, box, carton, or flexible wrapper 500 (FIG. 25) and a slidable open ended, tubular cover 502 (FIG. 26). The package, box, carton, or wrapper 500 can be made of paper and coated with a glossy material, such as silicone. The wrapper 500 provides an inner containment member and shell to wrap and enclose one or more items, such as a candy bar or pieces of candy. When folded and wrapped around the candy, the wrapper has an elongated rectangular, top surface 504 (FIG. 25), an elongated rectangular, bottom surface 506, rectangular sides 508 and 510, and rectangular ends 512 and 514. A semi-rigid box or carton can be used in lieu of the wrapper to enclose more candy or items, or to enclose larger items. The open ended tubular cover 502 can be made of flexible and semi-rigid transparent plastic, such as polyethylene or polypropylene. The cover 502 provide an outer sleeve which snugly fits around, peripherally encloses, and can laterally slide upon the top and bottom surfaces 504 and 506 and sides 508 and 510 of the inner containment member (wrapper) 500. The open ended outer sleeve 502 (FIG. 26) has an elongated rectangular top 512, an elongated rectangular bottom (underside) 514, and rectangular sides 516 and 518.

The top 512 of the outer sleeve and cover 502 (FIG. 26) provides a front web. The front web 502 has a grid-like pattern or grid 168 with vertical bars 308 (as view from above the top) and spaces providing transparent windows 328 between the bars 308. The sides 516 and 518 of the cover can optionally have upright bars and windows.

The top surface 504 of the inner containment member (wrapper) 500 (FIG. 25) provides a rearward back web with superimposed images 130 thereon, including a first Good Stuff image 131 with vertical stripes 431 as viewed from above the top and a second Good Stuff image 132 with vertical stripes 432. The grid 168 (FIG. 26) and images 130–132 are preferable made in the manner previously described. When the cover (sleeve) 502 is slid along the inner containment member (wrapper) 500, such as when the cover is being removed, to unwrap the wrapper, the images 131 and 132 have the illusion of moving. For example, in the first image 131 of FIG. 27, the left O is down and the right O is up. In the second image 132 of FIG. 28, the left O is up and the right O is down, so that the double OO has the appearance of googily eyes.

The rotatable display 104 of FIGS. 23 and 24 has a stationary transparent plastic front web 520 and a rotatable disc or wheel 522 providing a rotatable rearward (back) web. The front web 520 (FIGS. 22–24) has a radial grid 166 with radial bars 306 and radial spaces providing transparent windows 326 between the bars 306. The rearward web 522 has superimposed dolphin images 128 (FIG. 21). The superimposed images 128 can include a first radially striped, dolphin image 126 as shown in FIG. 20 with radial stripes 426 and radial spaces 464 between the stripes 426 and a second radially striped, dolphin image 127 as shown in FIG. 20, with radial stripes 427 and radial spaces 466 between the stripes. A substantial portion of the stripes 426 of the first image 126 are aligned in registration and positioned in spaces 466 of the second image 127, and a substantial portion of the stripes 427 of the second image 127 are aligned in registration and positioned in spaces 464 of the first image 126 in the superimposed image 128 of FIG. 21. The grid and images are preferably made in the manner previously described. When the disc or wheel comprising the rearward web 522 (FIGS. 23 and 24) is rotated or pivoted, the images 126 and 127 have the illusion of moving. For example, in the first image 126 of FIG. 23, the tail of the dolphin is pointed down and the front lower flipper is pointed rearwardly. In the second image 127 of FIG. 24, the tail of the dolphin is moved upwardly and the front lower flipper is pointed downwardly.

The advertising display sign 100 of FIG. 2 comprises a sign assembly and billboard 600 with a rectangular frame assembly 602. The display sign 100 is useful to display and convey advertising, marketing, promotional, educational, or governmental information. The frame assembly 602 can include a rectangular front frame 604 which peripherally surrounds and is fixedly secured to the front, planar or flat, rectangular, rigid, stationary web 606 of the billboard 600. The frame assembly 602 can also include a rectangular rearward back frame 608 which peripherally surrounds and is fixedly secured to the rearward, planar or flat, rectangular, rigid, stationary underlying back web 610 of the billboard 600. Each frame can have a top elongated longitudinal horizontal beam 612, a bottom elongated longitudinal horizontal beam 614, a left upright side strut 616, and a right upright side strut 618. The upright struts 616 and 618 extend vertically between and connect the horizontal beams 612 and 614. One or more upright posts 620 and 622 or vertical columns are connected to the bottom beam 614 and provide a stand to elevate the billboard above the ground. Upright side walls 624 and 626 providing connecting members can extend between and connect the front and rear frames 604 and 608. In some circumstances, it may be desirable for the display sign to have a platform, scaffolding, braces, and/or back lit flood lights, as well as omit part or all of the back frame and side wall connecting members. If a single post is desired, it can be connected to the middle portion of the lower horizontal beam or cantilevered to a side section of the lower horizontal beam. Only one front web and one rear web is required, if the sign is mounted parallel to the traffic flow. If it is desired that the sign be positioned perpendicular or transverse to the traffic flow and that the sign display information in both opposing direction of traffic, then dual opposing front and rear webs can be used such as with a V-shaped frame assembly.

As shown in FIGS. 2 and 4, the front web 606 of the display sign 100 has a grid-like pattern providing a grid 160 with vertical bars 300 and slit-like spaces providing vertical transparent windows 320 between the bars. If solid rigid metal bars are preferred, the side struts of the front frame may be omitted, if desired. As best shown in FIG. 3, the rearward web 604 of the display sign 100 has offset superimposed images 120 including a first image 121 with stripes 421 and spaces 460, between the stripes 421, and a second image 122 with stripes 422 with spaces 461, between the stripes 422. The illustrated images are of a cowboy, a rope providing a lasso or lariat, and horses. A substantial portion of the stripes 422 of the first image are aligned in registration and positioned in spaces 461 of the second image 122, and a substantial portion of the stripes 422 of the second image 122 are aligned in registration and positioned in spaces 460 of the first image 121, in the superimposed image 120. The grid 160 and images 120–122 are preferably made in the manner previously described.

In use, when a pedestrian or other observer moves his head or changes locations, the images of the display sign 100 have the illusion of moving. For example, in FIG. 5, the cowboy's upright arm and lasso is cocked or tilted towards his head. In FIG. 6, the cowboy's upright arm and lasso have moved left and laterally outwardly away from the cowboy's head, the head of the horse the cowboy is riding is lower and the bigger horse's tail is higher than in FIG. 5, and the feet of the smaller horses in the background have changed position, to give the illusion of galloping horses.

The educational display game and toy 116 of FIGS. 38 and 39 has a rectangular frame assembly 700 providing a housing 702 which peripherally surrounds and is fixedly secured to a stationary front rectangular web 704. The housing 702 has front wall portions 706 providing the front of the housing which comprises a generally rectangular, removable front frame 708. The front frame 708 has horizontal (longitudinal) and vertical (lateral) sections 710–713 as viewed from above the front of the education al display game. The housing 702 has a back 714 which provides the back of the housing. The housing 702 also has transverse rectangular walls including horizontal side walls 716 and 718 and vertical end walls 720 and 722, which extend between and connect and are perpendicular to the back wall 714 and front 706 of the housing 702. Sets of latches 724 and 726 are connected to the side walls 716 and 718 to latch and detachably secure the side walls to the front 706 of the housing 702.

Manually grippable rotatable, control knobs 728 and 730 extend outwardly and downwardly from the lower bottom end wall 718 of the housing 702, as shown in FIGS. 38 and 39. Scrolls 732 and 734 comprising elongated parallel upright, tubular cylindrical rollers, cylindrical bars or cylinders 736 and 738 can be provided with slots or fasteners to securely grasp and hold a rearward rotatable, scrollable, flexible, moveable, back web 740. The scrolls 732 and 734 have slots or slotted teeth 742 and 744 which receive, are operatively connected to, and driven by drive teeth or lugs 746 and 748 of the control knobs 728 and 730, respectively. The scrolls (rollers) 732 and 734 and knobs 728 and 730 provide a scroll assembly, which operatively connected to the housing 702, to rotatively move the rearward web 726. The scrolls 732 and 734 are positioned within the interior of the housing 702.

In operation one of the scrolls, such 723, of the educational display game 116 (FIGS. 38 and 39) provides a lead roller or lead scroll and its associated knob, such as 728, provides a lead advance mechanism, while the other scroll, such as 734, provides a trailing roller or trailing scroll and its associated knob, such as 730, provides a trailing mechanism, or vice versa. When the lead mechanism (knob) 728 is rotated in one direction, such as counterclockwise, the lead roller 732 rotates in the same direction and rotatively moves, advances, and winds the rearward web 740. The trailing mechanism (knob) 730 and trailing roller 734 can move (follow) in the same direction as the lead mechanism (knob) 728 and lead roller 732. When the trailing roller (scroll) 734 rotates in the same direction as the trailing knob 728, to rotatively move, retract, and crank the rearward web 740 in the same clockwise direction. The other knob 728 and scroll 732 can follow (move) in the same clockwise direction. In some circumstances, it may be desirable to use cranks or other types of handles instead of knobs or it may be desirable to position the game horizontally or at an angle of inclination instead of vertically.

As shown in FIGS. 38 and 39, the front web 704 of the educational display game 116 has a grid-like pattern providing a grid 76 with vertical bars 316, as viewed from above the top of the display game, and slit-like spaces providing vertical transparent windows 336 between the bars. The rearward (back) web 740 has offset superimposed images 152 including first images 153 with stripes 453 and spaces, between the stripes 453, and second images 154 with stripes 454 and spaces between the stripes 454. The illustrated images are of a banana, balloon, and butterfly. The stripes 453 of the first images 153 are aligned in registration and positioned in the spaces of the second images 154, and the stripes 454 of the second images 154 are aligned in registration and positioned in the spaces of the first images 153, in the superimposed images 152. The grid 176 and images 152–154 are preferably made in the manner previously described.

In use, when the knobs 728 and 730 are turned, pivoted, or rotated, either clockwise or counter-clockwise, the rear web 740 will move behind the stationary front web 704, and the images have the illusion of moving. For example, in FIG. 38, the head (banana peel) of the banana is open, the left arm is stretched general horizontally, and the wings of the butterfly are fully open. In FIG. 39, the head (banana peel) of the banana is closed, the left arm is raised, the wings of the butterfly are almost closed, and the balloon has moved higher and closer to the banana than in the other FIG. 38.

The educational display game and toy 118 of FIG. 40 is functionally and structurally similar to the educational game and toy 116 of FIGS. 38 and 39, except that the scrolls 732 and 734 and rearward web 74026 are housed, enclosed, and contained in a removable cassette or cartridge 750, the upper side 716 is open to define a rectangular slot 751 to slidably receive the cassette 750, and the knobs 752 and 754 extend outwardly from the frame 708. The front 706 of the housing 702 has a rectangular opening 755 for viewing of the grid 176 of the front web 706 as well as the rearward back web 740. The inner (inwardly facing) ends of the knobs 728 and 730 can have teeth 756 and 758 or comprise level gears to engage and drive corresponding teeth 760 and 762 or gears connected to the lower ends of the scrolls 722 and 724 when the cassette 750 is properly positioned in the slot 752. The cassette (cartridge) can be replaced with other cassettes (cartridges) having different images or stories: thereon, so that many different images and stories can be displayed.

The display devices produced by the described process, provide an animation system in which animations appear as a result of movement of the overlay grid (front web), patterns or images (rearward web), and/or the observer. The display system comprises one or more grid overlays positioned upon, against, over, or partially attached to the rearward web comprising the underlying artwork, message, etc. Animation will occur, when the grid overlay is positioned against or very close to the rearward web comprising the underlying artwork (illustrations or other images) and the grid overlay or artwork is moved. Animation will also occur, when the overlay is placed apart, or partially attached to underlaying artwork, and the grid, underlaying artwork, or eye position of the observer is moved. Animation is caused by the overlay hiding and obstructing all or part of the view of the underlaying art work or message.

For repeated or stepped action, two or more artworks (images) can be sliced into pieces by means of hand work, conventional stripping, and/or preferably by the described computer technology. When one or more overlays are placed over the underlying combined images, the overlay(s) covers at least part of the underlaying images, allowing for the viewer to see only one of the two or more segments of the combined superimposed images. By moving the overlays or underlying graphics (images), or combination of the two, the viewer can see the next segment (image), while the previous segment (image) is hidden by the overlay, thereby creating an illusion of repeated, stepped action and animation.

In order to attain the illusion of movement, such as horizontal, vertical, rotating, radial, or irregular movement, the patterns (images) comprising the underlying artwork or message is interfered by from different directions, thus creating optical illusions known as moire. When the overlay (front web) and underlying images (rearward web) are placed without any space or very little space therebetween, the spacing between the stripes and bars have to correspond to cause repeated or stepped animation. Patterns on both need not be identical to create optical illusion or moire. In such situations, movement(s) of overlay(s) or underlaying element(s) or combination of both will cause animation, but movement of viewer's eye position alone can not create animation.

Grids can be vertical, horizontal, and/or at any angle. Lines can be straight, curved, and/or irregular. Preferably, the lines of the grids are evenly spaced in case the movement of any images is straight (linear). When the movement is not straight (linear), such as curved or rotating, the lines of the grid may not be parallel to each other and the spacing may be uneven. The grid can be of different sizes, spacing, or at different angles, and movements can be forward, backward, upward, downward, or in any direction, as desired by the designer. At any given pattern, the lines of the grid are substantially parallel to each other and at equal intervals and spacing when the movement is straight. Generally, the overlay grid precisely covers at least one combined pattern at a time.

When different formulations on either overlays or the underlying images are not identical to each other, many movements will be created, such as vertical, horizontal, angular, rotating, radial, curved, etc. Movement of the images is controlled by the direction, speed, and angle of movement of the webs and by the thickness, spacing, shape, and angle of the bars on the grid.

Overlays and underlying back webs are preferably flat or planar, but they can be bent, curved, cylindrical or any combination of the above.

When the overlay (front web) and underlying element (rearward web) are spaced apart from each other, or partially attached to each other, the physical size of the overlay grid should be smaller than that of the underlying elements (superimposed images), since the overlay is closer to the viewer and overlaps and show one element (image) at a time to cause repeated and stepped animation. In this case, movement of the front web, rearward web, and/or viewer's position. The display sign of this invention can create the illusion of movement and animation without any moving parts, by varying the viewer's position.

For complex objects created which contain many colors, different drawing techniques such as masking, blending, patterning, can be used. The mask can have the appearance of a comb or a brush, and enables the designer or operator to mask out and eliminate parts of the objects (image) which are located in the void spaces of the masking pattern, thereby creating masked images which are spliced and spaced into pieces. Masking pattern can be in any shape, such as curved and/or, straight, as long as the lines conform and correspond to the patterns on the overlay which will affect movement.

For a simple object with few colors, the designer can achieve the same results by first creating objects which conform the pattern on the overlay, then masking the object with the pattern which has an outline shape of the finished masked object. In this case, the splicing has already been done, so by masking with the pattern, any object outside of the pattern will be eliminated, thereby forming the masked objects.

Two masked objects can be overlapped, one right over the other very precisely, in a position so that one masked object is located in the void areas of the other object. The combined objects comprise two or more images in which the image alternate by one unit of the grid pattern.

The grid pattern placed on the combined objects (superimposed images), hides one object while showing the other object. Moving the overlay grid and/or underlying web, will create illusion of repeated and/or directional animation.

It is possible to create images combining three or more objects to perform three or more stepped motions. For three step animation, three objects are combined in the same manner described above, except void parts of a masked objects (images) are twice as wide, so two other images will be positioned into these void spaces. In such circumstances, the overlaying grid has lines (bars) twice as thick as the spaces between them, exposing one image at a time while hiding the other two images.

Four or more stepped movements are possible by increasing the numbers of objects (images) and thickness of the lines (bars) on the overlay grids.

When the grid is placed over the combined superimposed offset image, it hides all but one of the underlying images. By moving the grid, graphic or eye by one unit, the other unit of the graphic will appear while hiding the other images at the same time. The combined graphics can provide one or more repeated motions.

The overlay grid can be placed right on the graphic. In this case, the shape and spacing of the grid pattern on both the graphic and overlay exactly match. In such circumstances, animation is caused by either movement of the graphic, overlay, or combinations of the above, and movement of viewpoint alone typically will not cause animation.

When the overlay grid is placed away from the graphic, movement of either the graphic, overlay grid, location (viewpoint) of the observer, or any combination of the above, will cause animation. Even when the graphic and overlay grid are placed against each other, movement of the viewpoint will cause animation. Such animation will also occur, when the display is placed on moving vehicles and objects, such as buses, trains, elevators, etc.

Spacing of the pattern lines on the overlay grid should be smaller than that of the graphic because the overlay grid is closer to the observer (viewpoint). The distance between the overlay grid and the graphic (rearward web) can be dependent upon the distance to the observer (viewpoint) or focal point.

If desired, the space between the graphic (rearward web) and the overlay grid (front web) can be filled with transparent materials, such as transparent acrylic or other plastic, glass, etc.

By increasing the number of units of the grid line width compared to the space (3, 4, 5, etc.), animation steps can be increased (3, 4, 5, etc.). The more animation steps desired, however, the more portions of the graphic will be obstructed during viewing of other portions of the graphic.

Figure 42:
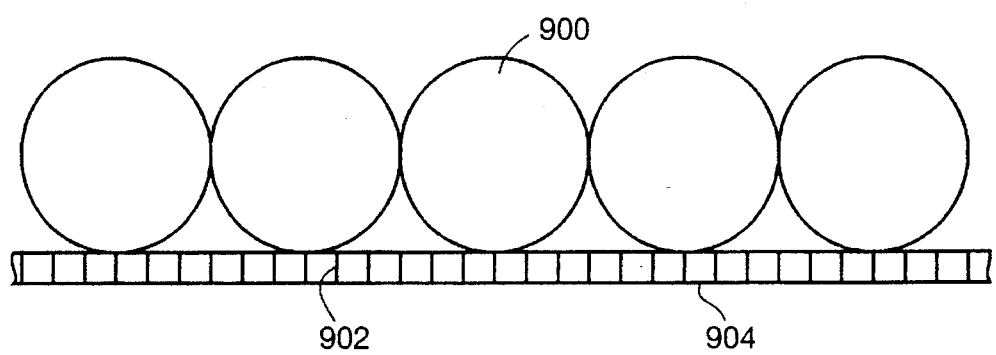
FIG. 42 is an end view of transparent rods positioned in front of an underlying web with superimposed images.

A plate lens, lenticular lens, or cluster of anamorphic lenses 800 (FIG. 41) or elongated transparent rods or bars 900 (FIG. 42) can comprise or be used in lieu of the described grids for the previously described displays, in order to provide a lens display system or a transparent rod display system. Each lens or rod can be made of glass or impact-resistant plastic. Semicircular lenticular lenses can be stamped, extruded or injection molded. Each lens or rod is placed (spaced) in front of the superimposed images 802 or 902 on the underlying or rearward web 804 or 904. The space between the lens or rods and the rearward web can be void or fully or partially filled with transparent spacer material. One or both sides or surfaces of each lens or transparent rod can be convex, concave, curved, conical, rectangular, cylindrical, planar or flat. The lens(es) or transparent rods advantageously magnify and enlarge the superimposed images 802 or 902 on the underlying or rearward web 804 or 904 and cooperate with the web 804 or 904 of superimposed images to provide the appearance of movement and animation of the images as the angle of observation changes, e.g. the observer moves his head or changes his location.

The lens(es) 800 (FIG. 41) or transparent rods 900 (FIG. 42) can also have a grid-like pattern (grid) of lines or bars thereon, similar to the grids previously shown and described. These lines or bars can be horizontal, vertical, diagonal, angular, curved, parallel, skewed, radiant or radial from points within or outside the lens or rod.

Animation systems utilizing opaque bars display only one image through its windows at any given time, while one or more images are hidden (blocked) by the opaque bars. One of two or more images are viewed progressively to create an optical illusion of animation.

An animation system or display with a plate lens, lenticular lens, or cluster of anamorphic lenses, which when placed vertically, can enlarge images horizontally while retaining the vertical scale. Each lens enlarges at least part of one image to fill up one grid's width, so that the other images are hidden from view. The viewing angle from the observer to the lens determines which image is seen. Different images appear as the angle of sight changes.

A vertical series, set, array, and matrix of transparent rods can function and be used in lieu of anamorphic lenses to enlarge the images, such as more the 600% in a perpendicular or horizontal direction, while retaining the height (vertical scale). By lining the transparent rods in side-by-side relationship to form a planar set of rods, the rods function similar to a sheet lens and can display as many as six images progressively. Transparent rods are particularly useful for large posters and billboards since manufacturing, constructing, installing, and assembling a large sheet lens or cluster of lenses for a large poster or billboard may be cumbersome, difficult, and/or expensive. The transparent rods can be spaced in front of the rearward web or can be placed in contact against the rearward web.

Preferably, the number of images should not exceed more than the rate of magnification of the lens(es). Six different images can be used with a plate lens or series (cluster) of lenses to magnify the images, such as more than 600%. Preferably, the width of the set of combined images should be about equal or less than one lens unit. For such use, the set of images should be aligned in registration to a corresponding lens unit. Two to six step motions can be used with the same graphic material. In such cases, the width of a set of any number of combined images should be equal or less than a lens unit. Because of its nature, opaque bars system may make some images appear darker, especially when two or more images are combined. The lens and rods display system solves this problem since opaque bars or a grid are not required to hide parts of the images. Because less spacing is required between rearward web and the lens(es) or transparent rods than a grid, a lens or rod display system can be more compact than a grid display system. Manufacturing and cleaning and other maintenance expenses are generally similar for the lens, rod, and grid display systems.

The information displaying container assembly 1000 of FIGS. 43*a*–43*d* is generally functional similar to the package assembly shown in FIGS. 25–28, except as described below. The container assembly 1000 has a beverage container 1010, such as a cup, glass, or mug. The container 1010 provides a display container with a front surface 1012 comprising a stationary arcuate rearward web 1014 with superimposed (combined) first and second striped images 1016–1018 thereon as described above. The images 1016–1018 on the rearward web 1014 of the container 1010 are formed in a manner similar to the images described above. The container 1010 can have tapered, slanted or upright walls 1020.

The container assembly 1000 has a tubular annular sleeve 1022 with a circular cross section. The sleeve 1022 complements the shape of the container 1010 and slides upon and rotates about the container walls 1020. The sleeve 1022 comprises a front web spaced in front of and substantially parallel to the rearward web 1014 on the container 1010. Rotation, sliding or other movement of the sleeve 1022 will vary the image being viewed to give an animation effect. The front web (sleeve) comprises a substantially transparent viewable portion with a set of aliquot slit-like spaces 1024 providing a series of substantially rectangular transparent windows for viewing only the first superimposed images from first angular position and for viewing only the second superimposed images from a second angular position.

Figure 43A:
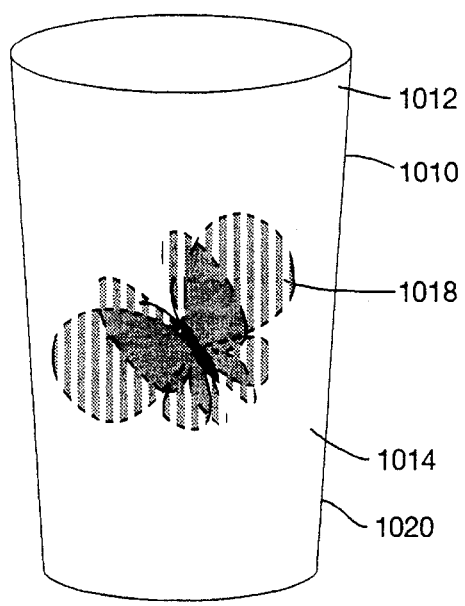
FIG. 43a is a perspective view of a cup with superimposed (combined) butterfly images.
Figure 43B:
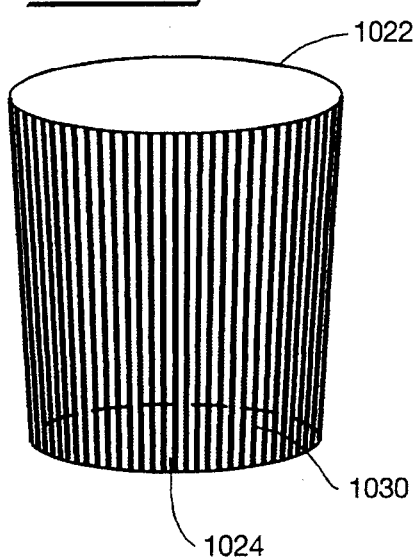
Figure 43C:
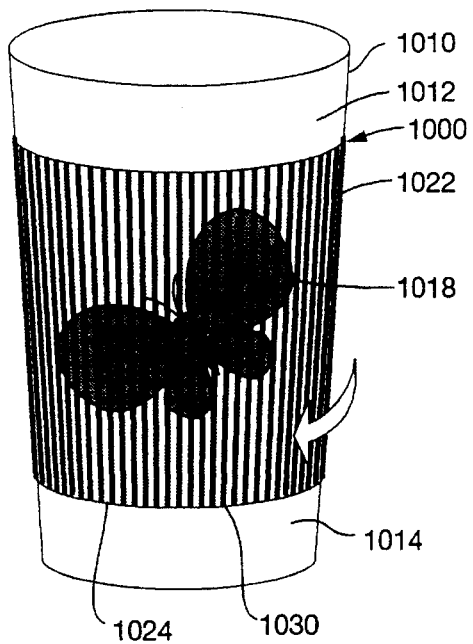
FIG. 43c is a perspective view of a container assembly with the sleeve of FIG. 43b slid over the cup of FIG. 43a so as to display only one of the images.
Figure 43D:
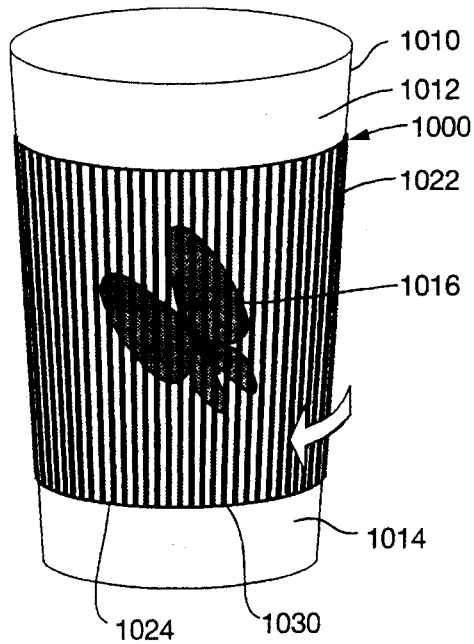
FIG. 43d is a perspective view of a container assembly similar to FIG. 43c but with the sleeve rotated so as to only display another of the images.

As shown in FIG. 43b, the sleeve has a grid-like pattern with a set of aliquot spaced opaque bars 1030 with substantially rectangular portions positioned between the rectangular windows for blocking the view of the second superimposed image from the first angular position and for blocking the view of the first superimposed image from the second angular position. The first spacer portions span a width less than the bars and are obstructed and blocked from view by the bars in the first angular position. The second spacer portions span a width less than the bars and are obstructed and blocked from view by the bars in the second angular position.

Figure 44:
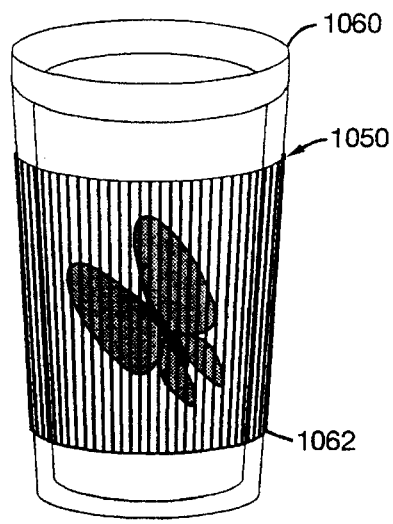
FIG. 44 is a perspective view of a thermal cup container assembly comprising an inner cup (core) with superimposed (combined) butterfly images and an outer transparent cup (shell) with a grid thereon.

The beverage and display container assembly 1050 of FIG. 44 is similar to the beverage and container assembly 1000 of FIGS. 43a–43d, except the container comprises a thermal mug 1060 with a transparent outer shell and cup 1062 having a grid thereon.

Figure 45:
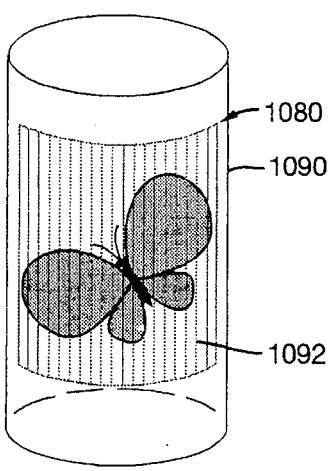
FIG. 45 is a perspective view of another container assembly comprising an inner cup with superimposed (combined) butterfly images and an outer lenticular lens placed over the images.

The beverage and display container assembly 1070 of FIG. 45 is similar to the beverage and container assembly 1000 of FIGS. 43a–43d, except the container comprises a thermal mug 1080 and the tubular transparent sleeve 1090 comprises a magnifying web 1092 for enlarging the appearance of the images and for facilitating viewing of the images on the back web of the container as the angle of view changes. The magnifying web can comprise an array of substantially transparent rods, plate lens, lenticular lens, or a cluster of anamorphic lenses, which function similar to those described in FIGS. 41 and 42.

Figure 46:
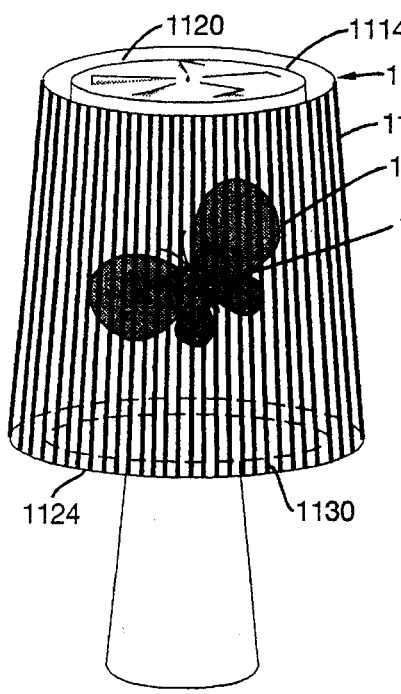
FIG. 46 is a perspective view of a lampshade assembly comprising an inner lampshade with superimposed (combined) butterfly images and an outer grid thereon.

The information displaying lampshade assembly 1100 of FIGS. 46 is generally structurally and functionally similar to the container assembly shown in FIGS. 43a–43d, except as described below. The lampshade assembly 1100 has a lampshade 1110 made of light transmissive material for permitting passage of light while minimizing glare. The lampshade can be a truncated lampshade, a frustroconical lampshade, or cylindrically shaped lampshade. Other shaped lampshades can also be used.

The lampshade 1110 comprises stationary arcuate rearward web 1114 with superimposed (combined) first and second striped images 1116–1118 thereon as described above. The images 1116–1118 on the rearward web 1014 of the lampshade 1110 are formed in a manner similar to the images described above. The lampshade 1110 can have tapered, slanted or upright walls 1120.

The lampshade assembly 1100 has a tubular annular sleeve 1122 with a circular cross section. The sleeve 1122 complements the shape of the lampshade 1110 and slides upon and rotates about the lampshade walls 1120. Rotation, sliding or other movement of the sleeve 1122 will vary the image being viewed to give an animation effect. The sleeve 1122 comprises a front web spaced in front of and substantially parallel to the rearward web 1114 on the container 1110. The front web (sleeve) comprises a substantially transparent viewable portion with a set of aliquot slit-like spaces 1124 providing a series of substantially rectangular transparent windows for viewing only said first superimposed images from first angular position and for viewing only said second superimposed images from a second angular position. The sleeve 1122 has a grid-like pattern with a set of aliquot spaced opaque bars 1130 with substantially rectangular portions positioned between the rectangular windows for blocking the view of the second superimposed image from the first angular position and for blocking the view of the first superimposed image from the second angular position. The first spacer portions span a width less than said bars and are obstructed and blocked from view by the bars in the first angular position. The second spacer portions span a width less than the bars and are obstructed and blocked from view by the bars in the second angular position.

The lampshade assembly can have a tubular transparent sleeve comprising a magnifying web for enlarging the appearance of the images and for facilitating viewing of the images on the back web of the container as the angle of view changes. The magnifying web can comprise an array of substantially transparent rods, plate lens, lenticular lens, a cluster of anamorphic lenses, which function similar to those described in FIGS. 41 and 42.

Figure 47:
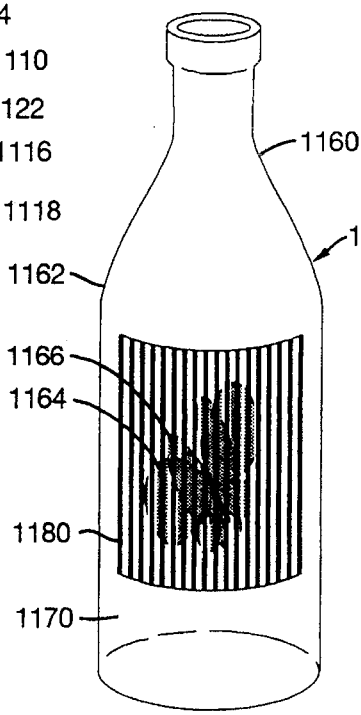
FIG. 47 is a perspective view of a further container assembly comprising an empty bottle with superimposed (combined) butterfly images on the back side wall and a grid on the opposite front side wall.
Figure 48:
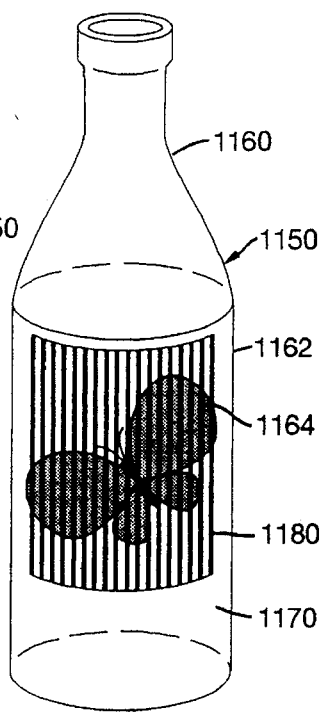
FIG. 48 is a perspective view of the container assembly of FIG. 47 but with the bottle partially filled with a transparent liquid.

The container display assembly 1150 of FIGS. 47 and 48 comprises a bottle 1160 with a rearward arcuate backwall or web 1162 having superimposed (combined) images 1164 and 1166 thereon. The front arcuate wall or web 1170 of the bottle 1160 has a grid 1180 thereon aligned diametrically opposite the images 1164 and 1166. When water or other transparent liquid is placed in the bottle above the height of the images as shown in FIG. 48, the water or liquid serves to magnify the images 1164 and 1166. The grid functions as described above with respect to FIG. 4. The images change as the angle of view of the viewer changes, The information display assembly 1200 of FIGS. 49–52 is generally functional similar to the package assembly of FIGS. 25–28 and to the displays of FIGS. 20–37, except as described below. The display assembly has an envelope 1202 (FIGS. 49–50) or other information viewing display 1210 (FIGS. 51–52), such as a magazine, comic book, paper back book, hard back book, book cover, page, brochure, or pamphlet. The information display has a pocket 1212 with a substantially flat or planar rearward web 1214 and a substantially planar flat or planar front web 1216 spaced in front of and substantially parallel to the rearward web 1214. At least one of the webs, e.g. the rearward web 1214, is moveable relative to the other web, stationary front web 1216. Pulling, pushing, sliding or other movement of the rearward (back) web 1214 will vary the image being viewed through the front web 1216 to give an animation effect. While the described arrangement is preferred, in some circumstances, it may be desirable to have a moveable front web and a stationary rearward web to produce an animation effect.

The rearward web 1214 has superimposed (combined) striped images 1218–1220 thereon which are formed in a manner similar to the images described above.

The front web 1216 comprises a sleeve with a transparent viewable portion. The front web has a set of aliquot slit-like spaces 1222 which provide a series of substantially rectangular transparent windows for viewing only the first superimposed images from a first angular position and for viewing only the second superimposed images from a second angular position. The front web 1216 has a grid-like pattern 1224, similar to that previously described, comprising a set of aliquot spaced opaque bars with substantially rectangular portions positioned between the rectangular windows for substantially blocking the view of the second superimposed image from the first angular position and for substantially blocking the view of the first superimposed image from the second angular position.

As described previously, the relationship of the width of the bars of the grid, the width of the stripes of the superimposed images, and the spacing between the front web and the rearward web, to a focal point of an observer, are in accordance with the following formulas:

$$S=B-D$$

and $$A/B=C/D$$

wherein
S=the spacing between the front web and the rearward web
B=the distance between the rearward and a focal point of the observer
D=the distance between the front web and focal point of the observer
A=maximum width of any stripe of the images
C=maximum width of any bar of the grid.

The information display assembly 1250 of FIGS. 53–54 is generally functional similar to the information display assembly of FIGS. 51–52 except that the rearward web 1252 with the superimposed images 1254 and 1256 is stationary and the sleeve (grid) comprises a magnifying web 1260 for enlarging the appearance of the images and for facilitating viewing of the images on the back web as the angle of view changes. The magnifying web can comprise an array of substantially transparent rods, plate lens, lenticular lens, a cluster of anamorphic lenses, which function similar to those described in FIGS. 41 and 42.

The information display assembly 1300 of FIGS. 55–56 is generally functional similar to the sign of FIGS. 3–6, except as described below. The display assembly 1300 comprises a greeting card 1302 with a back web 1304 having superimposed (combined) images 1306 and 1308 thereon. A pop up rectangular frame 1310, made of paperboard or plastic, secures holds a rectangular front web 1312 comprising a grid 1314. When the folded cover 1316 of the greeting card 1302 is opened, the pop up frame 1310 expands towards the viewer. Viewing of the images changes as the angle of view of the viewer changes. When the greeting card 1302 is closed, the frame 1310 is in a compressed contracted closed position.

The information display assembly 1350 of FIGS. 57–58 is generally functional similar to the information display assembly of FIGS. 51–52, except as described below. The display assembly 1350 comprises a greeting card 1352 with a back web 1354 having superimposed (combined) images 1356 and 1358 thereon. The front web 1360 comprises a moveable grid 1362. The left edge 1364 of the front web 1360 is glued, bonded or otherwise secured to the inside page 1366 of the cover 1368 of the greeting card 1352. When the cover 1368 of the greeting card 1352 is opened, the grid is pulled to the left so that the images change.

The information display assembly 1400 of FIGS. 59–60 is generally functional similar to the information display assembly 1300 of FIGS. 55–56, except as described below. The display assembly 1400 comprises a compact disc (CD) case and package assembly 1402. An insert 1404 comprises a back web 1406 having superimposed (combined) images 1408 and 1410 thereon. A transparent plastic compact disc cover 1412 has a grid 1414 thereon. Viewing of the images changes as the angle of view of the viewer changes. The cover 1412 can be etched or scratched to provide a magnifying web for enlarging the appearance of the images and for facilitating viewing of the images on the back web of the container as the angle of view changes. The magnifying web can also comprise an array of substantially transparent rods, plate lens, lenticular lens, a cluster of anamorphic lenses, which function similar to those described in FIGS. 41 and 42.

Figure 61:
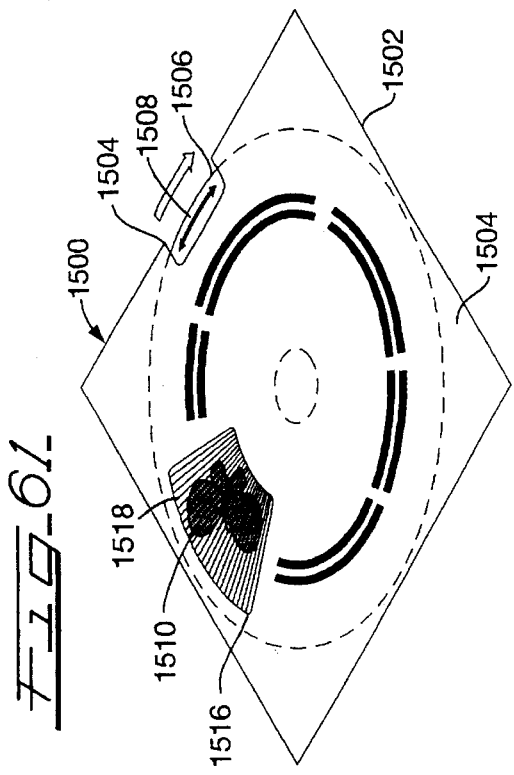
FIG. 61 is a perspective view of still another information display assembly comprising a rotatable display card for a laser disc, game or advertising brochure providing a rear wall with superimposed (combined) butterfly images thereon and a pocket with outer cover providing a front wall having an arcuate window comprising a grid displaying only one of the images.
Figure 62:
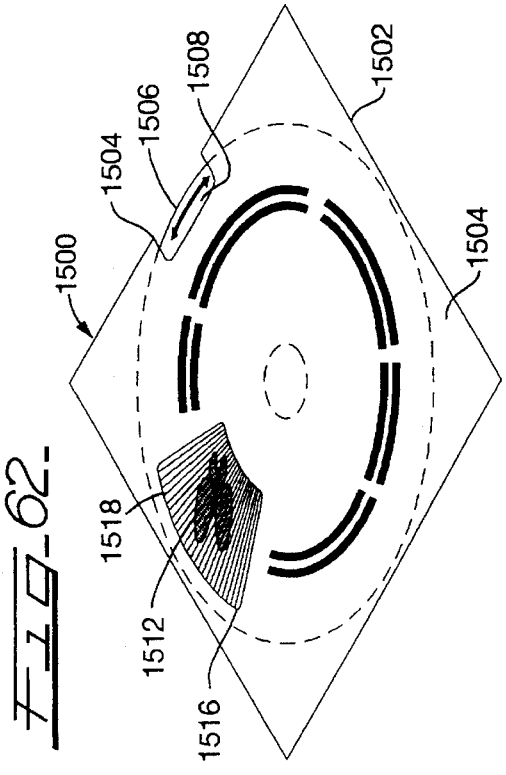
FIG. 62 is a perspective view of information display assembly of FIG. 61 but with the display card rotated to a different position so as to display another one of the images.

The information display assembly 1500 of FIGS. 61–62 is generally functional similar to the display assembly of FIGS. 19–24, except as described below. The display assembly 1500 comprises a laser disc case and package assembly 1502 with a pocket 1504. A rotatable wheel or disc 1506 in positioned in the pocket 1504. The wheel 1506 comprises a back web 1508 having superimposed (combined) images 1510 and 1512 thereon. The stationary front cover 1514 of the laser disc case 1502 has a window 1516 with an arcuate radial grid 1518 therein. Viewing of the images changes as the wheel 1506 is rotated.

Figure 63:
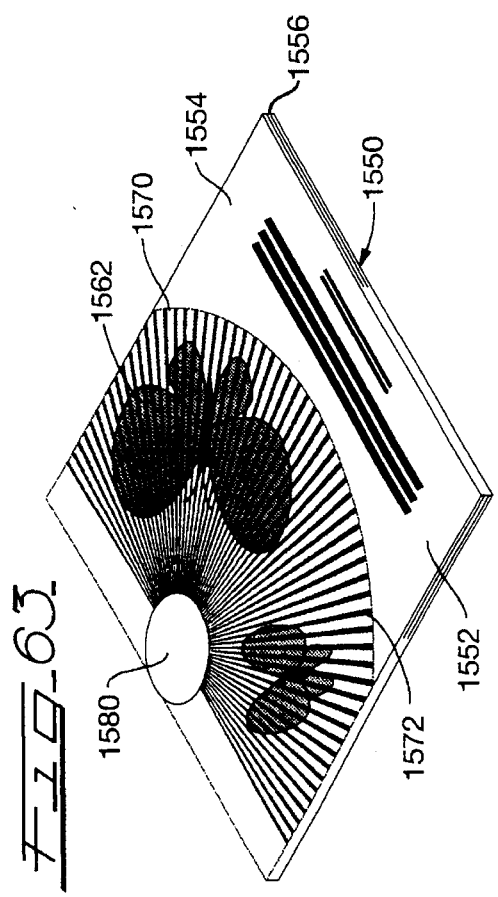
FIG. 63 is a perspective view of a further information display book assembly comprising a rotatable cover and pages (rearward web) with superimposed (combined) images thereon and a rotatable arcuate front web wall comprising a grid placed in a position to display some of the images on the cover and pages.
Figure 64:
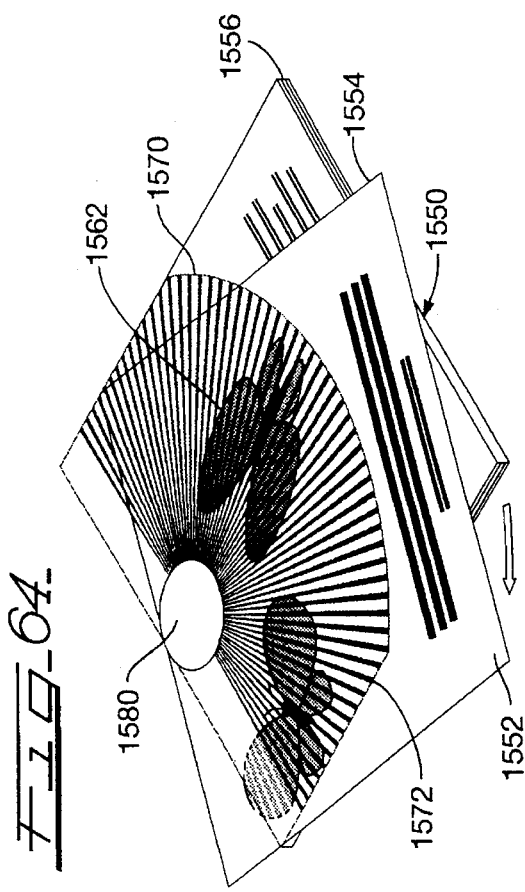
FIG. 64 is a perspective view of information display assembly of FIG. 61 but with the grid rotated to a different position so as to display some of the other images on the cover and pages.

The information display assembly 1550 of FIGS. 63–64 is generally functional similar to the display assembly of FIGS. 61–62, except as described below. The display assembly 1550 comprises a book 1552 with a rotatable cover 1554 and pages 1556. The cover 1554 and pages 1556 comprises rearward webs with superimposed (combined) images 1560 and 1562 thereon. A rotatable arcuate front web 1570 comprises a radial grid 1572. The front web 1570, cover 1554, and pages 1556 can be held by a screw-type fastener 1580. Viewing of the images changes as the grid is rotated or when the cover or pages are turned (rotated).

The container and information display assembly 1600 of FIGS. 65 and 66 is generally similar to the display assembly 1400 of FIGS. 59–60, except as provided below. The display assembly 1600 comprises a cassette case 1602 for video tapes and audio tapes. The cassette case 1602 is preferably made of transparent or translucent plastic. A transparent viewing member 1604 is molded or bonded to the exterior front surface 1606 of the cassette case 1602. An interior paper sleeve 1608 or insert providing a back web or rearward web snugly slips into the interior of the cassette case 1602. The exterior side surface 1610 of the sleeve 1608 has printed indicia 1612 thereon, such as the title of the video tape or audio tape. The printed indicia 1610 on the side of the sleeve is visible and viewable through the transparent or translucent side 1614 of the cassette case 1602. The exterior front surface 1616 of the sleeve 1608 has superimposed (combined) images 1618 and 1620 thereon, which are formed in a manner similar to the images described above. The images 1618 and 1620 are positioned in alignment below the transparent viewing member 1604, so that the images can be viewed through the viewing member 1604. The transparent viewing member 1604 comprises a magnifying front web for enlarging the appearances of the images 1618 and 1620 and for facilitating viewing of the images 1618 and 1620 on the front surface 1616 of sleeve 1608 as the angle of view changes. The magnifying web (viewing member) 1604 can comprise an array of transparent rods, a plate lens, a lenticular lens, or a cluster of anamorphic lenses, which function similar to those described in FIGS. 41 and 42. In lieu of a magnifying web, a grid can be used that is similar to the grids described previously.

The container display assembly 1650 of FIGS. 67 and 68 is structurally and functionally similar to the display providing a beverage and container assembly 1070 of FIG. 45, except as described below. The display assembly 1650 includes a double wall, thermal insulating mug 1652, with an inner wall 1654 and outer wall 1656 made of transparent glass or plastic. The mug 1652 has a handle 1658 and a lid 1660 providing a cover and top with rim 1661 and spout. A tubular plastic or paper information sleeve 1662 providing an insert and back web is inserted into the annular space 1664 between the inner and outer walls 1654 and 1656. The outer exterior surface 1666 of the sleeve 1662 has superimposed (combined) images 1668 and 1670 thereon, which are formed in a manner similar to the images described previously. A transparent viewing member 1672 can be bonded or molded to the exterior surface of the outer wall 1656 of the mug. The transparent viewing member 1672 comprises a magnifying front web for enlarging the appearances of the images 1668 and 1670 and for facilitating viewing of the images 1668 and 1670 on the front surface 1666 of sleeve 1662 as the angle of view changes. The magnifying web (viewing member) 1672 can comprise an array of transparent rods, a plate lens, a lenticular lens, or a cluster of anamorphic lenses, which function similar to those described in FIGS. 41 and 42. In lieu of a magnifying web, a grid can be used that is similar to the grids described previously.

The information display assembly 1700 of FIGS. 69 and 70 is generally similar to the display assembly 1600 of FIGS. 65 and 66, except as provided below. The display assembly 1700 comprises a decorative collector plate 1702. The plate 1702 provides a rearward back web and can be made of fine china, bone china, porcelain, ceramics, glass or metal. The plate has a generally flat or planar circular central portion 1704 providing a base which is surrounded by an annular rim 1706. A circular decal 1708 is bonded, ceramically fired or baked onto the top surface of the central portion 1704 (base) of the plate 1702. The decal 1708 has superimposed (combined) images 1710 and 1712 thereon, which are formed in a manner similar to the images described previously. A circular transparent viewing member 1714 can be bonded or molded to the outer surface of the decal 1708. The transparent viewing member 1714 comprises a magnifying front web for enlarging the appearances of the images 1710 and 1712 and for facilitating viewing of the images 1710 and 1712 on the decal 1708 on the plate 1702 as the angle of view changes. The magnifying web (viewing member) 1714 can comprise an array of transparent rods, a plate lens, a lenticular lens, or a cluster of anamorphic lenses, which function similar to those described in FIGS. 41 and 42. In lieu of a magnifying web, a grid can be used that is similar to the grids described previously.

The information display assembly 1750 of FIGS. 71–73 is functionally and structurally similar to the information display assembly of FIGS. 49 and 50, except as described below. The display assembly comprises a business card 1752 or greeting card providing a rearward back web with slots 1754 and 1756. The card can be made of paper, paperboard, or plastic and is substantially flat or planar. The front surface of the card 1752 has superimposed (combined) striped images 1758 and 1760 thereon which are formed in a manner similar to the images described above. A grid 1762 providing a moveable front web is inserted through the slots 1754 and 1756 to cover the images 1758 and 1760. The grid can be pushed or pulled to change the viewing position of the images. The grid 1762 comprises a transparent viewable portion 1764 with a set of aliquot slit-like spaces 1766 which provide a series of substantially rectangular transparent windows for viewing only the first superimposed images from a first angular position and for viewing only the second superimposed images from a second angular position. The grid 1762 has a grid-like pattern similar to that previously described, comprising a set of aliquot spaced opaque bars 1768 with substantially rectangular portions positioned between the rectangular windows for substantially blocking the view of the second superimposed image from the first angular position and for substantially blocking the view of the first superimposed image from the second angular position.

As previously described, the relationship of the width of the bars of the grid, the width of the stripes of the superimposed images, and the spacing between the front web and the rearward web, to a focal point of an observer, are in accordance with the following formulas:

$$S=B-D$$

and $$A/B=C/D$$

wherein
- S=the spacing between the front web and the rearward web
- B=the distance between the rearward and a focal point of the observer
- D=the distance between the front web and focal point of the observer
- A=maximum width of any stripe of the images
- C=maximum width of any bar of the grid.

The information display assembly 1800 of FIGS. 74 and 75 is generally similar to the information display assembly 1300 of FIGS. 55 and 56 and to the information display assembly 1750 of FIGS. 71–73, except as described below. The information display assembly 1800 comprises a decorative window sticker 1802 with a transparent rectangular base 1804 made of glass or plastic. A paper or plastic rectangular, rearward back web 1806 is glued or otherwise secured to the back of the base 1804. The front of the back web has superimposed (combined) striped images 1808 and 1810 thereon which are formed in a manner similar to the images described above. In some circumstances, it may be desirable to etch or print the images directly on the back of the base in lieu of a separate back web. The back surface of the rearward web can be secured to a window by glue, static electricity, or a suction cup. A rectangular plastic or glass grid 1812 is bonded, glued or molded to the front of the base 1804. The grid 1812 has a grid like pattern with bars 1814 and a set of aliquot slit-like spaces 1816 which provide a series of substantially rectangular transparent windows providing a transparent viewable portion for viewing only the first superimposed images from a first angular position and for viewing only the second superimposed images from a second angular position. If desired, window stickers, grids, and back webs of other shapes can also be used. Furthermore, instead of a grid, it may be desirable to use a magnifying web (viewing member) comprising an array of transparent rods, a plate lens, a lenticular lens, or a cluster of anamorphic lenses, which function similar to those described in FIGS. 41 and 42.

The display assembly 1850 of FIGS. 76 and 77 is generally similar to the display assembly 1700 of FIGS. 69 and 70, except as provided below. The display assembly 1850 comprises a decorative Christmas tree ornament 1852. The ornament 1850 has a flat or planar disc 1854 that provides a rearward back web. The disc 1854 can be made of plastic, paper, foil, or metal. The front surface of the disc 1854 has superimposed (combined) images 1856 and 1858 thereon, which are formed in a manner similar to the images described previously. A circular transparent viewing member 1860 can be bonded or molded to the outer surface of the disc 1854. The transparent viewing member 1860 comprises a magnifying front web for enlarging the appearances of the images 1856 and 1858 and for facilitating viewing of the images 1856 and 1858 on the disc 1854 as the angle of view changes. The magnifying web (viewing member) 1860 can comprise an array of transparent rods, a plate lens, a lenticular lens, or a cluster of anamorphic lenses, which function similar to those described in FIGS. 41 and 42. In order to obtain a double sided ornament, the back surface of the disc can have other superimposed (combined) images and a back transparent view member, similar to the front magnifying front web, can be bonded or molded upon the back surface of the disc. The upper portion of the ornament has an aperture or hole 1862 for attachment of a string 1864 to hook onto a branch of a Christmas tree. In lieu of a magnifying web, a grid can be used that is similar to the grids described previously.

The display assembly 1900 of FIGS. 78 and 79 is generally similar to the display assembly 1850 of FIGS. 76 and 77, except as provided below. The display assembly 1850 comprises a circular decorative paperweight 1902 made of transparent glass or plastic. The bottom surface of the paperweight 1902 has superimposed (combined) images 1904 and 1906 etched or printed thereon, which are formed in a manner similar to the images described previously. A circular transparent viewing member 1908 can be bonded or molded to the top surface of the paperweight 1902. The transparent viewing member 1908 comprises a magnifying front web for enlarging the appearances of the images 1904 and 1906 and for facilitating viewing of the images 1904 and 1906 on the bottom of the paperweight 1902 as the angle of view changes. The magnifying web (viewing member) 1908 can comprise an array of transparent rods, a plate lens, a lenticular lens, or a cluster of anamorphic lenses, which function similar to those described in FIGS. 41 and 42. Instead of a magnifying web, a grid can be used that is similar to the grids described previously.

The information display assembly 1950 of FIG. 80 is generally similar to the educational game, toy and display assembly 700 of FIGS. 38 and 39, except as described below. The information display assembly 1950 comprises a motorized scrolling and rotating display 1952 with a stationary cylindrical casing, kiosk or tubular display stand 1954 which provides an outer front web. Positioned within the interior of the outer web 1952 is a motor-driven tubular, inner, rearward back web 1954. The inner web 1954 is concentric with and rotates within the outer web 1952. The outer front surface of the inner web 1954 has superimposed (combined) striped images 1960–1965 printed thereon which are formed in a manner similar to the images described above. The outer web 1952 has a rectangular opening 1970 into which a stationary rectangular grid 1972 is secured. The grid 1972 has a grid-like pattern with bars 1974 and a set of aliquot slit-like spaces 1976. The grid 1972 provides a striped window for viewing one of the images at a time as the inner web 1954 rotates. In some circumstances, instead of a grid, it may be desirable to use a magnifying web (viewing member) comprising an array of transparent rods, a plate lens, a lenticular lens, or a cluster of anamorphic lenses, which function similar to those described in FIGS. 41 and 42.

The information scroll display assembly 2000 of FIG. 81 is generally similar to the educational game, toy and display assembly 700 of FIGS. 38 and 39 and rotating display assembly 1950 of FIG. 80, except as described below. The information display assembly 2000 comprises a motorized scrolling and rotating display 2002 with a stationary rectangular casing or tubular display stand 2004 which provides an outer front web. Positioned within the interior of the outer web 2004 is a motor-driven continuous inner, rearward back web or sheet 2008 made of plastic or paper. The inner web 2008 is rotated by motor-driven vertical rollers or rotating cylinders 2010–2016. The inner web 2008 fits within the outer casing 2004. The outer front surface of the inner web 2008 has superimposed (combined) striped images 2020 and 2022 printed thereon which are formed in a manner similar to the images described previously. The outer web 2002 has a rectangular opening 2024 into which a stationary rectangular grid 2026 is secured. The grid 2026 has a grid-like pattern with bars 2030 and a set of aliquot slit-like spaces 2032. The grid 2026 provides a striped window for viewing one of the images 2020 or 2022 at a time as the inner web 2008 rotates. In some circumstances, instead of a grid, it may be desirable to use a magnifying web (viewing member) comprising an array of transparent rods, a plate lens, a lenticular lens, or a cluster of anamorphic lenses, which function similar to those described in FIGS. 41 and 42.

The vehicle sign display assembly 2050 of FIGS. 82 and 83 is generally similar to the billboard and display sign assembly 600 of FIG. 2, except as provided below. The vehicle sign display assembly 2050 comprises a generally rectangular stationary decal, sign or billboard 2052 which is bonded or otherwise secured to a wall or exterior surface of a vehicle 2053. The vehicle sign 2052 as attached is generally flat or planar and provides a rearward back web. The sign 2052 can be made of paper, paperboard, plastic or metal. The outer front surface of the vehicle sign 2052 has superimposed (combined) images 2054 and 2056 printed thereon, which are formed in a manner similar to the images described previously. A rectangular transparent viewing member 2060 can be bonded or molded to the outer surface of the sign 2052. The transparent viewing member 2052 comprises a magnifying front web for enlarging the appearances of the images 2054 and 2056 and for facilitating viewing of the images 2054 and 2056 as the angle of view changes. The magnifying web (viewing member) 2060 can comprise an array of transparent rods, a plate lens, a lenticular lens, or a cluster of anamorphic lenses, which function similar to those described in FIGS. 41 and 42. Instead of a magnifying web, a grid can be used that is similar to the grids described previously.

The display assembly 2100 of FIGS. 84 and 85 is structurally and functionally similar to the display assembly 1900 of FIGS. 78 and 79, except as provided below. The display assembly 1850 comprises a shirt 2102, such as a T-shirt. The front of the shirt 2102 provides a rearward back web and has superimposed (combined) images 2104 and 2106 ironed, glued, or printed thereon, which are formed in a manner similar to the images described previously. A circular transparent viewing member 2108 can be bonded or molded to the area surrounding the images. The transparent viewing member 2108 comprises a magnifying front web for enlarging the appearances of the images 2104 and 2106 and for facilitating viewing of the images 2104 and 2106 as the angle of view changes. The magnifying web (viewing member) 2108 can comprise an array of transparent rods, a plate lens, a lenticular lens, or a cluster of anamorphic lenses, which function similar to those described in FIGS. 41 and 42. Other types of clothing can be used instead of T-shirts, such as sweatshirts, jackets, caps, scarfs, etc. In lieu of a magnifying web, a rigid grid can be used that is similar to the grids described previously.

The information display assembly 2150 of FIGS. 86 and 87 is generally similar to the information display assembly 1800 of FIGS. 74 and 75, except as described below. The information display assembly 2150 comprises a book 2152 with pages 2154 that slide sideways (laterally). The pages provides a rearward back web with superimposed (combined) striped images 2156 and 2158 printed thereon, which are formed in a manner similar to the images described above. A rectangular plastic grid 2160 is held by a frame 2162 and secured by fasteners 2164 and 2166 to the pages. The grid 2160 has a grid like pattern with bars 2170 and a set of aliquot slit-like spaces 2172 which provide a series of substantially rectangular transparent windows providing a transparent viewable portion to view only the first superimposed images from a first angular position and only the second superimposed images from a second angular position.

The book display assembly 2180 of FIGS. 88 and 89 is generally similar to the information display assembly 2150 of FIGS. 86 and 87, except that the pages move transversely up and down and the grid is replaced with transparent viewing member 2182. The transparent viewing member comprises a magnifying front web for enlarging the appearances of the images 2156 and 2158 and for facilitating viewing of the images 2156 and 2158 as the angle of view changes. The magnifying web (viewing member) 2182 can comprise an array of transparent rods, a plate lens, a lenticular lens, or a cluster of anamorphic lenses, which function similar to those described in FIGS. 41 and 42.

The display assembly 2200 of FIGS. 90 and 91 is generally similar to the paperweight display assembly 1900 of FIGS. 74 and 75, except as described below. The information display assembly 2200 comprises a transparent glass or plastic decorative base member 2202 providing an award plaque, vertical paperweight, bookend, and ornament. The decorative base member 2202 has a back surface 2204 providing a rearward back web with superimposed (combined) striped images 2206 and 2208 etched or printed thereon, which are formed in a manner similar to the images described above. A grid 2210 is etched or printed on the front surface 2212 of the decorative base member 2202. The grid 2210 has a grid like pattern with bars and a set of aliquot slit-like spaces which provide a series of substantially rectangular transparent windows providing a transparent viewable portion to view only the first superimposed images from a first angular position and only the second superimposed images from a second angular position. In some circumstances, instead of a grid, it may be desirable to use a magnifying web (viewing member) comprising an array of transparent rods, a plate lens, a lenticular lens, or a cluster of anamorphic lenses, which function similar to those described in FIGS. 41 and 42.

The display assembly 2250 of FIGS. 92 and 93 is generally similar to the display assembly 2200 of FIGS. 91 and 92, except as described below. The display assembly 2250 has a sculpture 2252 comprising superimposed (combined) images 2254 and 2256. A transparent viewing member 2260 made of vertical transparent or translucent rods 2262 or poles is positioned in front on the sculpture. The rods 2262 can be spaced from each other or can be positioned against each other. The rods 2262 provide a magnifying front web for enlarging the appearances of the images 2254 and 2256 and for facilitating viewing of the images 2254 and 2256 as the angle of view changes. The rods 262 can be placed in a base or stand 2264. In some circumstances, it may be desirable to replace the transparent rods with a plate lens, a lenticular lens, a cluster of anamorphic lenses, or a grid as described above. The trading card display assembly 2300 of FIGS. 9496 is structurally and functionally similar to the display assembly 1850 of FIG. 77, except as provided below. The trading card display assembly 2300 comprises a trading card 2302, such as a baseball card. The front of the trading card 2302 provides a rectangular rearward back web and has superimposed (combined) images 2304–2306 printed thereon, which are formed in a manner similar to the images described previously. FIG. 94 illustrates three images 2304, 2305, and 2306 of a baseball player, which are subsequently striped, combined and superimposed. The images can be optically scanned from photographs or a video tape of the baseball player. The front of the trading card can have other indicia, such as stars 2307 and identification 2308 of person illustrated on the card. A rectangular transparent viewing member 2310 can be bonded or molded over the front of the trading card. The transparent viewing member 2310 comprises a magnifying front web for enlarging the appearances of the images 2304–2308 and for facilitating viewing of the images 2304–2306 as the angle of view changes. The magnifying web (viewing member) 2310 can comprise an array of transparent rods, a plate lens, a lenticular lens, or a cluster of anamorphic lenses, which function similar to those described in FIGS. 41 and 42. In lieu of a magnifying web, a rigid grid can be used that is similar to the grids described previously. Other types of trading cards can be used such as football cards, basketball cards, hockey cards, soccer cards, or other sports cards, or cards depicting a group or an individual country singer, rock singer, musician, performing artist, or other star.

The framed picture display assembly 2350 of FIGS. 97 and 98 is generally similar to the display assembly of FIG. 89, except as provided below. The framed picture display assembly 2350 comprises a picture 2352 or photograph. The picture can provide a rectangular rearward back web and has superimposed (combined) images 2354 and 2356 thereon, which are formed in a manner similar to the images described previously. A rectangular transparent viewing member 2358 mounted in a rectangular picture frame 2360 can be bonded or molded over the front of the trading card. The transparent viewing member 2358 comprises a magnifying front web for enlarging the appearances of the images 2354 and 2356 and for facilitating viewing of the images 2354 and 2356 as the angle of view changes. The magnifying web (viewing member) 2358 can comprise an array of transparent rods, a plate lens, a lenticular lens, or a cluster of anamorphic lenses, which function similar to those described in FIGS. 41 and 42. In lieu of a magnifying web, a rigid grid can be used that is similar to the grids described previously. The picture frame 2360 can be made of wood, metal, ceramic, glass, or plastic. The picture frame 2360 can be sufficiently thick to be a stable, erect display stand. If desired, the framed picture display can be two sided, with another picture on the back surface of the rearward web and a rearward facing transparent viewing member covering the other picture.

The display stand assemblies 2400 and 2450 of FIGS. 99–102 are generally similar to the framed picture display assembly 2350 of FIGS. 97 and 98, except as provided below. The display stand assemblies 2400 and 2450 each comprises a picture 2402 or photograph. The picture can provide a rectangular rearward back web and has superimposed (combined) images 2404 and 2406 thereon, which are formed in a manner similar to the images described previously. A rectangular transparent viewing member 2408 is bonded or molded on a transparent display stand 2410 (FIG. 99) or 2460 (FIG. 100) made of plastic or glass. The transparent viewing member 2408 and vertical portion 2412 of the display stand cooperate with each other to form a pocket 2413 to receive the picture 2402. The base 2414 of the display stand 2410 of FIG. 99 is generally flat or plant and is cantilevered from the vertical portion of the display stand. The display stand 2460 of FIG. 100 has a bifurcated or inverted V-shaped base 2462. The transparent viewing member 2408 comprises a magnifying front web for enlarging the appearances of the images 2404 and 2406 and for facilitating viewing of the images 2404 and 2406 as the angle of view changes. The magnifying web (viewing member) 2408 can comprise an array of transparent rods, a plate lens, a lenticular lens, or a cluster of anamorphic lenses, which function similar to those described in FIGS. 41 and 42. Instead of a magnifying web, a rigid grid can be used that is similar to the grids described previously. The display frames can be two sided, if desired, with another picture on the back surface of the rearward web and a rearward facing transparent viewing member covering the other picture.

The clock display assembly 2500 of FIGS. 103 and 104 is generally similar to the display assembly of FIG. 89, except as provided below. The clock display assembly 2500 has a clock face 2502 with numbers 2504 thereon. The clock face 2502 can provide a circular rearward back web and has superimposed (combined) images 2506 and 2508 thereon, which are formed in a manner similar to the images described previously. A circular transparent viewing member 2510 is bonded, molded or otherwise mounted upon the clock face 2502. The transparent viewing member 2510 comprises a magnifying front web for enlarging the appearances of the images 2506 and 2508 and for facilitating viewing of the images 2506 and 2508 as the angle of view changes. The magnifying web (viewing member) 2510 can comprise an array of transparent rods, a plate lens, a lenticular lens, or a cluster of anamorphic lenses, which function similar to those described in FIGS. 41 and 42. The clock face 2502 and magnifying web 2510 have aligned concentric holes or openings 2512 and 2514 at their centers to receive a shaft that is driven by an electrical motor. The shaft rotates the hands 2516 and 2518 of the clock. The clock display is mounted in a circular housing 2522 and supported on a base or stand 2524. If desired, the magnifying web can be placed in front of the hands rather than behind than hands; in such cases the magnifying web need not have a center hole (opening). Instead of a magnifying web, a rigid or laminated grid can be used that is similar to the grids described previously.

The watch display assemblies 2550 and 2560 of FIGS. 105–107 are structurally and functionally similar to the clock display assembly 2500 of FIGS. 103 and 104, except as provided below. The watch display assemblies 2550 and 2560 comprise self-winding or manual winding mechanical wristwatches rather than an electric clock. The wristwatches 2550 and 2560 have a watch casing 2570 with a manually operable, rotatable knurled knob 2572 to adjust the hands 2516 and 2518 of the watch and wind the watch for manually windable models. A watchband or strap 2574 is attached to the watch casing 2570. The wristwatch 2550 of FIGS. 105 and 106 has a circular transparent viewing member 2580 which is similar to the transparent viewing member 2510 of the clock of FIGS. 103 and 104. The transparent viewing member 2580 comprises a magnifying front web for enlarging the appearances of the images 2506 and 2508 and for facilitating viewing of the images 2506 and 2508 as the angle of view changes. The magnifying web (viewing member) 2580 can comprise an array of transparent rods, a plate lens, a lenticular lens, or a cluster of anamorphic lenses, which function similar to those described in FIGS. 41 and 42. The wristwatch of FIG. 107 has a rigid or laminated grid 2590 made of plastic or glass, instead of a magnifying web (lens or rods). The grid 2590 can be formed in a manner similar to the grids described previously. The grid 2590 has a grid-like pattern with bars 2592 and a set of aliquot slit-like spaces 2594 which provide a series of substantially rectangular transparent windows providing a transparent viewable portion to view only the first superimposed images 2506 from a first angular position and only the second superimposed images 2508 from a second angular position.

The postage stamp display assembly 2600 of FIGS. 108 and 109 is generally similar to the display assembly 1850 of FIG. 77, except as provided below. The postage stamp assembly 2600 comprises a perforated postage stamp 2602. The front face of the stamp 2602 provides a rearward back web and has superimposed (combined) images 2604 and 2606 printed thereon, which are formed in a manner similar to the images described previously. The front of the stamp can have other indicia 2608, such as the amount of postage and the country (e.g. USA) of origin. A rectangular transparent viewing member 2610 can be bonded or molded over the front of the front face of the stamp. The transparent viewing member 2610 comprises a magnifying front web for enlarging the appearances of the images 2604 and 2606 and for facilitating viewing of the images 2604 and 2606 as the angle of view changes. The magnifying web (viewing member) 2610 can comprise an array of transparent rods, a plate lens, a lenticular lens, or a cluster of anamorphic lenses, which function similar to those described in FIGS. 41 and 42. In lieu of a magnifying web, a rigid grid can be used that is similar to the grids described previously. The back of the stamp has gum (adhesive) which is activated with moisture, e.g. saliva or water, in order to stick the stamp on an envelope. Imperforate self-sticking stamps can be used instead of perforated gummed stamps.

The decorative button and pin display assembly 2650 of FIGS. 110 and 111 is generally similar to the display assembly 1850 of FIG. 77, except as provided below. The decorative button and pin display assembly 2650 comprises a decorative button 2652. The button 2652 can be in the shape of a circular disc and can be flat or planar. The button can be made of ceramic, plastic, wood or metal. The back of the button can be glued, soldered or otherwise secured to a pin 2654. A circular decal or decorative sheet 2655, made of paper, metal, foil, or plastic can be bonded to the front face of the decorative button 2652. The decal (sheet) 2655 provides a rearward back web and has superimposed (combined) images 2656 and 2658 thereon, which are formed in a manner similar to the images described previously. A circular transparent viewing member 2660 can be bonded or molded over the front of the front face of the decal (sheet) 2655. The transparent viewing member 2660 comprises a magnifying front web for enlarging the appearances of the images 2604 and 2606 and for facilitating viewing of the images 2604 and 2606 as the angle of view changes. The magnifying web (viewing member) 2660 can comprise an array of transparent rods, a plate lens, a lenticular lens, or a cluster of anamorphic lenses, which function similar to those described in FIGS. 41 and 42. Instead of a magnifying web, a rigid or flexible grid can be used that is similar to the grids described previously. In some circumstances, it may be desirable to form the images directly on the front face of the button instead of using a decal or separate decorative sheet.

Images can be formed of perspectives providing three dimensional (3D) appearing images. The embodiments, display assemblies and products discussed previously can include or consist of three dimensional-appearing images. Perspective comprising three dimensional-appearing images can be attained by generating on the computer, left images viewable by a left eye and right images viewable by a right eye. The left and right images can be laterally aligned, masked, striped, and combined in the manner previously described.

FIGS. 112–120 show the way each eye sees objects (images) differently of a pyramid 2702, box 2704 and cylinder 2706 positioned on a checkered plane 2708, thereby creating the sense of a perspective. In FIGS. 112, 115 and 118, the pyramid 2702 is moved forwardly to different positions and has the appearance of a greater height as it gets closer to the viewer (observer). The box 2704 in FIGS. 112, 115 and 118 is moved rearwardly and changes from a square to an elongated vertical rectangle. The cylinder 2706 in FIGS. 112, 115 and 118 remains in the same square (position) but appears to get shorter. FIGS. 113 and 114 illustrate the appearance of the perspective of FIG. 112 to the left and right eyes, respectively. FIGS. 116 and 117 illustrate the appearance of the perspective of FIG. 115 to the left and right eyes, respectively. FIGS. 119 and 120 illustrate the appearance of the perspective of FIG. 118 to the left and right eyes, respectively. As the eyes of a viewer (observer) move faster left to right and vice versa, the objects are seen differently and have the appearance of animation. The above images can be scanned into the computer (CPU) with an optical scanner from a photograph or illustration or can be created on the computer by the operator. The images can be rotated, manipulated and changed by the computer user as described previously to create different perspectives and images.

Figures 121, 122, 123:
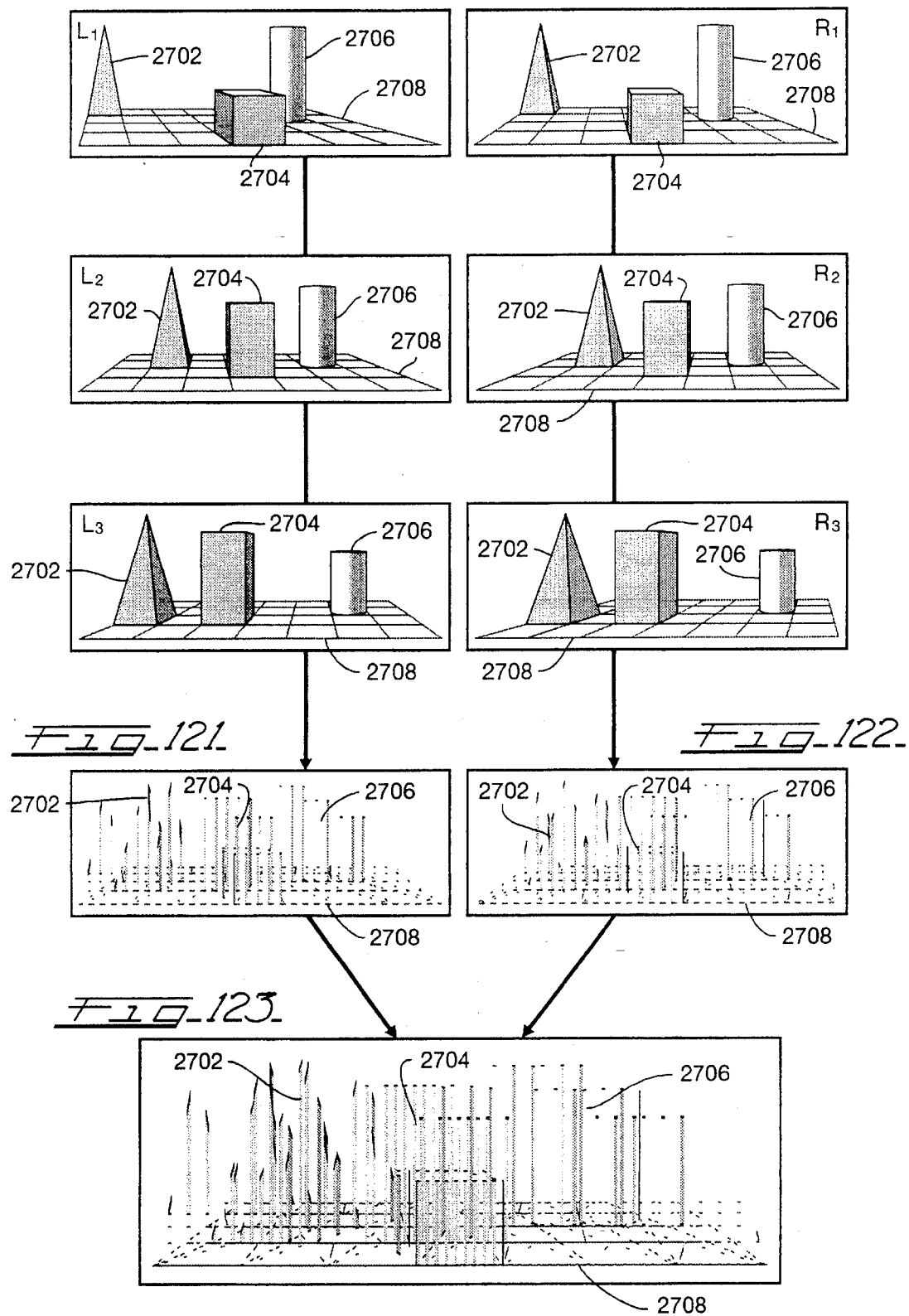
FIG. 121 is a front view of the superimposed (combined) images as viewed from the left eye.
FIG. 122 is a front view of the superimposed (combined) images as viewed from the right eye.

FIG. 121 illustrate the superimposed left eye-images after the images 2702, 2704 and 2706 of FIGS. 113, 116 and 119 have been masked, striped and combined in the manner described previously. FIG. 122 illustrate the superimposed right eye-images after the images 2702, 2704 and 2706 of FIGS. 114, 117 and 120 have been masked, striped and combined in the manner described previously. The left and right images of FIGS. 121 and 122 are then laterally aligned, superimposed, interleaved, and combined as shown in FIG. 123.

FIGS. 124 and 125 illustrate two methods of viewing 3D appearing movable images. FIG. 124 utilizes a grid 2720. FIG. 125 utilizes a transparent viewing member (magnifying web) 2750.

The grid 2720 of FIG. 124 can be rigid or flexible and can be formed in a manner similar to the grids described previously. The grid 2720 has a grid-like pattern with bars 2722 and a set of aliquot slit-like spaces 2724 which provide a series of substantially rectangular transparent windows providing a transparent viewable portion to view only the first images 2726 from a first angular position, only the second images 2727 from a second angular position and only the third images 2728 from a third angular position. In FIG. 124, as a pair of eyes L and R move left to right, each eye sees corresponding perspectives, creating the appearance and illusion of 3D images. The images 2726–2728 can be illuminated from the rear or by placing a light source between the grid 2720 and the back rearward web (sheet) 2730 containing the images 2726–2728.

In FIG. 125, a transparent viewing member 2750 can be bonded or molded over the front of the front face of the rearward back web (sheet) 2752. The transparent viewing member 2750 comprises a magnifying front web for enlarging the appearances of the images 2754–2756 and for facilitating viewing of the images 2754–2756 as the angle of view changes. The magnifying web (viewing member) 2750 can comprise an array of transparent rods, a plate lens, a lenticular lens, or a cluster of anamorphic lenses, which function similar to those described in FIGS. 41 and 42. In FIG. 125, as a pair of eyes L and R moves left to right, each eye sees the corresponding perspectives, creating the appearance and illusion of 3D images.

The displays described above can be used in: vehicle display signs, billboards, paintings, sculptures, ornaments, decorative collector plates, paper weights, back lit transparencies, advertisements, countertop displays, beverage containers, mugs, lampshades, packaging, billboards, posters, toys, educational games, rotating displays, scrolling displays, books, magazines, book covers, envelopes, business cards, stationery, brochures, pamphlets, promotional publications, award plaques, bookends, compact disc covers, laser covers, video cassette cases, audio cassette cases, trading cards, framed pictures, picture stands, clocks, watches, stamps, decorative buttons, decorative fashion pins, clothing, shirts, jackets, caps, and other clothing, widow stickers, murals, stores, and other applications where animations are effective or desirable. Furthermore, the above displays and products can include perspectives providing three dimensional-appearing images and animation.

It is to be understood, that images comprising other letters, words, symbols, pictures, designs, logos, and illustrations, can be used in lieu of the images illustrated in the FIGS.

Among the many advantages of the novel display and process are: (1) Outstanding marketing, advertising, and promotional appeals; (2) Excellent ability to interestingly disseminate educational, safety, medical, and government information; (3) Superior product; (4) Superb quality; (5) Impressive; (6) Cost effective; (7) Simple to install; (8) Easy to use; (9) Economical; (10) Attractive; (11) Efficient; and (12) Effective.

Although embodiments of the invention have been shown and described, it is to be understood that various modifications and substitutions, as well as rearrangements of parts, components, and process steps, can be made by those skilled in the art without departing from the novel spirit and scope of this invention.

What is claimed is:

1. A display, comprising:

a container assembly for displaying information;

said container assembly comprising a display container and a sleeve;

said display container selected from the group consisting of a container, cup, glass, insulating multi-walled mug, bottle, box, carton, wrapper, package, a video cassette case, audio cassette case, said container comprising a stationary rearward web, said rearward web having first and second superimposed striped images thereon;

said sleeve comprising a front web spaced in front of said rearward web, said front web comprising a substantially transparent viewable portion with a set of aliquot slit-like spaces providing a series of substantially rectangular transparent windows for viewing only said first superimposed images from first angular position and for viewing only said second superimposed images from a second angular position;

said first superimposed image on said rearward web having viewable first opaque portions and substantially rectangular obstructed invisible first spacer portions, said viewable first opaque portions comprising an array of aliquot spaced substantially rectangular first strips with first indicia thereon comprising some of said information, said first strips having a width less than said windows and being aligned in registration with said windows for viewing in said first angular position;

said second superimposed image on said rearward web having viewable second opaque portions and substantially rectangular obstructed second spacer portions, said viewable second opaque portions comprising an array of aliquot spaced substantially rectangular second strips with second indicia thereon comprising some of said information, said second strips having a width less than said windows and being aligned in registration with said windows for viewing in said second angular position; and at least a portion said first opaque strips of said first superimposed image being positioned in at least a part of said second spacer portions of said second superimposed image on said rearward web, and at least a part of said second opaque strips of said second superimposed image being positioned in said at least a part of said first spacer portions of said first superimposed image or said rearward web.

2. A display in accordance with claim 1 wherein:

said sleeve comprises a tubular sleeve having a grid-like pattern with a set of aliquot spaced opaque bars with substantially rectangular portions positioned between said rectangular windows for substantially blocking the view of said second superimposed image from said first angular position and for substantially blocking the view of said first superimposed image from said second angular position;

said first spacer portions spanning a width less than said bars and being substantially obstructed and blocked from view by said bars in said first angular position; and said second spacer portions spanning a width less than said bars and being substantially obstructed and blocked from view by said bars in said second angular position.

3. A display in accordance with claim 1 wherein said front web comprises magnifying means for enlarging the appearance of said images and for facilitating viewing of said images as the angle of view changes, said magnifying means selected from the group consisting of an array of substantially transparent rods, plate lens, lenticular lens, a cluster of anamorphic lenses.

4. A display, comprising:

a lampshade assembly for displaying information;

said container assembly comprising a lampshade container and a sleeve;

said lampshade being selected from the group consisting of a truncated lampshade, a frustroconical lampshade, and cylindrically shaped lampshade, said lampshade comprising a stationary rearward web, said rearward web having first and second superimposed striped images thereon;

said sleeve comprising a front web spaced in front of and substantially parallel to said rearward web, said front web comprising a substantially transparent viewable portion with a set of aliquot slit-like spaces providing a series of substantially rectangular transparent windows for viewing only said first superimposed images from first angular position and for viewing only said second superimposed images from a second angular position;

said first superimposed image on said rearward web having viewable first opaque portions and substantially rectangular obstructed invisible first spacer portions, said viewable first opaque portions comprising an array of aliquot spaced substantially rectangular first strips with first indicia thereon comprising some of said information, said first strips having a width less than said windows and being aligned in registration with said windows for viewing in said first angular position;

said second superimposed image on said rearward web having viewable second opaque portions and substantially rectangular obstructed second spacer portions, said viewable second opaque portions comprising an array of aliquot spaced substantially rectangular second strips with second indicia thereon comprising some of said information, said second strips having a width less than said windows and being aligned in registration with said windows for viewing in said second angular position; and at least a portion said first opaque strips of said first superimposed image being positioned in at least a part of said second spacer portions of said second superimposed image on said rearward web, and at least a part of said second opaque strips of said second superimposed image being positioned in said at least a part of said first spacer portions of said first superimposed image or said rearward web.

5. A display in accordance with claim 4 wherein:

said sleeve comprises a tubular sleeve having a grid-like pattern with a set of aliquot spaced opaque bars with substantially rectangular portions positioned between said rectangular windows for substantially blocking the view of said second superimposed image from said first angular position and for substantially blocking the view of said first superimposed image from said second angular position;

said first spacer portions spanning a width less than said bars and being substantially obstructed and blocked from view by said bars in said first angular position; and said second spacer portions spanning a width less than said bars and being substantially obstructed and blocked from view by said bars in said second angular position.

6. A display in accordance with claim 4 wherein said front web comprises magnifying means for enlarging the appearance of said images and for facilitating viewing of said images as the angle of view changes, said magnifying means selected from the group consisting of an array of substantially transparent rods, plate lens, lenticular lens, a cluster of anamorphic lenses.

7. A display, comprising:

an information display assembly for displaying information;

said information display assembly having an information display selected from the group consisting of a magazine, comic book, paper back book, hard back book, book cover, page, envelope, pamphlet, greeting card, trading card, baseball card, basketball card, football card, soccer card, hockey card, sports card, card depicting at least one country or rock singer or musician, compact disc case, laser disc case, brochure, video cassette case, and audio cassette case, said information display having a pocket with a substantially planar rearward web and a substantially planar front web spaced in front of and substantially parallel to said rearward web, at least one of said webs being moveable relative to the other of said webs;

said rearward web having first and second superimposed striped images thereon;

said front web comprising a substantially transparent viewable portion with a set of aliquot slit-like spaces providing a series of substantially rectangular transparent windows for viewing only said first superimposed images from first angular position and for viewing only said second superimposed images from a second angular position, and said grid-like pattern comprising a set of aliquot spaced opaque bars with substantially rectangular portions positioned between said rectangular windows for substantially blocking the view of said second superimposed image from said first angular position and for substantially blocking the view of said first superimposed image from said second angular position;

said first superimposed image on said rearward web having viewable first opaque portions and substantially rectangular obstructed invisible first spacer portions, said viewable first opaque portions comprising an array of aliquot spaced substantially rectangular first strips with first indicia thereon comprising some of said information, said first strips having a width less than said windows and being aligned in registration with said windows for viewing in said first angular position, and said first spacer portions spanning a width less than said bars and being substantially obstructed and blocked from view by said bars in said first angular position;

said second superimposed image on said rearward web having viewable second opaque portions and substantially rectangular obstructed second spacer portions, said viewable second opaque portions comprising an array of aliquot spaced substantially rectangular second strips with second indicia thereon comprising some of said information, said second strips having a width less than said windows and being aligned in registration with said windows for viewing in said second angular position, and said second spacer portions spanning a width less than said bars and being substantially obstructed and blocked from view by said bars in said second angular position; and at least a portion said first opaque strips of said first superimposed image being positioned in at least a part of said second spacer portions of said second superimposed image on said rearward web, and at least a part of said second opaque strips of said second superimposed image being positioned in said at least a part of said first spacer portions of said first superimposed image or said rearward web.

8. A display in accordance with claim 7 wherein said rearward web comprises a moveable web, and the relationship of the width of the bars of the grid, the width of the stripes of the superimposed images, and the spacing between the front web and the rearward web, to a focal point of an observer, are in accordance with the following formulas:

$$S = B - D$$

and $$A/B = C/D$$

wherein $S$ = the spacing between the front web and the rearward web $B$ = the distance between the rearward and a focal point of the observer $D$ = the distance between the front web and focal point of the observer $A$ = maximum width of any stripe of the images $C$ = maximum width of any bar of the grid.

* * * * *